US012587249B2

(12) United States Patent
Zhu et al.

(10) Patent No.: US 12,587,249 B2
(45) Date of Patent: *Mar. 24, 2026

(54) METHOD AND APPARATUS FOR FREQUENCY SELECTIVE BEAM MEASUREMENT AND REPORTING

(71) Applicant: Samsung Electronics Co., Ltd., Suwon-si (KR)

(72) Inventors: Dalin Zhu, Allen, TX (US); Emad Nader Farag, Flanders, NJ (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

This patent is subject to a terminal disclaimer.

(21) Appl. No.: 18/339,943

(22) Filed: Jun. 22, 2023

(65) Prior Publication Data

US 2024/0022299 A1 Jan. 18, 2024

Related U.S. Application Data

(60) Provisional application No. 63/389,303, filed on Jul. 14, 2022, provisional application No. 63/359,052, (Continued)

(51) Int. Cl.
*H04B 7/06* (2006.01)

(52) U.S. Cl.
CPC ......... *H04B 7/0626* (2013.01); *H04B 7/0617* (2013.01)

(58) Field of Classification Search
CPC ... H04B 7/0626; H04B 7/0617; H04B 7/0695
See application file for complete search history.

(56) References Cited

U.S. PATENT DOCUMENTS

2015/0162966 A1 6/2015 Kim et al.
2015/0341097 A1 11/2015 Yang et al.
(Continued)

FOREIGN PATENT DOCUMENTS

EP 3968535 A1 3/2022
WO 2021248299 A1 12/2021

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
(Continued)

*Primary Examiner* — Diane D Mizrahi

(57) ABSTRACT

Methods and apparatuses for frequency selective beam measurement and reporting (FSBMR) in a wireless communication system. A method for operating a user equipment (UE) includes receiving a configuration for a channel state information (CSI) reference signal (RS) resource and a CSI reporting setting to enable FSBMR. The method further includes receiving first information indicating a first set of frequency subbands for the CSI-RS resource and receive second information indicating a second set of frequency subbands for the CSI reporting setting. The method further includes measuring, based on the configuration and the first information, the CSI-RS resource and determining, based on the configuration, the measurement, and the second information, a beam report including one or more beam metrics.

20 Claims, 11 Drawing Sheets

Related U.S. Application Data filed on Jul. 7, 2022, provisional application No. 63/358,930, filed on Jul. 7, 2022.

(56)                    References Cited

U.S. PATENT DOCUMENTS

| | | | |
|---|---|---|---|
| 2019/0260452 A1 | 8/2019 | Zhang et al. | |
| 2020/0259608 A1 | 8/2020 | Kakishima et al. | |
| 2021/0409174 A1 | 12/2021 | Yum et al. | |
| 2022/0029673 A1 | 1/2022 | Chen et al. | |
| 2024/0015545 A1* | 1/2024 | Zhu ..................... | H04L 5/0051 |

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

International Search Report and Written Opinion issued Oct. 20, 2023 regarding International Application No. PCT/KR2023/009687, 7 pages.

Extended European Search Report issued Jul. 14, 2025 regarding Application No. 23835889.9, 10 pages.

* cited by examiner

600

650

Figures 12, 13:
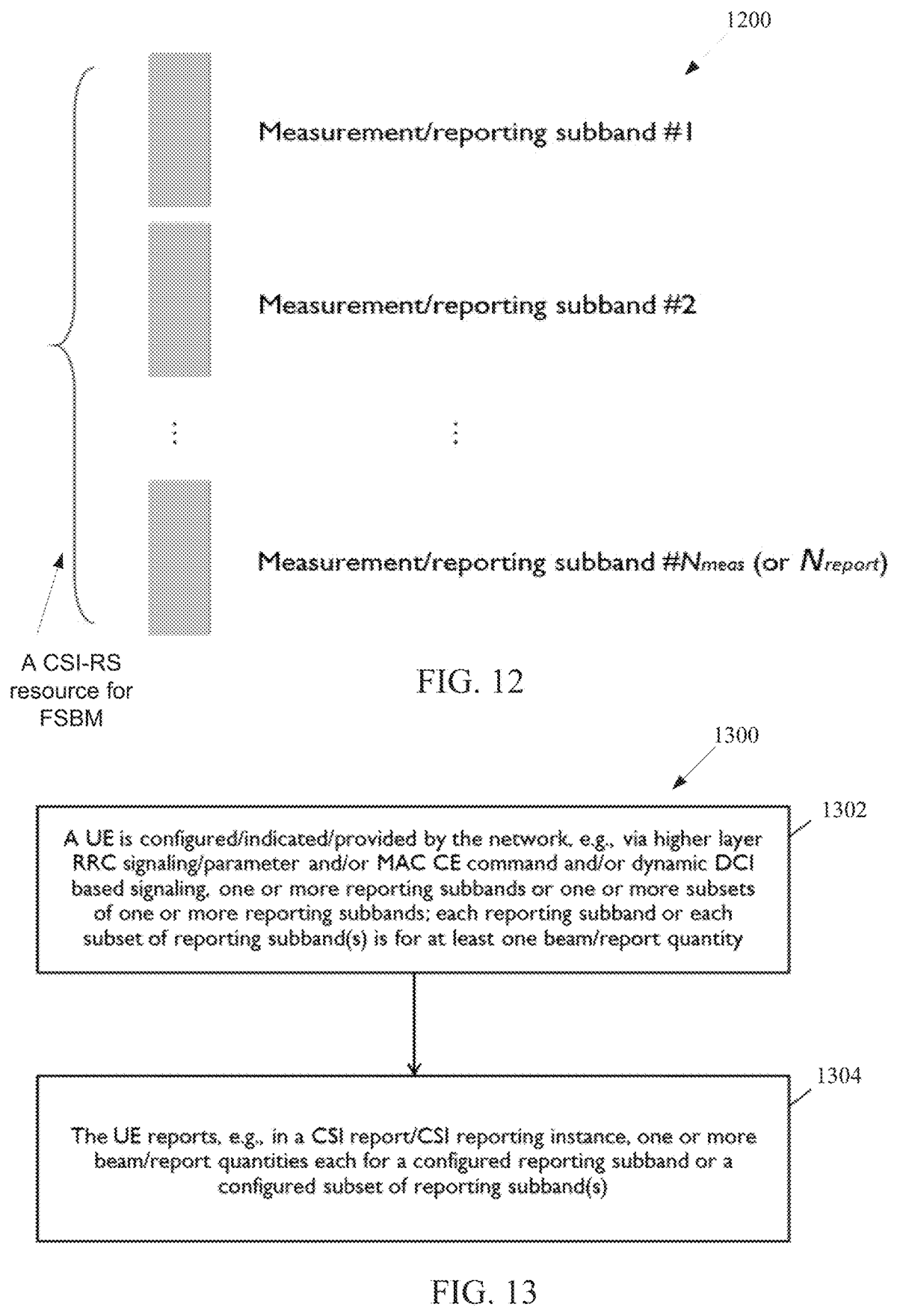

1200

Measurement/reporting subband #1

Measurement/reporting subband #2

⋮         ⋮

Measurement/reporting subband #$N_{meas}$ (or $N_{report}$)

A CSI-RS
resource for
FSBM

A UE is configured/indicated/provided by the network, e.g., via higher layer
RRC signaling/parameter and/or MAC CE command and/or dynamic DCI
based signaling, one or more reporting subbands or one or more subsets
of one or more reporting subbands; each reporting subband or each
subset of reporting subband(s) is for at least one beam/report quantity

1304

The UE reports, e.g., in a CSI report/CSI reporting instance, one or more
beam/report quantities each for a configured reporting subband or a
configured subset of reporting subband(s)

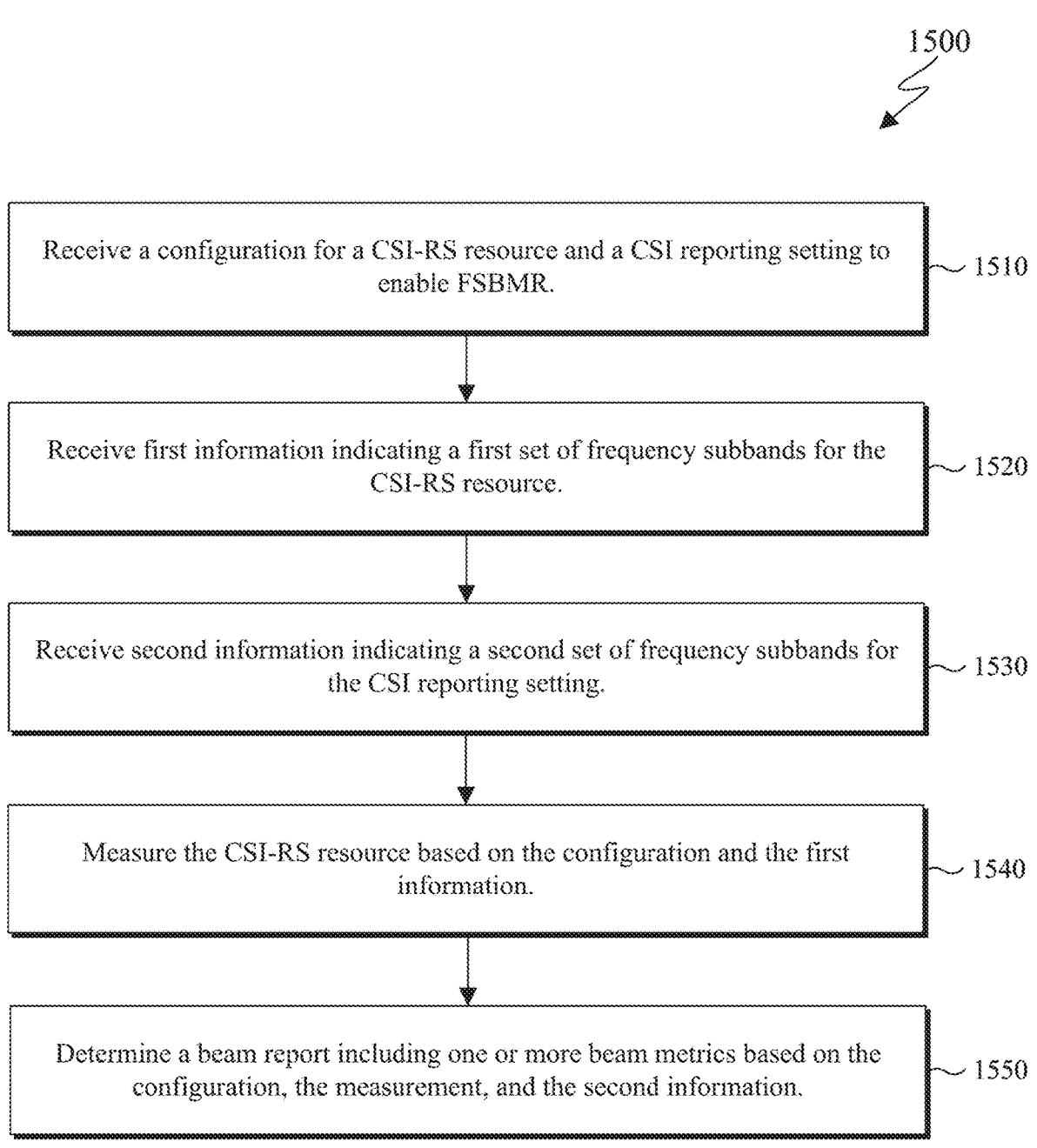

Receive a configuration for a CSI-RS resource and a CSI reporting setting to enable FSBMR. ~ 1510

Receive first information indicating a first set of frequency subbands for the CSI-RS resource. ~ 1520

Receive second information indicating a second set of frequency subbands for the CSI reporting setting. ~ 1530

Measure the CSI-RS resource based on the configuration and the first information. ~ 1540

Determine a beam report including one or more beam metrics based on the configuration, the measurement, and the second information. ~ 1550

FIG. 15

METHOD AND APPARATUS FOR FREQUENCY SELECTIVE BEAM MEASUREMENT AND REPORTING

CROSS-REFERENCE TO RELATED APPLICATIONS AND CLAIM OF PRIORITY

The present application claims priority to: U.S. Provisional Patent Application No. 63/358,930, filed on Jul. 7, 2022; U.S. Provisional Patent Application No. 63/359,052, filed on Jul. 7, 2022; and U.S. Provisional Patent Application No. 63/389,303, filed on Jul. 14, 2022. The contents of the above-identified patent documents are incorporated herein by reference.

TECHNICAL FIELD

The present disclosure relates generally to wireless communication systems and, more specifically, the present disclosure relates to a frequency selective beam measurement and reporting in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a frequency selective beam measurement and reporting in a wireless communication system.

In one embodiment, a user equipment (UE) is provided. The UE includes a transceiver configured to receive a configuration for a channel state information (CSI) reference signal (RS) resource and a CSI reporting setting to enable frequency selective beam measurement and reporting (FSBMR). The transceiver is further configured to receive first information indicating a first set of frequency subbands for the CSI-RS resource and receive second information indicating a second set of frequency subbands for the CSI reporting setting. The UE further includes a processor operably coupled to the transceiver. The processor is configured to measure, based on the configuration and the first information, the CSI-RS resource. The processor is further configured to determine, based on the configuration, the measurement, and the second information, a beam report including one or more beam metrics.

In another embodiment, a base station (BS) is provided. The BS includes a transceiver configured to transmit a configuration for a CSI-RS resource and a CSI reporting setting to enable FSBMR. The transceiver is further configured to transmit first information indicating a first set of frequency subbands for the CSI-RS resource and transmit second information indicating a second set of frequency subbands for the CSI reporting setting. The transceiver is further configured to receive a beam report including one or more beam metrics. The beam report is based on the configuration, measurement of the CSI-RS resource based on the configuration and the first information, and the second information.

In yet another embodiment, a method for operating a UE is provided. The method includes receiving a configuration for a CSI-RS resource and a CSI reporting setting to enable FSBMR. The method further includes receiving first information indicating a first set of frequency subbands for the CSI-RS resource and receive second information indicating a second set of frequency subbands for the CSI reporting setting. The method further includes measuring, based on the configuration and the first information, the CSI-RS resource and determining, based on the configuration, the measurement, and the second information, a beam report including one or more beam metrics.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates an example of mapping a CSI-RS resource to one or more measurement/reporting frequency subbands according to embodiments of the present disclosure;

FIG. 13 illustrates a flowchart of method for UE reporting on a configured frequency subband or subset of frequency subbands according to embodiments of the present disclosure;

FIG. 15 illustrates an example method performed by a UE in a wireless communication system according to embodiments of the present disclosure.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
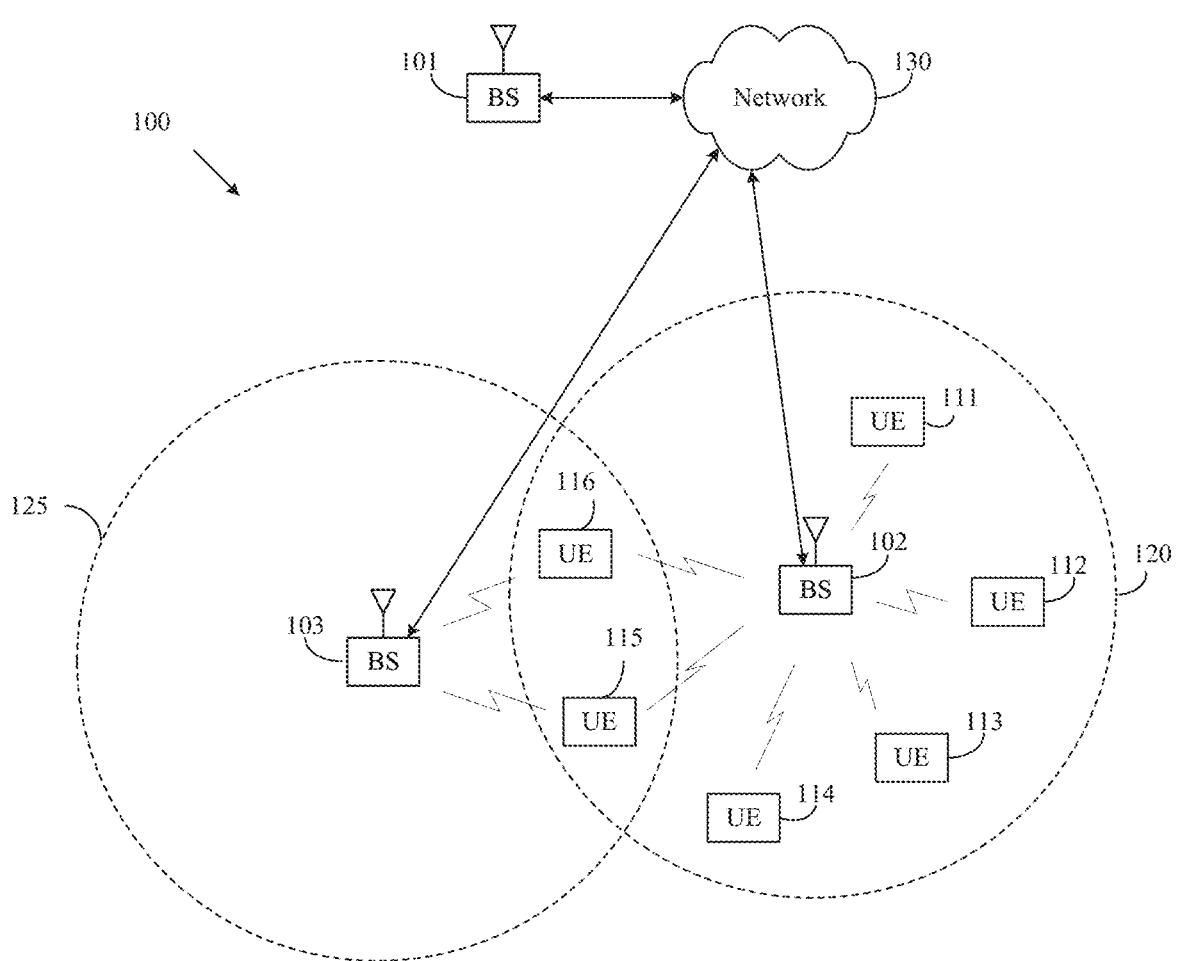
FIG. 1 illustrates an example of wireless network according to embodiments of the present disclosure.
Figure 2:
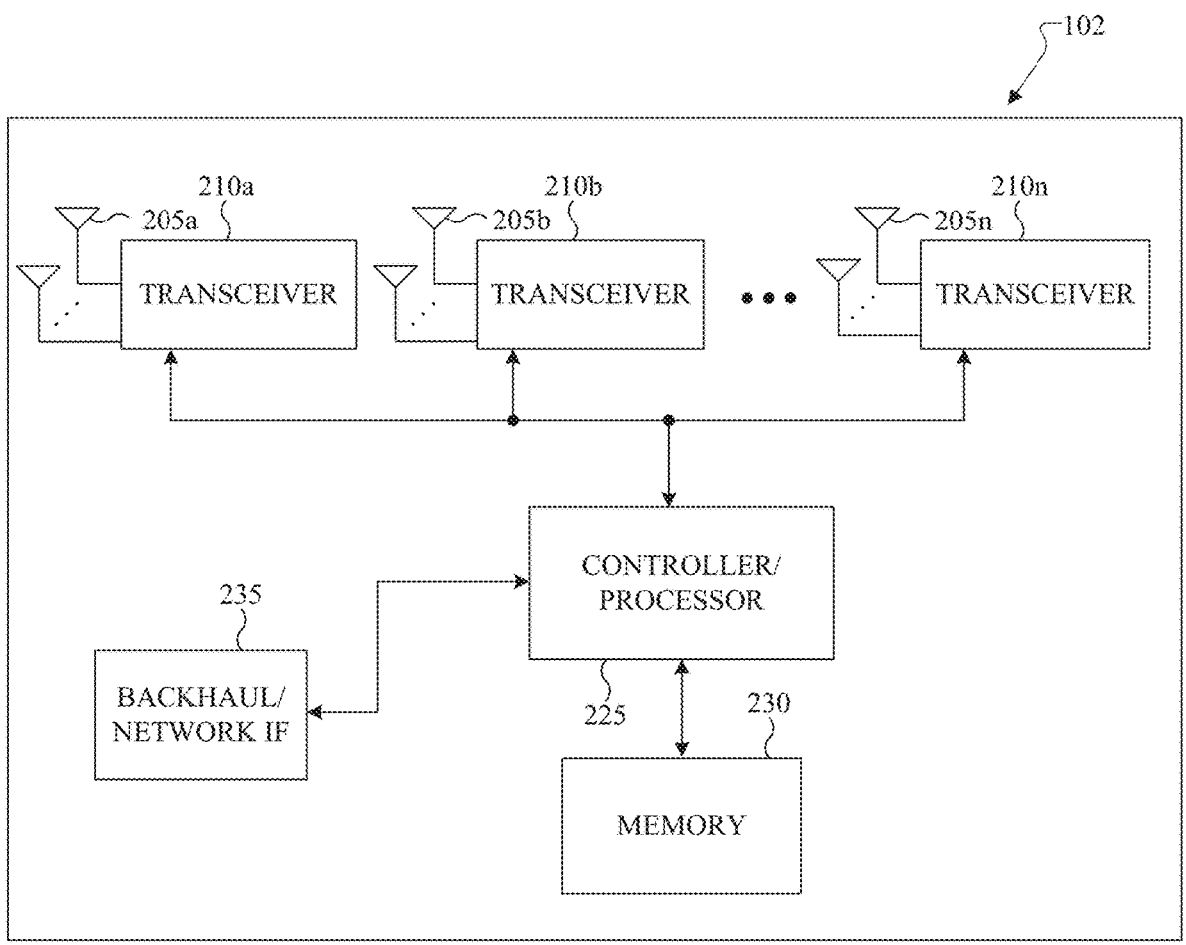
FIG. 2 illustrates an example of gNB according to embodiments of the present disclosure.
Figure 3:
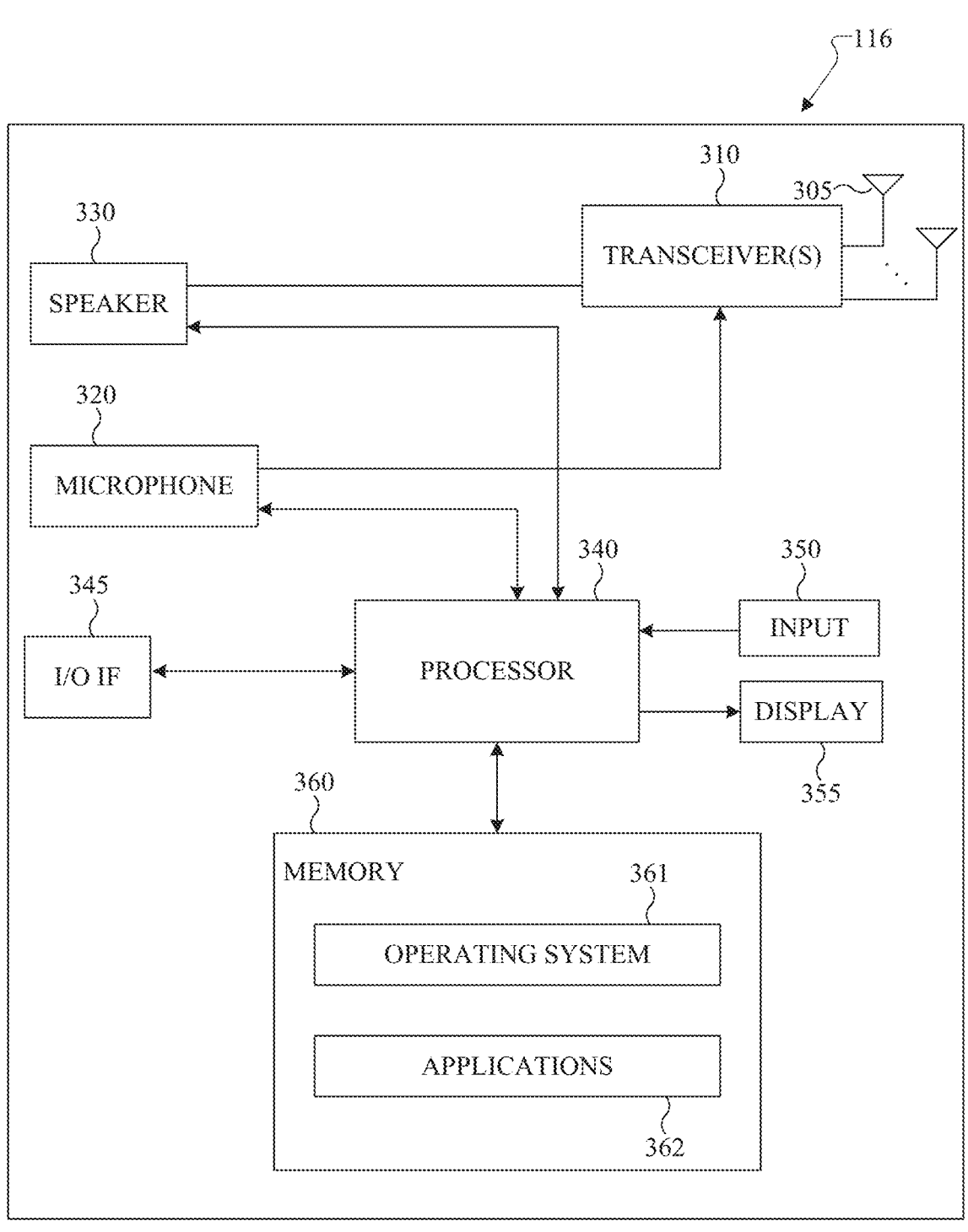
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a frequency selective beam measurement and reporting in a wireless communication system. In certain embodiments, one or more of the gNBs 101-103 includes circuitry, programing, or a combination thereof, to support frequency selective beam measurement and reporting in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support frequency selective beam measurement and reporting in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a frequency selective beam measurement and reporting in a wireless communication system.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355m which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
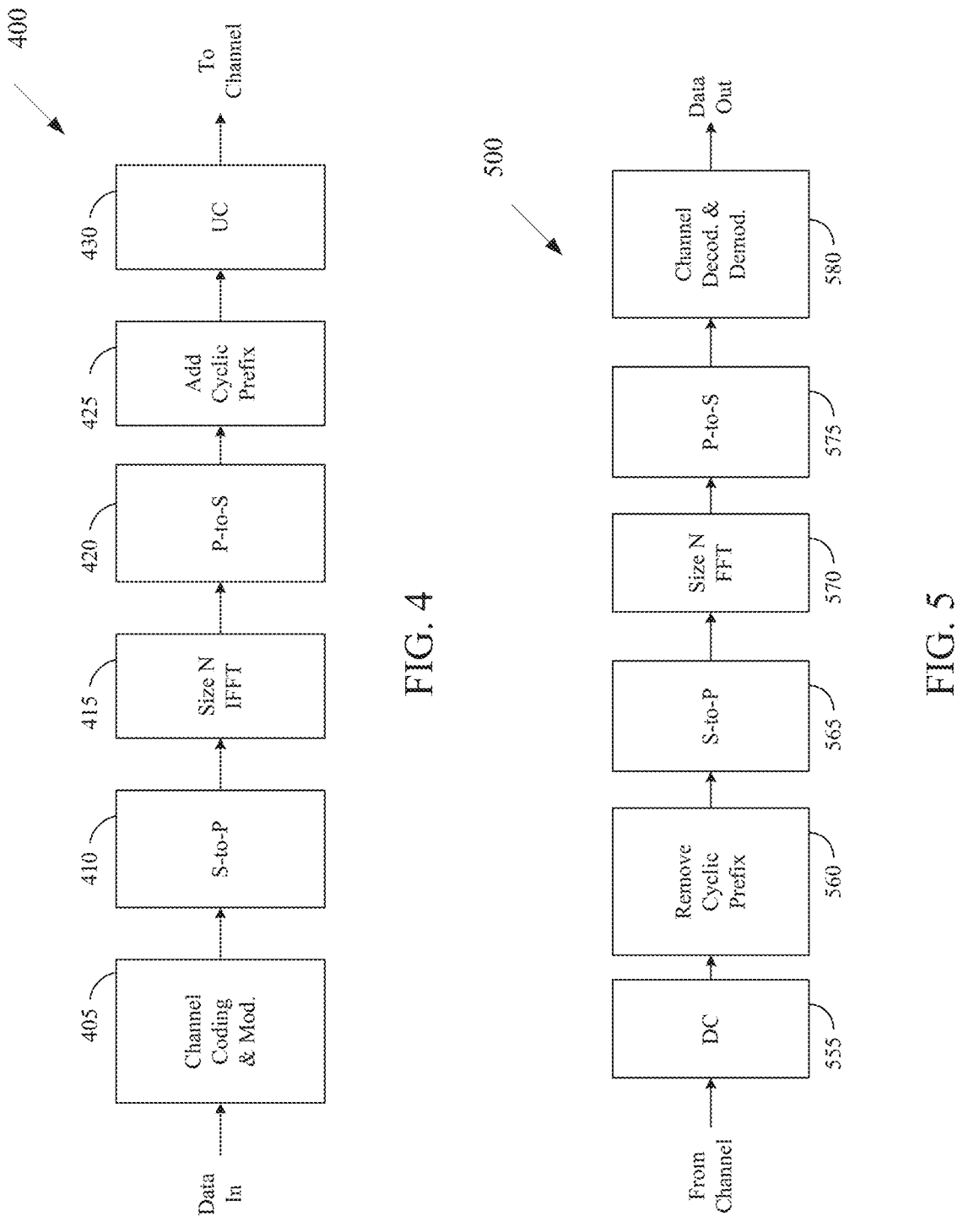
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support a frequency selective beam measurement and reporting in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the down-link from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wire-less transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a con-figuration of a value for a TCI state of a CORESET where the UE receives the PDCCH. The UE can be indicated a spatial setting for a PDSCH reception based on a configu-ration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interfer-ence measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control informa-tion.

UL signals also include data signals conveying informa-tion content, control signals conveying UL control informa-tion (UCI), DMRS associated with data or UCI demodula-tion, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowl-edgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Figure 6A:
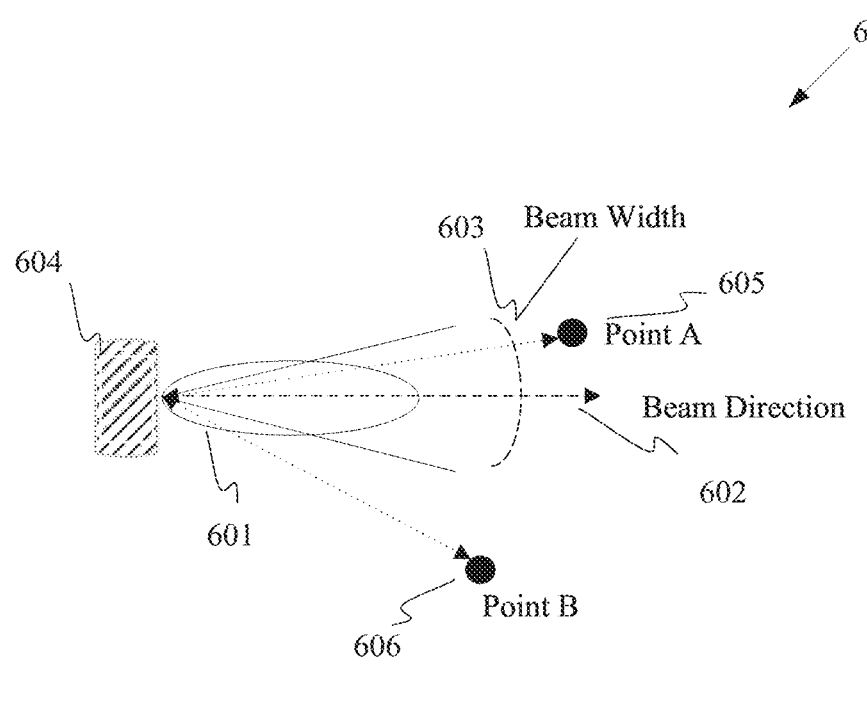
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
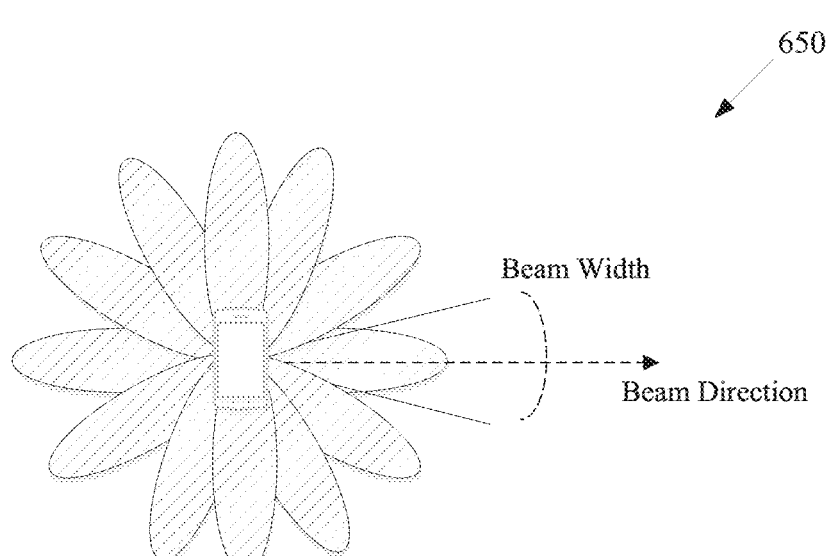
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
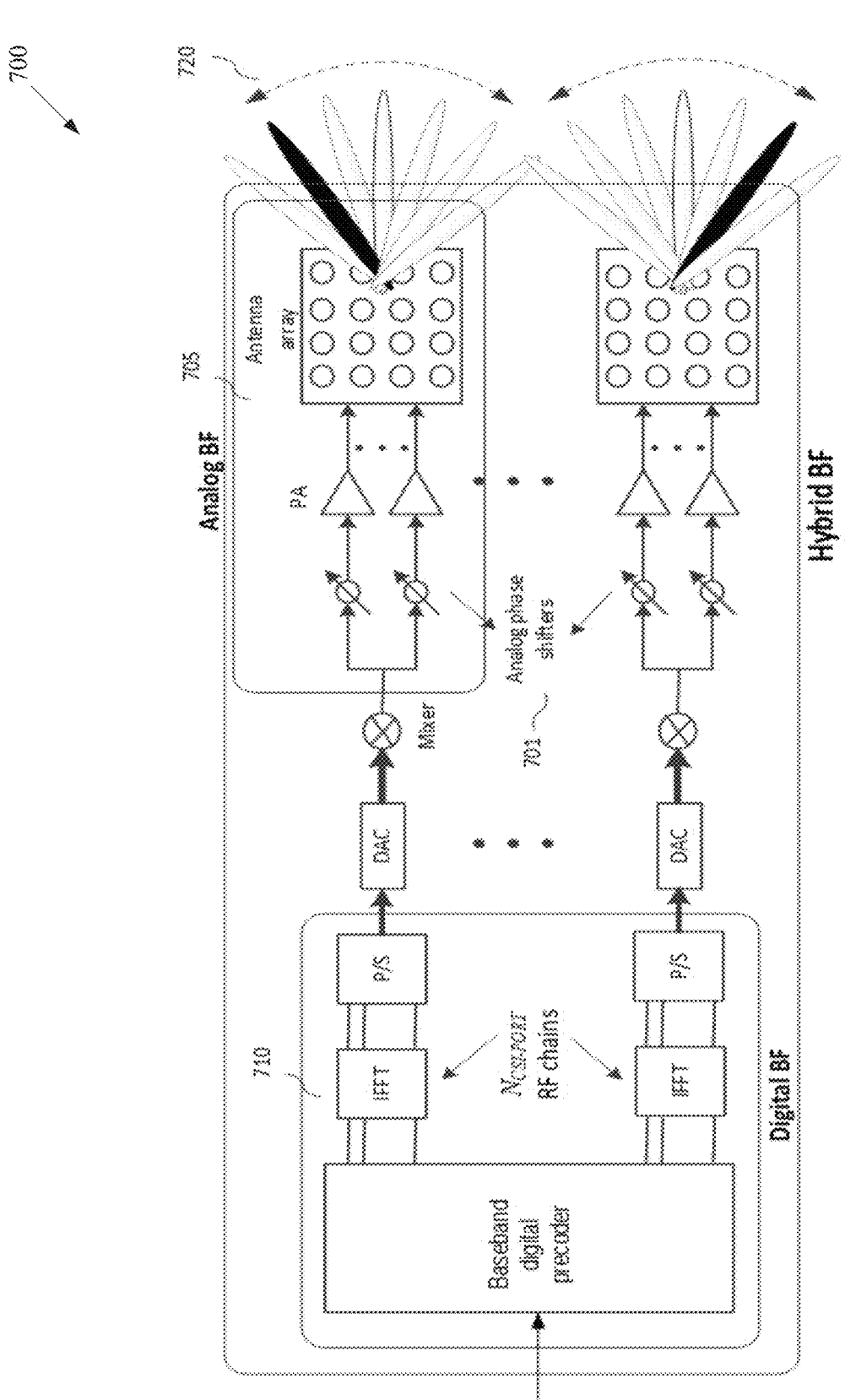
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

The present disclosure considers various design aspects for frequency-selective beam management—using a joint phase-time array (JPTA) system as an example implementation—wherein one or more (analog) beams can be simultaneously transmitted/received over one or more frequency subbands. Specifically, various beam measurement and reporting configurations, beam indication mechanisms, and the corresponding signaling medium/procedures are specified/customized to enable frequency-selective beam management.

Due to the rising demand for traffic, wireless systems are moving towards higher frequency of operation, such as millimeter-wave (mm-wave) and terahertz (THz) frequencies, where abundant spectrum is available. However, the higher frequencies also suffer from a high channel propagation loss, and therefore require a large antenna array to create sufficient beamforming gain to ensure sufficient link budget for operation. Thus, these high frequency systems are usually built with a large antenna array at the transmitter and/or the receiver containing many individual antenna elements. At the operating bandwidths of these mm-wave and THz systems, the cost and power consumption of mixed-signal components such as analog-to-digital converters (ADCs) and/or digital-to-analog converters (DACs) also grows tremendously.

Thus, fully digital transceiver implementations, where each antenna element is fed by a dedicated radio-frequency (RF) chain, are impractical. To keep the hardware cost and power consumption of such large antenna arrays manageable, typically an analog beamforming or hybrid beamforming architecture is adopted where the large antenna array is fed with a much smaller number of RF chains via the use of analog hardware such as phase-shifters. This reduces the number of mixed-signal components which significantly reduces the cost, size and power consumption of the transceivers.

When transmitting a signal at the transmitter, a combination of digital beamforming before DAC and analog beamforming using the phase-shifters is used to create the overall beam shape in the desired direction. Similarly, when receiving a signal at the receiver, a combination of analog beamforming using phase-shifters and digital beamforming after ADC is used to create the overall beam shape in the desired direction.

Figure 8:
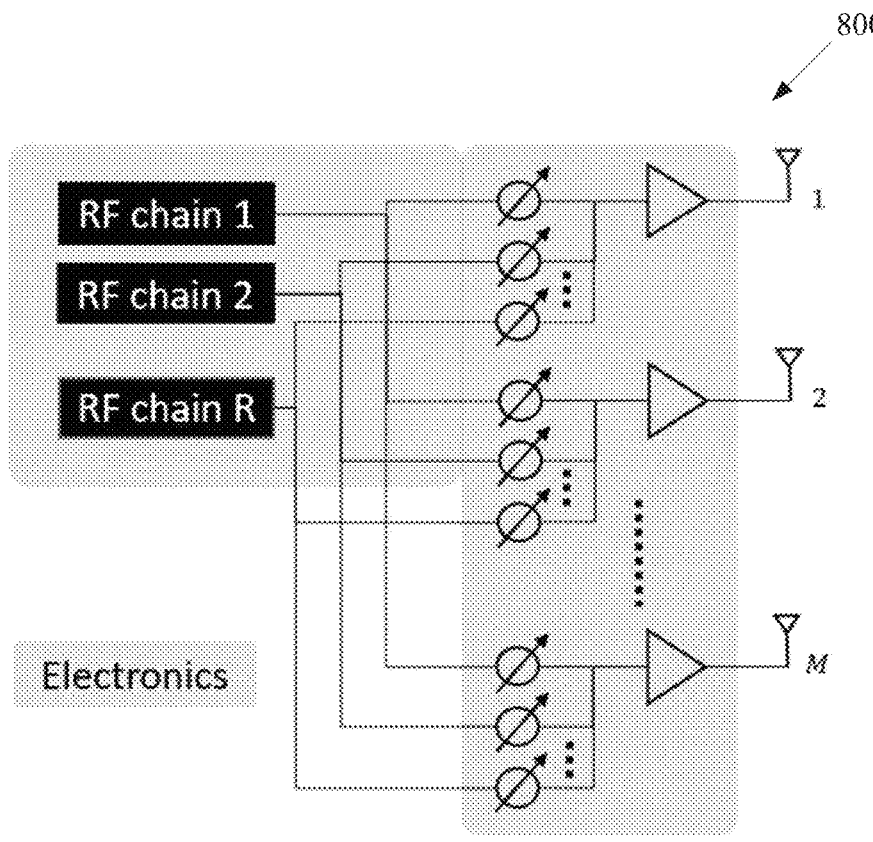
FIG. 8 illustrates an example of hybrid beamforming according to embodiments of the present disclosure.

FIG. 8 illustrates an example of hybrid beamforming 800 according to embodiments of the present disclosure. An embodiment of the hybrid beamforming 800 shown in FIG. 8 is for illustration only.

However conventional approaches usually use a phase-shifter array or a combination of phase-shifters and switches to connect the large antenna array to a few number of RF chains. An example of such an architecture is shown below in FIG. 8.

Figure 9:
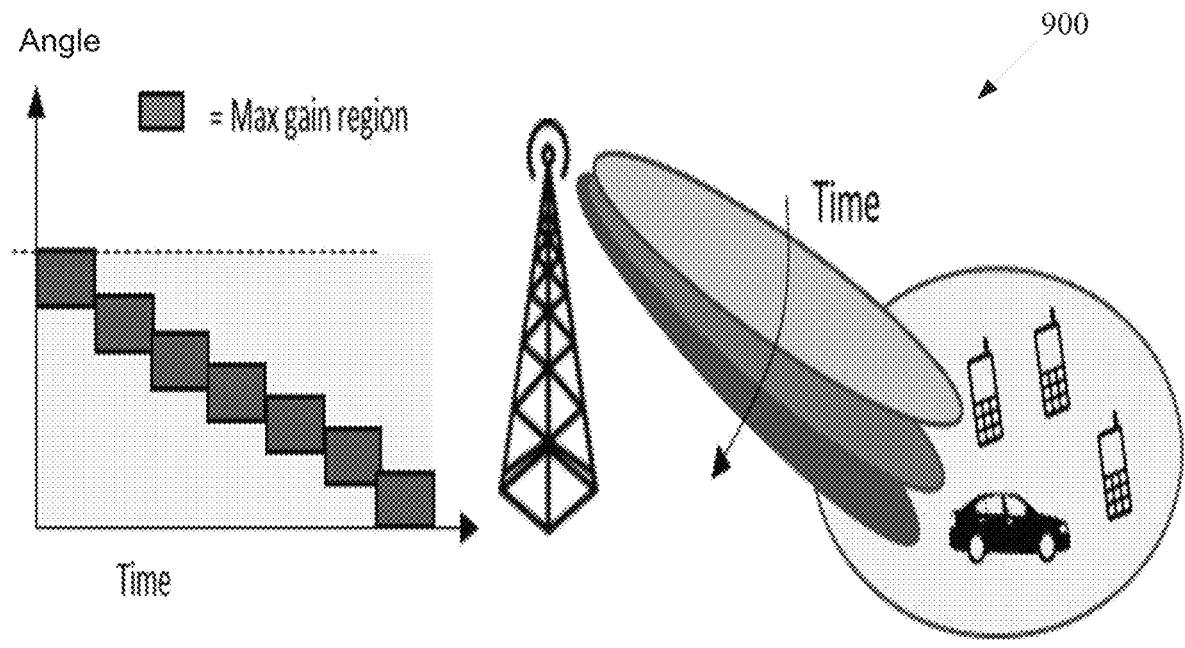
FIG. 9 illustrates an example of analog beamforming according to embodiments of the present disclosure.

FIG. 9 illustrates an example of analog beamforming 900 according to embodiments of the present disclosure. An embodiment of the analog beamforming 900 shown in FIG. 9 is for illustration only.

For example, let us consider the case of hybrid beamforming at a BS shown in FIG. 8 with a single RF chain, i.e., R=1. Note that with M antennas, the maximum possible beamforming gain in any direction is M. For the BS to provide signal coverage to the UEs in the cell, the BS may perform beam sweeping over time for its frequency-flat beams. This is illustrated in FIG. 9.

An alternative to frequency-flat hybrid beamforming is frequency-dependent hybrid beamforming, which is called as JPTA beamforming. Note that, here, frequency-dependent beamforming refers to a technique where different components of the input signal may encounter a differently shaped analog beam based on their frequency.

A layout with a single BS serving many users in its coverage area and operating with a system bandwidth W around a center frequency $f_0$ is provided The BS is assumed to have a uniform linear antenna array having M elements, and $N_{RF}=1$ RF chain. Note that the disclosure can be directly extended to planar array configurations. The antenna spacing is half-wavelength at the center frequency $f_0$. Each of the M antennas has a dedicated phase-shifter, and they are connected to the single RF chain via a network of N≤M TTDs as shown in FIG. 10.

Figure 10:
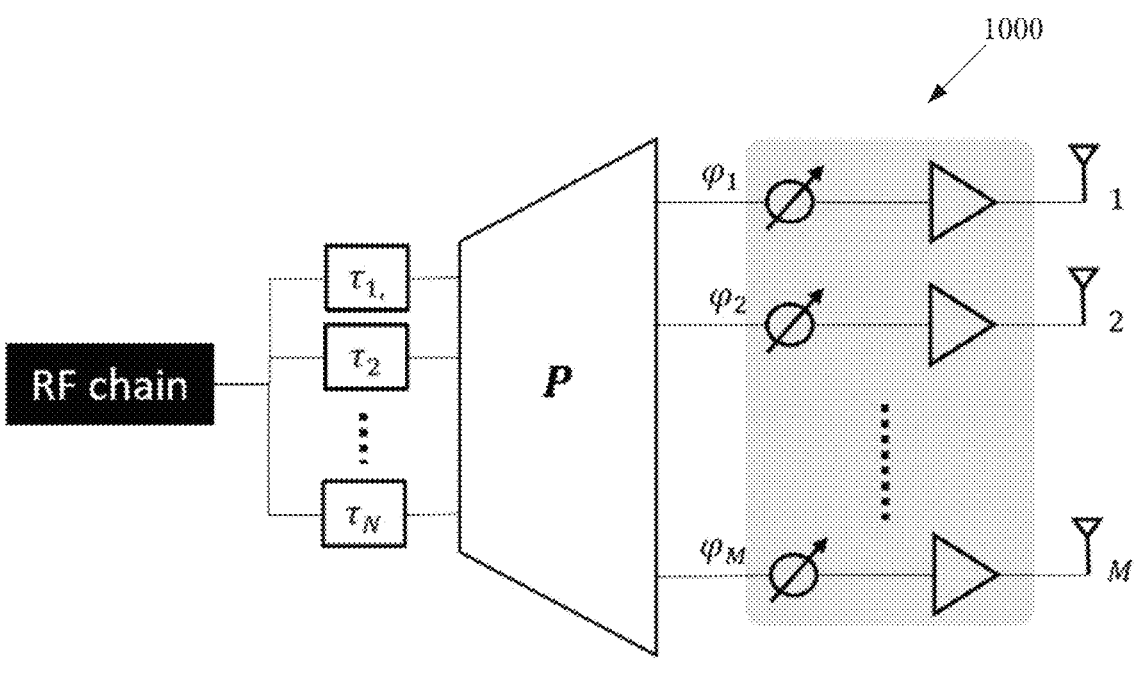
FIG. 10 illustrates an examples of JPTA antenna architecture according to embodiments of the present disclosure.

FIG. 10 illustrates an examples of JPTA antenna architecture 1000 according to embodiments of the present disclosure. An embodiment of the JPTA antenna architecture 1000 shown in FIG. 10 is for illustration only.

As illustrated in FIG. 10, P is a fixed M×N mapping matrix, where each row m has one non-zero entry and determines which of the N TTDs antenna m is connected to. The TTDs are assumed to be configurable, with a delay variation range of $0 \le \tau \le \kappa/W$, where $\kappa$ is a design parameter to be selected. The phase-shifters are assumed to have unit magnitude and have arbitrarily reconfigurable phase $-\pi \le \phi < \pi$. Transmission in both uplink and downlink directions is performed using OFDM with K subcarriers indexed as $$K = \left\{ \left\lfloor \frac{1-K}{2} \right\rfloor, \dots, \left\lfloor \frac{K-1}{2} \right\rfloor \right\}.$$

Then, the M×1 downlink TX signal on sub-carrier k∈K for a representative OFDM symbol can be expressed as:

$$x_k = \frac{1}{\sqrt{M}} \begin{bmatrix} e^{j\varphi_1} & \cdots & 0 \\ \vdots & \ddots & \vdots \\ 0 & \cdots & e^{j\varphi_M} \end{bmatrix} P \begin{bmatrix} e^{j2\pi f_k \tau_1} \\ \vdots \\ e^{j2\pi f_k \tau_N} \end{bmatrix} \alpha_k s_k = TP d_k \alpha_k s_k$$

where $s_k$ and $\alpha_k$ are the scalar data and digital beamforming on the k-th subcarrier, $f_k$ is the frequency of the k-th sub-carrier (including the carrier frequency), $\tau_n$ is the delay of the n-th TTD and $\phi_m$ is the phase of the m phase-shifter connected to the m-th antenna. Note that from the equation above the total transmit power of the BS can be given by $P_{sum} = \Sigma_{k \in K} |\alpha_k|^2$.

Note that for this JPTA architecture, the effective downlink unit-norm analog beamformer on sub-carrier k is $e_k = TP d_k$, where the M×M diagonal matrix T captures the effect of phase-shifters and the N×1 vector $d_k$ captures the effect of TTDs. It can be shown that the same beamformer is also applicable at the BS for uplink scenario.

Figure 11:
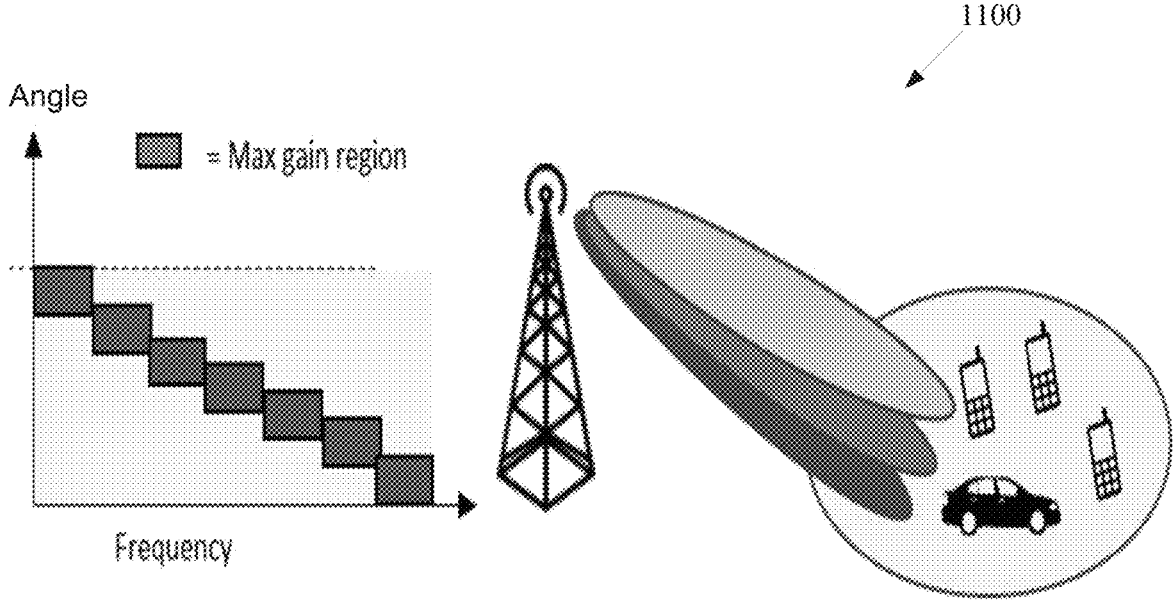
FIG. 11 illustrates an example of JPTA based beamforming according to embodiments of the present disclosure.

FIG. 11 illustrates an example of JPTA based beamforming 1100 according to embodiments of the present disclosure. An embodiment of the JPTA based beamforming 1100 shown in FIG. 11 is for illustration only.

In one example behavior of JPTA beamforming, the maximum gain region of the beam sweeps over an angle range as the signal frequency varies. At any signal frequency f, the desired beam creates the maximum possible array-gain in one angular direction $\theta(f)$. As f varies linearly over the system bandwidth, the angular direction $\theta(f)$ also sweeps linearly over a certain angular region $[\theta_0 - \Delta\theta/2, \theta_0 + \Delta\theta/2]$, as shown in FIG. 11. In this disclosure, it may be assumed that such behavior of JPTA beamforming, however it should be noted that the embodiments in this disclosure can be applied to other behaviors of JPTA beamforming as well.

It is evident that when JPTA beamforming implementation is utilized, a significant departure from analog-based beam management occurs. That is, while some beam management uses that one analog beam applies for the entire system bandwidth or bandwidth part, JPTA beamforming implementation allows the system to use different analog beams for different parts of the system bandwidth or bandwidth part—which amounts to "frequency-selective" beam management (FSBM). Therefore, there is a need for enabling frequency-selective beam management operation wherein different analog beams (associated with TCI states, source RS resources, and/or measurement RS resources) can be utilized for different parts/portions of the system bandwidth or bandwidth parts.

A UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency sub-bands. The UE could be indicated by the network that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM.

In one example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. The UE could be configured by the network, e.g., in a CSI resource setting provided by CSI-ResourceConfig, a CSI resource set (e.g., provided by CSI-SSB-ResourceSet or NZP-CSI-RS-ResourceSet) comprising $K \geq 1$ CSI-RS resources (e.g., SSB resources or NZP CSI-RS resources) for FSBM. In particular, the k-th CSI-RS resource in the resource set could correspond to a set of $N_k \geq 1$ beams (and therefore, the corresponding set of $N_k \geq 1$ frequency subbands), where $k=1, \ldots, K$. In the present disclosure, the set of $N_k \geq 1$ frequency-selective beams can also be referred to as a frequency-selective multi-beam.

For example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. For a CSI-RS resource configured in the resource set, the UE could be indicated/configured by the network the corresponding/associated TTD setting; this indication/configuration could be via higher layer RRC signaling (e.g., indicated/configured in the same CSI resource setting provided by CSI-ResourceConfig) and/or MAC CE command and/or dynamic DCI based signaling. In the present disclosure, the TTD setting could comprise at least one of the following examples.

In one example, one or more of the TTD delays and/or indexes of the one or more of the TTD delays among all the TTD delays for the CSI-RS resource and/or $N_k$: for the k-th $(k=1, \ldots, K)$ CSI-RS resource configured in the resource set, the corresponding $N_k$ TTD delays are $\tau_{1,k}, \tau_{2,k}, \ldots, \tau_{Nk,k}$ (depicted in FIG. 10).

In one example, a reference TTD delay $\tau_0$ and/or one or more scaling factors for one or more of the TTD delays with respect to the reference TTD delay $\tau_0$ and/or indexes of the one or more of the TTD delays among all the TTD delays for the CSI-RS resource and/or $N_k$: for the k-th $(k=1, \ldots, K)$ CSI-RS resource configured in the resource set, the corresponding $N_k$ TTD delays are $\tau_{1,k}, \tau_{2,k}, \ldots, \tau_{Nk,k}$ (depicted in FIG. 10). For this case, a set of scaling factors $\{\alpha_{1,k}, \alpha_{2,k}, \ldots, \alpha_{Nk,k}\}$ for the $N_k$ TTD delays could be determined as $\{\tau_{1,k}/\tau_0, \tau_{2,k}/\tau_0, \ldots, \tau_{Nk,k}/\tau_0\}$.

In one example, a reference TTD delay and/or the index of the reference TTD delay among all the TTD delays for the CSI-RS resource and/or one or more scaling factors for one or more of the TTD delays with respect to the reference TTD delay and/or indexes of the one or more of the TTD delays among all the TTD delays for the CSI-RS resource and/or $N_k$: for the k-th $(k=1, \ldots, K)$ CSI-RS resource configured in the resource set, the corresponding $N_k$ TTD delays are $\tau_{1,k}, \tau_{2,k}, \ldots, \tau_{Nk,k}$ (depicted in FIG. 10). If the reference TTD delay corresponds to $\tau_{1,k}$, a set of scaling factors $\{\alpha_{1,k}, \alpha_{2,k}, \ldots, \alpha_{Nk,k}\}$ for the $N_k$ TTD delays could be determined as $\{1, \tau_{2,k}/\tau_{1,k}, \ldots, \tau Nk,k/\tau_{1,k}\}$.

In one example, a reference TTD delay $\tau_0$ and/or differences between one or more of the TTD delays and the reference TTD delay and/or indexes of the one or more of the TTD delays among all the TTD delays for the CSI-RS resource and/or $N_k$: for the k-th $(k=1, \ldots, K)$ CSI-RS resource configured in the resource set, the corresponding $N_k$ TTD delays are $\tau_{1,k}, \tau_{2,k}, \ldots, \tau_{Nk,k}$ (depicted in FIG. 10). For this case, a set of differences $\{d_{1,k}, d_{2,k}, \ldots, d_{Nk,k}\}$ between the $N_k$ TTD delays and the reference TTD delay $\tau_0$ could be determined as $\{\tau_{1,k}-\tau_0, \tau_{2,k}-\tau_0, \ldots, \tau_{Nk,k}-\tau_0\}$.

In one example, a reference TTD delay and/or the index of the reference TTD delay among all the TTD delays for the CSI-RS resource and/or differences between one or more of the TTD delays and the reference TTD delay and/or indexes of the one or more of the TTD delays among all the TTD delays for the CSI-RS resource and/or $N_k$: for the k-th $(k=1, \ldots, K)$ CSI-RS resource configured in the resource set, the corresponding $N_k$ TTD delays are $\tau_{1,k}, \tau_{2,k}, \ldots, \tau_{Nk,k}$ (depicted in FIG. 10). If the reference TTD delay corresponds to $\tau_{1,k}$, a set of differences $\{d_{1,k}, d_{2,k}, \ldots, d_{Nk,k}\}$ for the $N_k$ TTD delays could be determined as $\{0, \tau_{2,k}-\tau_{1,k}, \ldots, \tau_{Nk,k}-\tau_{1,k}\}$.

In one example, a reference TTD delay and/or the index of the reference TTD delay among all the TTD delays for the CSI-RS resource and/or the common difference between any two adjacent TTD delays and/or indexes of the one or more of the TTD delays among all the TTD delays for the CSI-RS resource and/or $N_k$: for the k-th $(k=1, \ldots, K)$ CSI-RS resource configured in the resource set, the corresponding $N_k$ TTD delays are $\tau_{1,k}, \tau_{2,k}, \ldots, \tau_{Nk,k}$ (depicted in FIG. 10). If $\tau_{j,k}-\tau_{i,k}=\Delta_k$ for all $j-i=1$, j, $i \in \{1, \ldots, N_k\}$, the common difference between any two adjacent TTD delays is $\Delta k$.

In one example, a reference TTD delay and/or the index of the reference TTD delay among all the TTD delays for the CSI-RS resource and/or the common scaling factor between any two adjacent TTD delays and/or indexes of the one or more of the TTD delays among all the TTD delays for the CSI-RS resource and/or $N_k$: for the k-th $(k=1, \ldots, K)$ CSI-RS resource configured in the resource set, the corresponding $N_k$ TTD delays are $\tau_{1,k}, \tau_{2,k}, \ldots, \tau_{Nk,k}$ (depicted in FIG. 10). If $\tau_{j,k}/\tau_{i,k}=\beta_k$ for all $j-i=1$, j, $i \in \{1, \ldots, N_k\}$, the common scaling factor between any two adjacent TTD delays is $\beta_k$.

There are various means to indicate/configure K TTD settings, e.g., in a CSI resource setting/CSI resource set, and associate/map them to the K CSI-RS resources indicated/configured in the CSI resource setting/CSI resource set for FSBM.

For example, the set of K TTD settings could be explicitly indicated/included in the CSI resource setting provided by CSI-ResourceConfig and/or the CSI resource set (e.g., provided by CSI-SSB-ResourceSet or NZP-CSI-RS-Resource-Set) and/or the higher layer parameter that configures/provides resource allocation for a CSI-RS resource (e.g., CSI-RS-ResourceMapping or CSI-FrequencyOccupation) and/or one or more MAC CE commands and/or one or more DCIs (e.g., via one or more new DCI fields or repurposing one or more bits/codepoints of one or more existing DCI fields); e.g., the K TTD settings are one-to-one mapped to the K CSI-RS resources indicated/configured in the same CSI resource setting/CSI resource set such that the first TTD setting is associated/mapped to the first CSI-RS resource, the second TTD setting is associated/mapped to the second CSI-RS resource, and so on, and the K-th TTD setting is associated/mapped to the K-th CSI-RS resource.

For another example, the set of K TTD settings could be explicitly indicated/included in the CSI resource setting provided by CSI-ResourceConfig and/or the CSI resource set (e.g., provided by CSI-SSB-ResourceSet or NZP-CSI-RS-ResourceSet) and/or the higher layer parameter that configures/provides resource allocation for a CSI-RS resource (e.g., CSI-RS-ResourceMapping or CSI-FrequencyOccupation) and/or one or more MAC CE commands and/or one or more DCIs (e.g., via one or more new DCI fields or repurposing one or more bits/codepoints of one or more existing DCI fields); furthermore, the UE could be indicated/configured/provided by the network, via higher layer RRC signaling/parameter and/or MAC CE command and/or dynamic DCI based signaling, the association/mapping between the K TTD settings and the K CSI-RS resources indicated/configured, e.g., in the same CSI resource setting/CSI resource set.

Yet for another example, the higher layer parameter that configures a CSI-RS resource (e.g., NZP-CSI-RS-Resource) or the higher layer parameter that configures/provides resource allocation for a CSI-RS resource (e.g., CSI-RS-ResourceMapping or CSI-FrequencyOccupation) could explicitly indicate/include the associated/corresponding TTD setting as discussed above.

Yet for another example, a MAC CE command could indicate a TTD setting for a CSI-RS resource. For this case, the corresponding CSI-RS resource ID could be included/provided in the MAC CE command.

Yet for another example, a MAC CE command could indicate the K TTD settings each for a CSI-RS resource configured/indicated in a CSI resource set for FSBM. The set of K TTD settings provided in the MAC CE command are one-to-one mapped to the K CSI-RS resources indicated/configured in the CSI resource setting/CSI resource set such that the first TTD setting in the MAC CE command could be associated/mapped to the first CSI-RS resource, the second TTD setting in the MAC CE command could be associated/mapped to the second CSI-RS resource, and so on, and the K-th TTD setting in the MAC CE command could be associated/mapped to the K-th CSI-RS resource.

Alternatively, the UE could be indicated/configured/provided by the network, via higher layer RRC signaling/parameter and/or MAC CE command and/or dynamic DCI based signaling, the association/mapping between the K TTD settings in the MAC CE command and the K CSI-RS resources indicated/configured in the CSI resource set. For this example, the MAC CE command could also include/provide/indicate one or more (e.g., K) CSI-RS resource IDs/indexes each corresponding/associated to one of the (e.g., K) TTD settings.

Yet for another example, one or more new DCI fields could be introduced in a DCI format to indicate one or more of the K TTD settings. Alternatively, one or more bits or codepoints of one or more existing DCI fields in a DCI format could be repurposed to indicate one or more of the K TTD settings. The TTD setting(s) indicated in the DCI and the CSI-RS resource(s) indicated/configured for FSBM could be one-to-one mapped following those specified in the above discussed design examples.

Yet for another example, one or more of the above described design examples can be combined to indicate/configure one or more of the K TTD settings, and associate/map them to one or more of the K CSI-RS resources.

For another example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. For a CSI-RS resource configured in the resource set for FSBM, the UE could be indicated/configured by the network the corresponding/associated frequency subbands including their bandwidths/sizes, starting RBs and etc.; this indication/configuration could be via higher layer RRC signaling (e.g., indicated/configured in the same CSI resource setting/set provided by CSI-ResourceConfig/CSI-SSB-ResourceSet/NZP-CSI-RS-ResourceSet) and/or MAC CE command and/or dynamic DCI based signaling. There are various means to indicate/configure the frequency subbands corresponding/associated to the CSI-RS resource.

For example, the higher layer parameter that configures a CSI-RS resource (e.g., the k-th CSI-RS resource in the resource set), e.g., NZP-CSI-RS-Resource, could indicate/include $N_k$ CSI-RS resource mapping configurations each for a frequency subband. A CSI-RS resource mapping configuration (e.g., provided by CSI-RS-ResourceMapping) could contain/comprise at least a frequency subband index, a frequency domain allocation of REs for a frequency subband (e.g., provided by frequencyDomainAllocation) and a frequency domain allocation of RBs for a frequency subband (e.g., provided by CSI-FrequencyOccupation).

The frequency domain allocation of RBs for a frequency subband could contain/comprise at least a starting RB (provided by startingRB) and a number of PRBs (provided by nrofRBs) across which the corresponding frequency subband spans. For this case, the higher layer parameter NZP-CSI-RS-Resource that indicates/provides the $N_k$ CSI-RS resource mapping configurations could also include/provide/indicate the $N_k$ frequency subband indexes each associated/mapped to a CSI-RS resource mapping configuration indicated/configured therein.

Alternatively, one or more of the above discussed $N_k$ CSI-RS resource mapping configurations could be indicated in one or more DCIs, via one or more new DCI fields or by repurposing one or more bits/codepoints of one or more existing DCI fields in the DCI(s). Optionally, one or more of the above discussed $N_k$ CSI-RS resource mapping configurations could be indicated/provided/included in one or more MAC CE commands; for this case, a MAC CE command could also include/indicate/provide the corresponding CSI- RS resource ID and/or frequency subband index(es). The $N_k$ CSI-RS resource mapping configurations discussed above and the $N_k$ frequency subbands for the k-th CSI-RS resource in the resource set could be one-to-one mapped; for instance, the first CSI-RS resource mapping configuration could correspond to the first frequency subband, the second CSI-RS resource mapping configuration could correspond to the second frequency subband, and so on, and the $N_k$-th CSI-RS resource mapping configuration could correspond to the $N_k$-th frequency subband.

Alternatively, the UE could be indicated/provided by the network, e.g., via higher layer RRC signaling/parameter and/or MAC CE command and/or dynamic DCI based signaling, the mapping/association between the $N_k$ CSI-RS resource mapping configurations and the $N_k$ frequency subbands configured for the k-th CSI-RS resource in the CSI resource set for FSBM.

For another example, the higher layer parameter that provides a CSI-RS resource mapping configuration for a CSI-RS resource (e.g., the k-th CSI-RS resource in the resource set), e.g., CSI-RS-ResourceMapping, could indicate/include $N_k$ frequency domain allocations of REs each for a frequency subband and provided by frequencyDomain-Allocation. Furthermore, the CSI-RS resource mapping configuration provided by CSI-RS-ResourceMapping could also indicate/include $N_k$ frequency domain allocations of RBs each for a frequency subband and provided by CSI-FrequencyOccupation. Each frequency domain allocation of RBs for a frequency subband, and therefore, the corresponding higher layer parameter CSI-FrequencyOccupation, could contain/comprise at least a starting RB (provided by startingRB) and a number of PRBs (provided by nrofRBs) across which the corresponding frequency subband spans.

For this case, the higher layer parameter CSI-RS-ResourceMapping could also include/provide/indicate $N_k$ frequency subband indexes each associated/mapped to a frequency domain allocation of REs and/or a frequency domain allocation of RBs indicated/configured therein. Or the higher layer parameter frequencyDomainAllocation or CSI-FrequencyOccupation could provide/indicate/include a frequency subband index.

Alternatively, one or more of the above discussed $N_k$ frequency domain allocations of REs and/or one or more of the above discussed $N_k$ frequency domain allocations of RBs could be indicated in one or more DCIs, via one or more new DCI fields or by repurposing one or more bits/codepoints of one or more existing DCI fields in the DCI(s). Optionally, one or more of the above discussed $N_k$ frequency domain allocations of REs and/or one or more of the above discussed $N_k$ frequency domain allocations of RBs could be indicated/provided/included in one or more MAC CE commands; for this case, a MAC CE command could also include/indicate/provide the corresponding CSI-RS resource ID and frequency subband index(es). The $N_k$ frequency domain allocations of REs/RBs discussed above and the $N_k$ frequency subbands for the k-th CSI-RS resource in the resource set could be one-to-one mapped; for instance, the first frequency domain allocations of REs/RBs could correspond to the first frequency subband, the second frequency domain allocations of REs/RBs could correspond to the second frequency subband, and so on, and the $N_k$-th frequency domain allocations of REs/RBs could correspond to the $N_k$-th frequency subband.

Alternatively, the UE could be indicated/provided by the network, e.g., via higher layer RRC signaling/parameter and/or MAC CE command and/or dynamic DCI based signaling, the mapping/association between the $N_k$ frequency domain allocations of REs/RBs and the $N_k$ frequency subbands configured for the k-th CSI-RS resource in the CSI resource set for FSBM.

Yet for another example, the higher layer parameter frequencyDomainAllocation could indicate/include $N_k$ frequency domain allocations of REs each for a frequency subband. In addition, the higher layer parameter CSI-FrequencyOccupation could indicate/include $N_k$ frequency domain allocations of RBs each for a frequency subband. For instance, the higher layer parameter CSI-FrequencyOccupation could provide $N_k$ starting RBs each for a frequency subband and provided by startingRB, and/or $N_k$ nrofRBs' each providing the number of PRBs across which the corresponding frequency subband spans. For this case, the higher layer parameter frequencyDomainAllocation or CSI-FrequencyOccupation could also include/provide/indicate $N_k$ frequency subband indexes each associated/mapped to a frequency domain allocation of REs and/or a frequency domain allocation of RBs indicated/configured therein.

Alternatively, one or more of the above discussed $N_k$ frequency domain allocations of REs and/or one or more of the above discussed $N_k$ frequency domain allocations of RBs (including $N_k$ startingRB's and/or $N_k$ nrofRBs') could be indicated in one or more DCIs, via one or more new DCI fields or by repurposing one or more bits/codepoints of one or more existing DCI fields in the DCI(s).

Optionally, one or more of the above discussed $N_k$ frequency domain allocations of REs and/or one or more of the above discussed $N_k$ frequency domain allocations of RBs (including $N_k$ startingRB's and/or $N_k$ nrofRBs') could be indicated/provided/included in one or more MAC CE commands; for this case, a MAC CE command could also include/indicate/provide the corresponding CSI-RS resource ID and/or frequency subband index(es). The $N_k$ frequency domain allocations of REs/RBs (e.g., $N_k$ startingRB's and/or $N_k$ nrofRBs') discussed above and the $N_k$ frequency subbands for the k-th CSI-RS resource in the resource set could be one-to-one mapped; for instance, the first frequency domain allocations of REs/RBs (e.g., the first startingRB and/or the first nrofRBs) could correspond to the first frequency subband, the second frequency domain allocations of REs/RBs (e.g., the second startingRB and/or the second nrofRBs) could correspond to the second frequency subband, and so on, and the $N_k$-th frequency domain allocations of REs/RBs (e.g., the $N_k$-th startingRB and/or the $N_k$-th nrofRBs) could correspond to the $N_k$-th frequency subband.

Alternatively, the UE could be indicated/provided by the network, e.g., via higher layer RRC signaling/parameter and/or MAC CE command and/or dynamic DCI based signaling, the mapping/association between the $N_k$ frequency domain allocations of REs/RBs (e.g., $N_k$ startingRB's and/or $N_k$ nrofRBs') and the $N_k$ frequency subbands configured for the k-th CSI-RS resource in the CSI resource set for FSBM.

Yet for another example, the UE could receive from the network, via higher layer RRC signaling (e.g., in NZP-CSI-RS-Resource, CSI-RS-ResourceMapping or CSI-FrequencyOccupation) and/or MAC CE command and/or dynamic DCI based signaling, one or more bitmaps (e.g., $N_k$ bitmaps) each for a frequency subband corresponding/associated to the CSI-RS resource (e.g., the k-th CSI-RS resource in the resource set). Each bit position/entry in a bitmap could correspond to a PRB or PRB index among all the PRBs across which the corresponding CSI-RS resource spans. If a bit position/entry of a bitmap is set to "1" (or "0"), the corresponding PRB or PRB index is allocated for the frequency subband corresponding/associated to the bitmap. A bitmap for a frequency subband could contain/comprise more than one bit positions/entries set to "1" (or "0"). Different bitmaps for a CSI-RS resource could have the same bit position(s)/entry(s) set to "1" (or "0") meaning that different frequency subbands for a CSI-RS resource could be overlapped in frequency.

The higher layer parameter(s), e.g., NZP-CSI-RS-Resource, CSI-RS-ResourceMapping or CSI-FrequencyOccupation, that provides the one or more bitmaps could also include/provide/indicate $N_k$ frequency subband indexes each associated/mapped to a bitmap. If the frequency subband size/allocation for a CSI-RS resource (e.g., the one or more bitmaps discussed above) is indicated via one or more DCIs, one or more new DCI fields can be introduced to indicate the one or more bitmaps; alternatively, one or more bits/codepoints of one or more existing DCI fields could be repurposed to indicate the one or more bitmaps. If the frequency subband size/allocation for a CSI-RS resource (e.g., the one or more bitmaps discussed above) is indicated in one or more MAC CE commands, a MAC CE command could also indicate/provide/include the corresponding CSI-RS resource ID and/or frequency subband index(es). The $N_k$ bitmaps discussed above and the $N_k$ frequency subbands for the k-th CSI-RS resource in the resource set could be one-to-one mapped; for instance, the first bitmap could correspond to the first frequency subband, the second bitmap could correspond to the second frequency subband, and so on, and the $N_k$-th bitmap could correspond to the $N_k$-th frequency subband.

Alternatively, the UE could be indicated/provided by the network, e.g., via higher layer RRC signaling/parameter and/or MAC CE command and/or dynamic DCI based signaling, the mapping/association between the $N_k$ bitmaps and the $N_k$ frequency subbands configured for the k-th CSI-RS resource in the CSI resource set for FSBM.

Yet for another example, the UE could receive from the network, via higher layer RRC signaling (e.g., in NZP-CSI-RS-Resource, CSI-RS-ResourceMapping or CSI-FrequencyOccupation) and/or MAC CE command and/or dynamic DCI based signaling, a bitmap for one or more of the frequency subbands corresponding/associated to the CSI-RS resource (e.g., the k-th CSI-RS resource in the resource set). Each bit position/entry in the bitmap could correspond to a PRB or PRB index among all the PRBs across which the corresponding CSI-RS resource spans. Furthermore, each bit position/entry in the bitmap could be mapped/associated to a frequency subband for the CSI-RS resource. The mapping/association between the bit positions/entries in the bitmap and the frequency subbands for the CSI-RS resource could be fixed.

For instance, the bitmap can be partitioned into $N_k$ parts each comprising one or more bit positions/entries; for this case, the first part of the bitmap could correspond to the first frequency subband for the CSI-RS resource, the second part of the bitmap could correspond to the second frequency subband for the CSI-RS resource, and so on, and the $N_k$-th part of the bitmap could correspond to the $N_k$-th frequency subband for the CSI-RS resource; the UE could be provided/indicated/configured by the network, via higher layer RRC signaling and/or MAC CE command and/or dynamic DCI based signaling, how the bitmap is partitioned.

Alternatively, the UE could be provided/indicated/configured by the network, via higher layer RRC signaling and/or MAC CE command and/or dynamic DCI based signaling, the mapping/association between the bit positions/entries in the bitmap and the frequency subbands for the CSI-RS resource. If a bit position/entry of a bitmap is set to "1" (or "0"), the corresponding PRB or PRB index is allocated for the frequency subband corresponding/associated to the bit position/entry. A bitmap for a CSI-RS resource could contain/comprise more than one bit positions/entries set to "1" (or "0"). The higher layer parameter(s), e.g., NZP-CSI-RS-Resource, CSI-RS-ResourceMapping or CSI-FrequencyOccupation, that provides the bitmap could also include/provide/indicate $N_k$ frequency subband indexes each associated/mapped to one or more bit positions/entries (e.g., a part discussed above) in the bitmap.

If the frequency subband size/allocation for a CSI-RS resource (e.g., the bitmap discussed above) is indicated via one or more DCIs, one or more new DCI fields can be introduced to indicate the bitmap; alternatively, one or more bits/codepoints of one or more existing DCI fields could be repurposed to indicate the bitmap. If the frequency subband size/allocation for a CSI-RS resource (e.g., the bitmap discussed above) is indicated in one or more MAC CE command(s), a MAC CE command could also indicate/provide/include the corresponding CSI-RS resource ID and/or frequency subband index(es).

Yet for another example, the UE could receive from the network one or more MAC CE activation commands (e.g., $N_k$ MAC CE activation commands) each for a frequency subband corresponding/associated to the CSI-RS resource (e.g., the k-th CSI-RS resource in the resource set). Each MAC CE activation command could activate one or more PRBs or PRB indexes—from all the PRBs across which the corresponding CSI-RS resource spans—for the corresponding/associated frequency subband. For this case, each MAC CE activation command could include/provide indicate the corresponding CSI-RS resource ID and/or frequency subband index(es).

Yet for another example, the UE could receive from the network a MAC CE activation command activating one or more PRBs or PRB indexes—from all the PRBs across which the corresponding CSI-RS resource spans—for one or more of the frequency subbands corresponding/associated to a CSI-RS resource. For instance, for the k-th CSI-RS resource in the resource set, the MAC CE activation command could activate one or more PRBs or PRB indexes—from all the PRBs across which the corresponding CSI-RS resource spans—for the first frequency subband corresponding/associated to the CSI-RS resource, one or more PRBs or PRB indexes—from all the PRBs across which the corresponding CSI-RS resource spans—for the second frequency subband corresponding/associated to the CSI-RS resource, and so on, and one or more PRBs or PRB indexes—from all the PRBs across which the corresponding CSI-RS resource spans—for the $N_k$-th frequency subband corresponding/associated to the CSI-RS resource. For this case, the MAC CE activation command could include/provide/indicate the corresponding CSI-RS resource ID.

Yet for another example, the frequency subbands for the CSI-RS resource—e.g., the $N_k$ frequency subbands for the k-th CSI-RS resource in the resource set—could have the same bandwidth/size. For this case, the UE could be provided by the network, via higher layer RRC signaling (e.g., in NZP-CSI-RS-Resource, CSI-RS-ResourceMapping or CSI-FrequencyOccupation) and/or MAC CE command and/or dynamic DCI based signaling, a common frequency subband bandwidth/size (e.g., in number of PRBs) and/or $N_k$ and/or one or more starting RBs of one or more frequency subbands. In addition, the frequency subbands for the CSI-RS resource—e.g., the $N_k$ frequency subbands for the k-th CSI-RS resource in the resource set—could equally divide the total PRBs across which the corresponding CSI-RS resource spans. For this case, the UE could be provided by the network, via higher layer RRC signaling (e.g., in NZP-CSI-RS-Resource, CSI-RS-ResourceMapping or CSI-FrequencyOccupation) and/or MAC CE command and/or dynamic DCI based signaling, $N_k$ and/or one or more starting RBs of one or more frequency subbands.

Yet for another example, the higher layer parameter that configures a CSI resource set for FSBM, e.g., CSI-SSB-ResourceSet or NZP-CSI-RS-ResourceSet, could include/indicate K sets of frequency domain resource allocation parameters each corresponding/associated to a CSI-RS resource configured therein. A set of frequency domain resource allocation parameters could comprise at least one or more (e.g., $N_k$) frequency domain allocations of REs (e.g., each provided by frequencyDomainAllocation) for one or more frequency subbands corresponding/associated to a CSI-RS resource (e.g., the k-th CSI-RS resource in the resource set) and one or more (e.g., $N_k$) frequency domain allocations of RBs (e.g., each provided by CSI-FrequencyOccupation, which comprises at least a starting RB provided by startingRB and the number of PRBs provided by nrofRBs across which the corresponding frequency subband spans) for one or more frequency subbands corresponding/associated to a CSI-RS resource (e.g., the k-th CSI-RS resource in the resource set).

In one example, the K sets of frequency domain resource allocation parameters and the K CSI-RS resources configured in the same CSI resource set are one-to-one mapped; for instance, the first set of frequency domain resource allocation parameters could correspond to the first CSI-RS resource in the CSI resource set, the second set of frequency domain resource allocation parameters could correspond to the second CSI-RS resource in the CSI resource set, and so on, and the K-th set of frequency domain resource allocation parameters could correspond to the K-th CSI-RS resource in the CSI resource set.

In another example, the UE could be indicated/provided by the network, e.g., via higher layer RRC signaling/parameter and/or MAC CE command and/or dynamic DCI based signaling, the mapping/association between the K sets of frequency domain resource allocation parameters and the K CSI-RS resources configured in the same CSI resource set. Optionally, the higher layer parameter(s), e.g., CSI-SSB-ResourceSet or NZP-CSI-RS-ResourceSet, that configures a CSI resource set and provides/indicates the K sets of frequency domain resource allocation parameters could also include/provide/indicate the K CSI-RS resource IDs/indexes each associated/mapped to a set of frequency domain resource allocation parameters discussed above.

Alternatively, one or more of the above discussed K sets of frequency domain resource allocation parameters could be indicated in one or more DCIs, via one or more new DCI fields or by repurposing one or more bits/codepoints of one or more existing DCI fields in the DCI(s). One or more of the above discussed K sets of frequency domain resource allocation parameters could also be indicated in one or more MAC CE commands; for this case, the MAC CE command(s) that provides/indicates the K sets of frequency domain resource allocation parameters could also include/provide/indicate the K CSI-RS resource IDs/indexes each associated/mapped to a set of frequency domain resource allocation parameters discussed above. For both MAC CE and DCI based indication of the K sets of frequency domain resource allocation parameters, the association/mapping between the MAC CE/DCI indicated K sets of frequency domain resource allocation parameters and the K CSI-RS resources configured in the same CSI resource set could follow those discussed above for the RRC based configuration/indication of the K sets of frequency domain resource allocation parameters.

Yet for another example, the higher layer parameter that configures a CSI resource setting comprising at least one CSI resource set for FSBM, e.g., CSI-ResourceConfig, could include/indicate K sets of frequency domain resource allocation parameters each corresponding/associated to a CSI-RS resource configured in the CSI resource set(s) for FSBM. A set of frequency domain resource allocation parameters could comprise at least one or more (e.g., $N_k$) frequency domain allocations of REs (e.g., each provided by frequencyDomainAllocation) for one or more frequency subbands corresponding/associated to a CSI-RS resource (e.g., the k-th CSI-RS resource in the resource set for FSBM) and one or more (e.g., $N_k$) frequency domain allocations of RBs (e.g., each provided by CSI-FrequencyOccupation, which comprises at least a starting RB provided by startingRB and the number of PRBs provided by nrofRBs across which the corresponding frequency subband spans) for one or more frequency subbands corresponding/associated to a CSI-RS resource (e.g., the k-th CSI-RS resource in the resource set for FSBM).

In one example, the K sets of frequency domain resource allocation parameters configured in the CSI resource setting and the K CSI-RS resources configured in the CSI resource set(s) for FSBM are one-to-one mapped; for instance, the first set of frequency domain resource allocation parameters in the CSI resource setting could correspond to the first CSI-RS resource in the CSI resource set(s) for FSBM, the second set of frequency domain resource allocation parameters in the CSI resource setting could correspond to the second CSI-RS resource in the CSI resource set(s) for FSBM, and so on, and the K-th set of frequency domain resource allocation parameters in the CSI resource setting could correspond to the K-th CSI-RS resource in the CSI resource set(s) for FSBM.

In another example, the UE could be indicated/provided by the network, e.g., via higher layer RRC signaling/parameter and/or MAC CE command and/or dynamic DCI based signaling, the mapping/association between the K sets of frequency domain resource allocation parameters in the CSI resource setting and the K CSI-RS resources configured in the CSI resource set(s) for FSBM. Optionally, the higher layer parameter(s), e.g., CSI-ResourceConfig, that configures a CSI resource setting and provides/indicates the K sets of frequency domain resource allocation parameters could also include/provide/indicate the K CSI-RS resource IDs/indexes each associated/mapped to a set of frequency domain resource allocation parameters discussed above.

Alternatively, one or more of the above discussed K sets of frequency domain resource allocation parameters could be indicated in one or more DCIs, via one or more new DCI fields or by repurposing one or more bits/codepoints of one or more existing DCI fields in the DCI(s). One or more of the above discussed K sets of frequency domain resource allocation parameters could also be indicated in one or more MAC CE commands; for this case, the MAC CE command(s) that provides/indicates the K sets of frequency domain resource allocation parameters could also include/provide/indicate the K CSI-RS resource IDs/indexes each associated/mapped to a set of frequency domain resource allocation parameters discussed above. For both MAC CE and DCI based indication of the K sets of frequency domain resource allocation parameters, the association/mapping between the MAC CE/DCI indicated K sets of frequency domain resource allocation parameters and the K CSI-RS resources configured in the CSI resource set(s) for FSBM could follow those discussed above for the RRC based configuration/indication of the K sets of frequency domain resource allocation parameters.

Yet for another example, the higher layer parameter that configures a CSI resource set for FSBM, e.g., CSI-SSB-ResourceSet or NZP-CSI-RS-ResourceSet, could include/indicate K sets of bitmaps with each set comprising one or more bitmaps for a CSI-RS resource (e.g., a set of $N_k$ bitmaps for the k-th CSI-RS resource in the resource set). In this example, the configuration/indication of the one or more bitmaps in a set, and the association/mapping between the one or more bitmaps in a set and the frequency subband(s) for the corresponding CSI-RS resource could follow those specified in examples in the present disclosure.

In one example, the K sets of bitmaps and the K CSI-RS resources configured in the same CSI resource set are one-to-one mapped; for instance, the first set of bitmaps could correspond to the first CSI-RS resource in the CSI resource set, the second set of bitmaps could correspond to the second CSI-RS resource in the CSI resource set, and so on, and the K-th set of bitmaps could correspond to the K-th CSI-RS resource in the CSI resource set.

In another example, the UE could be indicated/provided by the network, e.g., via higher layer RRC signaling/parameter and/or MAC CE command and/or dynamic DCI based signaling, the mapping/association between the K sets of bitmaps and the K CSI-RS resources configured in the CSI resource set. Optionally, the higher layer parameter(s), e.g., CSI-SSB-ResourceSet or NZP-CSI-RS-ResourceSet, that configures a CSI resource set and provides/indicates the K sets of bitmaps could also include/provide indicate the K CSI-RS resource IDs/indexes each associated/mapped to a set of bitmaps discussed above.

Alternatively, one or more of the above discussed K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI-RS resources configured in the same CSI resource set could follow those discussed above for the RRC based configuration/indication of the K sets of bitmaps.

Yet for another example, the higher layer parameter that configures a CSI resource setting comprising at least one CSI resource set for FSBM, e.g., CSI-ResourceConfig, could include/indicate K sets of bitmaps with each set comprising one or more bitmaps for a CSI-RS resource configured in the CSI resource set(s) for FSBM (e.g., a set of $N_k$ bitmaps for the k-th CSI-RS resource in the resource set). In this example, the configuration/indication of the one or more bitmaps in a set, and the association/mapping between the one or more bitmaps in a set and the frequency subband(s) for the corresponding CSI-RS resource could follow those specified in examples in the present disclosure.

In one example, the K sets of bitmaps in the CSI resource setting and the K CSI-RS resources configured in the CSI resource set(s) for FSBM are one-to-one mapped; for instance, the first set of bitmaps in the CSI resource setting could correspond to the first CSI-RS resource in the CSI resource set(s) for FSBM, the second set of bitmaps in the CSI resource setting could correspond to the second CSI-RS resource in the CSI resource set(s) for FSBM, and so on, and the K-th set of bitmaps in the CSI resource setting could correspond to the K-th CSI-RS resource in the CSI resource set(s) for FSBM.

In another example, the UE could be indicated/provided by the network, e.g., via higher layer RRC signaling/parameter and/or MAC CE command and/or dynamic DCI based signaling, the mapping/association between the K sets of bitmaps configured in the CSI resource setting and the K CSI-RS resources configured in the CSI resource set(s) for FSBM. Optionally, the higher layer parameter(s), e.g., CSI-ResourceConfig, that configures a CSI resource setting and provides/indicates the K sets of bitmaps could also include/provide/indicate the K CSI-RS resource IDs/indexes each associated/mapped to a set of bitmaps discussed above. Alternatively, one or more of the above discussed K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI-RS resources configured in the CSI resource set(s) for FSBM could follow those discussed above for the RRC based configuration/indication of the K sets of bitmaps.

Yet for another example, the higher layer parameter that configures a CSI resource set for FSBM, e.g., CSI-SSB-ResourceSet or NZP-CSI-RS-ResourceSet, could include/indicate K bitmaps each corresponding/associated to a CSI-RS resource configured therein. In this example, the configuration/indication of a bitmap, and the association/mapping between each bit position/entry in a bitmap and the frequency subband(s) for the corresponding CSI-RS resource could follow those specified in examples in the present disclosure.

In one example, the K bitmaps and the K CSI-RS resources configured in the same CSI resource set are one-to-one mapped; for instance, the first bitmap could correspond to the first CSI-RS resource in the CSI resource set, the second bitmap could correspond to the second CSI-RS resource in the CSI resource set, and so on, and the K-th bitmap could correspond to the K-th CSI-RS resource in the CSI resource set.

In another example, the UE could be indicated/provided by the network, e.g., via higher layer RRC signaling/parameter and/or MAC CE command and/or dynamic DCI based signaling, the mapping/association between the K bitmaps and the K CSI-RS resources configured in the CSI resource set. Optionally, the higher layer parameter(s), e.g., CSI-SSB-ResourceSet or NZP-CSI-RS-ResourceSet, that configures a CSI resource set and provides/indicates the K bitmaps could also include/provide/indicate the K CSI-RS resource IDs/indexes each associated/mapped to a bitmap discussed above.

Alternatively, one or more of the above discussed K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI-RS resources configured in the same CSI resource set could follow those discussed above for the RRC based configuration/indication of the K bitmaps.

Yet for another example, the higher layer parameter that configures a CSI resource setting comprising at least one CSI resource set for FSBM, e.g., CSI-ResourceConfig, could include/indicate K bitmaps each corresponding/associated to a CSI-RS resource configured in the CSI resource set(s) for FSBM. In this example, the configuration/indication of a bitmap, and the association/mapping between each bit position/entry in a bitmap and the frequency subband(s) for the corresponding CSI-RS resource could follow those specified in examples in the present disclosure.

In one example, the K bitmaps in the CSI resource setting and the K CSI-RS resources configured in the CSI resource set(s) for FSBM are one-to-one mapped; for instance, the first bitmap in the CSI resource setting could correspond to the first CSI-RS resource in the CSI resource set(s) for FSBM, the second bitmap in the CSI resource setting could correspond to the second CSI-RS resource in the CSI resource set(s) for FSBM, and so on, and the K-th bitmap in the CSI resource setting could correspond to the K-th CSI-RS resource in the CSI resource set(s) for FSBM.

In another example, the UE could be indicated/provided by the network, e.g., via higher layer RRC signaling/parameter and/or MAC CE command and/or dynamic DCI based signaling, the mapping/association between the K bitmaps configured in the CSI resource setting and the K CSI-RS resources configured in the CSI resource set(s) for FSBM. Optionally, the higher layer parameter(s), e.g., CSI-ResourceConfig, that configures a CSI resource setting and provides/indicates the K bitmaps could also include/provide indicate the K CSI-RS resource IDs/indexes each associated/ mapped to a bitmap discussed above.

Alternatively, one or more of the above discussed K bitmaps could be indicated in one or more DCIs, via one or more new DCI fields or by repurposing one or more bits/ codepoints of one or more existing DCI fields in the DCI(s). The association/mapping between the DCI indicated K bitmaps and the K CSI-RS resources configured in the CSI resource set(s) for FSBM could follow those discussed above for the RRC based configuration/indication of the K bitmaps.

Yet for another example, the UE could receive from the network a MAC CE command indicating/providing/including K sets of bitmaps with each set comprising one or more bitmaps for a CSI-RS resource configured in the CSI resource set(s) for FSBM (e.g., a set of $N_k$ bitmaps for the k-th CSI-RS resource in the resource set). In this example, the configuration/indication of the one or more bitmaps in a set, and the association/mapping between the one or more bitmaps in a set and the frequency subband(s) for the corresponding CSI-RS resource could follow those specified in examples in the present disclosure.

In one example, the K sets of bitmaps in the MAC CE command and the K CSI-RS resources configured in the CSI resource set(s) for FSBM are one-to-one mapped; for instance, the first set of bitmaps in the MAC CE command could correspond to the first CSI-RS resource in the CSI resource set(s) for FSBM, the second set of bitmaps in the MAC CE command could correspond to the second CSI-RS resource in the CSI resource set(s) for FSBM, and so on, and the K-th set of bitmaps in the MAC CE command could correspond to the K-th CSI-RS resource in the CSI resource set(s) for FSBM.

In another example, the UE could be indicated/provided by the network, e.g., via higher layer RRC signaling/parameter and/or MAC CE command and/or dynamic DCI based signaling, the mapping/association between the K sets of bitmaps configured in the MAC CE command and the K CSI-RS resources configured in the CSI resource set(s) for FSBM. Optionally, the MAC CE command that provides/ indicates the K sets of bitmaps could also include/provide/ indicate the K CSI-RS resource IDs/indexes each associated/ mapped to a set of bitmaps discussed above.

Yet for another example, a UE could receive from the network a MAC CE command indicating/providing/including K bitmaps each corresponding/associated to a CSI-RS resource configured in a CSI-RS resource set for FSBM. In this example, the configuration/indication of a bitmap, and the association/mapping between each bit position/entry in a bitmap and the frequency subband(s) for the corresponding CSI-RS resource could follow those specified in examples in the present disclosure.

In one example, the K bitmaps indicated in the MAC CE activation command and the K CSI-RS resources configured in the CSI resource set(s) for FSBM are one-to-one mapped; for instance, the first bitmap in the MAC CE command could correspond to the first CSI-RS resource in the CSI resource set(s) for FSBM, the second bitmap in the MAC CE command could correspond to the second CSI-RS resource in the CSI resource set(s) for FSBM, and so on, and the K-th bitmap in the MAC CE command could correspond to the K-th CSI-RS resource in the CSI resource set(s) for FSBM. In another example, the UE could be indicated/provided by the network, e.g., via higher layer RRC signaling/parameter and/or MAC CE command and/or dynamic DCI based signaling, the mapping/association between the K bitmaps in the MAC CE command and the K CSI-RS resources configured in the CSI resource set(s) for FSBM. Optionally, the MAC CE command that provides/indicates the K bitmaps could also include/provide/indicate the K CSI-RS resource IDs/indexes each associated/mapped to a bitmap discussed above.

Yet for another example, one or more of the above described design examples can be combined to indicate/ configure one or more frequency subbands for each of the K CSI-RS resources configured in the CSI RS resource set(s) for FSBM.

A UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. For a CSI-RS resource configured in the CSI resource set for FSBM, and therefore, the corresponding/associated frequency subbands (e.g., the $N_k$ frequency subbands for the k-th CSI-RS resource in the resource set) configured/indicated according to one or more of the above discussed design examples, the UE could be further indicated/configured/provided by the network, via higher layer RRC signaling/parameter and/or MAC CE command and/or dynamic DCI based signaling, one or more of the total configured/indicated frequency subbands (e.g., one or more of the $N_k$ frequency subbands for the k-th CSI-RS resource in the resource set) for FSBM on the corresponding CSI-RS resource.

For example, the UE could receive from the network, via higher layer RRC signaling/parameter and/or MAC CE command and/or dynamic DCI based signaling, a bitmap of length $N_k$ for the k-th CSI-RS resource in the resource set, where $k \in \{1, \ldots, K\}$. Each bit position/entry in the bitmap could correspond to a frequency subband corresponding/ associated to the k-th CSI-RS resource in the resource set. If a bit position/entry in the bitmap is set to "1" (or "0"), the corresponding frequency subband is used/active for FSBM on the corresponding/associated CSI-RS resource (the k-th CSI-RS resource in the resource set in this example). The bitmap could comprise more than one bit positions/entries set to "1" (or "0") indicating that more than one frequency subbands can be used/active for FSBM on the corresponding/associated CSI-RS resource.

The UE could receive at least one bitmap for each CSI-RS resource configured in the resource set for FSBM. For RRC based configuration, following examples can be provided.

In one example, the bitmap(s) corresponding/associated to a CSI-RS resource could be provided in the higher layer parameter NZP-CSI-RS-Resource that configures the CSI-RS resource, or CSI-RS-ResourceMapping/CSI-Frequency-Occupation that configures resource allocations for the CSI-RS resource.

In another example, the higher layer parameter that configures a CSI resource set for FSBM, e.g., NZP-CSI-RS-ResourceSet, could include/indicate a set of one or more (e.g., K) such bitmaps each corresponding/associated to a CSI-RS resource configured in the same CSI resource set. For example, the K bitmaps are one-to-one mapped to the K CSI-RS resources configured in the same CSI resource set; for instance, the first bitmap could correspond to the first CSI-RS resource in the resource set, the second bitmap could correspond to the second CSI-RS resource in the resource set, and so on, and the K-th bitmap could correspond to the K-th CSI-RS resource in the resource set. For another example, the UE could be provided/indicated by the network, via higher layer RRC signaling/parameter and/or MAC CE command and/or dynamic DCI based signaling, the mapping/association between the K bitmaps and the K CSI-RS resources indicated/configured in the same CSI resource set. Optionally, the higher layer parameter(s), e.g., CSI-SSB-ResourceSet/NZP-CSI-RS-ResourceSet, that configures a CSI resource set and provides the K bitmaps could also include/provide/indicate the K CSI-RS resource IDs/indexes each associated/mapped to a bitmap discussed above.

In yet another example, the higher layer parameter that configures a CSI resource setting comprising at least one CSI resource set for FSBM, e.g., CSI-ResourceConfig, could include/indicate a set of one or more (e.g., K) such bitmaps each corresponding/associated to a CSI-RS resource configured in the CSI resource set(s) for FSBM. For example, the K bitmaps provided in the CSI resource setting are one-to-one mapped to the K CSI-RS resources configured in the CSI resource set(s) for FSBM; for instance, the first bitmap in the resource setting could correspond to the first CSI-RS resource in the resource set, the second bitmap in the resource setting could correspond to the second CSI-RS resource in the resource set, and so on, and the K-th bitmap in the resource setting could correspond to the K-th CSI-RS resource in the resource set. For another example, the UE could be provided/indicated by the network, via higher layer RRC signaling/parameter and/or MAC CE command and/or dynamic DCI based signaling, the mapping/association between the K bitmaps indicated/configured in the CSI resource setting and the K CSI-RS resources indicated/configured in the CSI resource set(s) for FSBM. Optionally, the higher layer parameter(s), e.g., CSI-ResourceConfig, that configures a CSI resource setting and provides the K bitmaps could also include/provide/indicate the K CSI-RS resource IDs/indexes each associated/mapped to a bitmap discussed above.

For MAC CE based indication, following examples can be provided.

In one example, a MAC CE command could contain/comprise/include at least one bitmap corresponding/associated to a CSI-RS resource configured/indicated in the CSI resource set for FSBM. For this case, the MAC CE command could also contain/comprise/include the corresponding CSI-RS resource ID.

In another example, a MAC CE command could contain/comprise/include multiple (e.g., K) bitmaps each corresponding/associated to a CSI-RS resource configured/indicated in the CSI resource set for FSBM. For example, the K bitmaps provided in the MAC CE command are one-to-one mapped to the K CSI-RS resources configured in the CSI resource set(s) for FSBM; for instance, the first bitmap in the MAC CE command could correspond to the first CSI-RS resource in the resource set, the second bitmap in the MAC CE command could correspond to the second CSI-RS resource in the resource set, and so on, and the K-th bitmap in the MAC CE command could correspond to the K-th CSI-RS resource in the resource set. For another example, the UE could be provided/indicated by the network, via higher layer RRC signaling/parameter and/or MAC CE command and/or dynamic DCI based signaling, the mapping/association between the K bitmaps indicated/configured/provided in the MAC CE command and the K CSI-RS resources indicated/configured in the CSI resource set(s) for FSBM. Optionally, the MAC CE command that provides the K bitmaps could also include/provide/indicate the K CSI-RS resource IDs/indexes each associated/mapped to a bitmap discussed above.

For dynamic DCI based signaling, one or more new DCI fields can be introduced to indicate one or more of the bitmaps each indicating one or more frequency subbands for FSBM on the corresponding CSI-RS resource; alternatively, one or more bits/codepoints of one or more existing DCI fields could be repurposed to indicate one or more of the bitmaps each indicating one or more frequency subbands for FSBM on the corresponding CSI-RS resource.

For another example, the UE could receive from the network, via higher layer RRC signaling/parameter and/or MAC CE command and/or dynamic DCI based signaling, a set of one or more frequency subband indexes each determined from $\{1, \ldots, N_k\}$ for the k-th CSI-RS resource in the resource set, where $k \in \{1, \ldots, K\}$. For this case, the frequency subband(s) corresponding to the indicated/configured/provided frequency subband index(es) is used/active for FSBM on the corresponding/associated CSI-RS resource (the k-th CSI-RS resource in the resource set in this example).

The UE could receive at least one set of one or more frequency subband indexes for each CSI-RS resource configured in the resource set for FSBM. For RRC based configuration, following examples can be provided.

In one example, the set of one or more frequency subband indexes corresponding/associated to a CSI-RS resource could be provided in the higher layer parameter NZP-CSI-RS-Resource that configures the CSI-RS resource, or CSI-RS-ResourceMapping/CSI-FrequencyOccupation that configures resource allocations for the CSI-RS resource.

In another example, the higher layer parameter that configures a CSI resource set for FSBM, e.g., NZP-CSI-RS-ResourceSet, could include/indicate one or more sets (e.g., K) of one or more frequency subband indexes with each set corresponding/associated to a CSI-RS resource configured in the same CSI resource set. For example, the K sets of frequency subband index(es) are one-to-one mapped to the K CSI-RS resources configured in the same CSI resource set; for instance, the first set of one or more frequency subband indexes could correspond to the first CSI-RS resource in the resource set, the second set of one or more frequency subband indexes could correspond to the second CSI-RS resource in the resource set, and so on, and the K-th set of one or more frequency subband indexes could correspond to the K-th CSI-RS resource in the resource set.

For another example, the UE could be provided/indicated by the network, via higher layer RRC signaling/parameter and/or MAC CE command and/or dynamic DCI based signaling, the mapping/association between the K sets of frequency subband index(es) and the K CSI-RS resources indicated/configured in the same CSI resource set. Optionally, the higher layer parameter(s), e.g., CSI-SSB-Resource-Set/NZP-CSI-RS-ResourceSet, that configures a CSI resource set and provides the K sets of frequency subband indexes could also include/provide/indicate the K CSI-RS resource IDs/indexes each associated/mapped to a set of frequency subband indexes discussed above.

In yet another example, the higher layer parameter that configures a CSI resource setting comprising at least one CSI resource set for FSBM, e.g., CSI-ResourceConfig, could include/indicate one or more sets (e.g., K) of one or more frequency subband indexes with each set corresponding/associated to a CSI-RS resource configured in the CSI resource set(s) for FSBM. For example, the K sets of frequency subband index(es) configured in the resource setting are one-to-one mapped to the K CSI-RS resources configured in the CSI resource set(s) for FSBM; for instance, the first set of one or more frequency subband indexes in the resource setting could correspond to the first CSI-RS resource in the resource set, the second set of one or more frequency subband indexes in the resource setting could correspond to the second CSI-RS resource in the resource set, and so on, and the K-th set of one or more frequency subband indexes in the resource setting could correspond to the K-th CSI-RS resource in the resource set.

For another example, the UE could be provided/indicated by the network, via higher layer RRC signaling/parameter and/or MAC CE command and/or dynamic DCI based signaling, the mapping/association between the K sets of frequency subband index(es) indicated/configured in the CSI resource setting and the K CSI-RS resources indicated/configured in the CSI resource set(s) for FSBM. Optionally, the higher layer parameter(s), e.g., CSI-ResourceConfig, that configures a CSI resource setting and provides the K sets of frequency subband indexes could also include/provide/indicate the K CSI-RS resource IDs/indexes each associated/mapped to a set of frequency subband indexes discussed above.

For MAC CE based indication, following examples can be provided.

In one example, a MAC CE command could contain/comprise/include at least one set of frequency subband index(es) corresponding/associated to a CSI-RS resource configured/indicated in the CSI resource set for FSBM. For this case, the MAC CE command could also contain/comprise/include the corresponding CSI-RS resource ID.

In another example, a MAC CE command could contain/comprise/include multiple (e.g., K) sets of frequency subband index(es) each corresponding/associated to a CSI-RS resource configured/indicated in the CSI resource set for FSBM. For example, the K sets of frequency subband index(es) provided in the MAC CE command are one-to-one mapped to the K CSI-RS resources configured in the CSI resource set(s) for FSBM; for instance, the first set of one or more frequency subband indexes in the MAC CE command could correspond to the first CSI-RS resource in the resource set, the second set of one or more frequency subband indexes in the MAC CE command could correspond to the second CSI-RS resource in the resource set, and so on, and the K-th set of one or more frequency subband indexes in the MAC CE command could correspond to the K-th CSI-RS resource in the resource set. For another example, the UE could be provided/indicated by the network, via higher layer RRC signaling/parameter and/or MAC CE command and/or dynamic DCI based signaling, the mapping/association between the K sets of frequency subband index(es) indicated/configured/provided in the MAC CE command and the K CSI-RS resources indicated/configured in the CSI resource set(s) for FSBM. Optionally, the MAC CE command that provides the K sets of frequency subband indexes could also include/provide indicate the K CSI-RS resource IDs/indexes each associated/mapped to a set of frequency subband indexes discussed above.

For dynamic DCI based signaling, one or more new DCI fields can be introduced to indicate one or more of the sets of frequency subband index(es), wherein each set could indicate one or more frequency subbands for FSBM on the corresponding CSI-RS resource; alternatively, one or more bits/codepoints of one or more existing DCI fields in a DCI format could be repurposed to indicate one or more of the sets of frequency subband index(es), wherein each set could indicate one or more frequency subbands for FSBM on the corresponding CSI-RS resource.

Yet for another example, the UE could receive from the network one or more MAC CE activation commands each activating one or more of the frequency subbands configured/indicated for one or more CSI-RS resources, where the activated one or more frequency subbands are used/active for FSBM on the corresponding CSI-RS resource(s).

In one example, a MAC CE activation command could activate one or more of the frequency subbands configured/indicated for a CSI-RS resource, and the activated one or more frequency subbands are used/active for FSBM on the CSI-RS resource. For this case, the MAC CE activation command could also contain/comprise/include the corresponding CSI-RS resource ID.

In another example, a MAC CE activation command could activate multiple (e.g., K) sets of one or more frequency subbands with each set corresponding/associated to a CSI-RS resource configured/indicated in the CSI resource set for FSBM. For example, the MAC CE command could activate the first set of one or more frequency subbands from the frequency subbands indicated/configured for the first CSI-RS resource in the resource set, the second set of one or more frequency subbands from the frequency subbands indicated/configured for the second CSI-RS resource in the resource set, and so on, and the K-th set of one or more frequency subbands from the frequency subbands indicated/configured for the K-th CSI-RS resource in the resource set. For another example, the UE could be provided/indicated by the network, via higher layer RRC signaling/parameter and/or MAC CE command and/or dynamic DCI based signaling, the mapping/association between the K sets of frequency subbands activated by the MAC CE activation command and the K CSI-RS resources indicated/configured in the CSI resource set(s) for FSBM. A set of frequency subbands activated by the MAC CE activation command are used/active for FSBM on the corresponding CSI-RS resource. Optionally, the MAC CE activation command that activates the K sets of frequency subbands could also include/provide indicate the K CSI-RS resource IDs/indexes each associated/mapped to a set of activated frequency subbands.

Yet for another example: the higher layer parameter that configures a frequency subband for a CSI-RS resource (e.g., the k-th CSI-RS resource configured in the resource set)

could include/indicate/comprise an indicator. If the indicator is set to "enabled"/"on" or the like, the corresponding frequency subband is used/active for FSBM on the corresponding CSI-RS resource. Alternatively, the indicator could correspond to a one-big flag indicator. That is, if the one-bit flag indicator is set to "1" (or "0") or the like, the corresponding frequency subband is used/active for FSBM on the corresponding CSI-RS resource.

In another example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE could be configured by the network, e.g., in one or more CSI resource settings each provided by CSI-ResourceConfig, one or more CSI resource sets (e.g., each provided by CSI-SSB-ResourceSet or NZP-CSI-RS-ResourceSet) each comprising at least one CSI-RS resource (e.g., a SSB resource or NZP CSI-RS resource) for FSBM.

In particular, a CSI-RS resource for FSBM could correspond to one or more frequency-selective beams, and therefore, span across the corresponding one or more frequency subbands. The indication/configuration of the TTD settings, frequency subbands (in terms of their sizes and/or frequency domain resource allocations and/or etc.) for one or more CSI-RS resources, and the mapping/association between the TTD settings/frequency subbands and the CSI-RS resources could follow those specified in the design examples in the present disclosure (e.g., by replacing CSI resource set with CSI resource setting in one or more of these design examples). Furthermore, the activation/indication of one or more frequency subbands for FSBM on the corresponding CSI-RS resource could follow those specified in the design examples in the present disclosure (e.g., by replacing CSI resource set with CSI resource setting in one or more of these design examples).

In yet another example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. The UE could be configured by the network, e.g., in a CSI resource set provided by CSI-SSB-ResourceSet or NZP-CSI-RS-ResourceSet, a CSI resource subset/group comprising $K \geq 1$ CSI-RS resources (e.g., SSB resources or NZP CSI-RS resources) for FSBM. In particular, the k-th CSI-RS resource in the resource subset/group could correspond to a set of $N_k \geq 1$ frequency-selective beams (and therefore, span across the corresponding set of $N_k \geq 1$ frequency subbands), where k=1, . . . , K. In the present disclosure, the set of $N_k \geq 1$ frequency-selective beams can also be referred to as a frequency-selective multi-beam. The indication/configuration of the TTD settings, frequency subbands (in terms of their sizes and/or frequency domain resource allocations and/or etc.) for one or more CSI-RS resources, and the mapping/association between the TTD settings/frequency subbands and the CSI-RS resources could follow those specified in the design examples in the present disclosure (e.g., by replacing CSI resource set with CSI resource subset/group in one or more of these design examples).

Furthermore, the activation/indication of one or more frequency subbands for FSBM on the corresponding CSI-RS resource could follow those specified in the design examples in the present disclosure (e.g., by replacing CSI resource set with CSI resource subset/group in one or more of these design examples).

In yet another example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. The UE could be configured by the network, e.g., in one or more CSI resource sets each provided by CSI-SSB-ResourceSet or NZP-CSI-RS-ResourceSet, one or more CSI resource subsets/groups each comprising at least one CSI-RS resource (e.g., a SSB resource or NZP CSI-RS resource) for FSBM. In particular, a CSI-RS resource for FSBM could correspond to one or more frequency-selective beams (also referred to as a frequency-selective multi-beam), and therefore, span across the corresponding one or more frequency subbands.

The indication/configuration of the TTD settings, frequency subbands (in terms of their sizes and/or frequency domain resource allocations and/or etc.) for one or more CSI-RS resources, and the mapping/association between the TTD settings/frequency subbands and the CSI-RS resources could follow those specified in the design examples in the present disclosure (e.g., by replacing CSI resource set with CSI resource subset/group in one or more of these design examples). Furthermore, the activation/indication of one or more frequency subbands for FSBM on the corresponding CSI-RS resource could follow those specified in the design examples in the present disclosure (e.g., by replacing CSI resource set with CSI resource subset/group in one or more of these design examples).

A UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. As discussed above, a UE could be provided/indicated by the network, e.g., via higher layer RRC signaling/parameter and/or MAC CE command and/or dynamic DCI based signaling, that one or more CSI-RS resources (each corresponding to a SSB resource or a NZP CSI-RS resource) and/or one or more CSI resource subsets/groups (each comprising one or more CSI-RS resources) and/or one or more CSI resource sets (each comprising one or more CSI resource subsets/groups or one or more CSI-RS resources) and/or one or more CSI resource settings (each comprising one or more CSI resource sets or one or more CSI resource subsets/groups or one or more CSI-RS resources) are (configured) for frequency-selective beam measurement for FSBM.

That is, a CSI measurement setting could comprise/ configure/indicate/provide CSI resource settings and/or CSI resource sets and/or CSI resource subsets/groups and/or CSI-RS resources for beam measurements for both FSBM and BM (or, non-frequency-selective BM (non-FSBM)); a CSI resource setting could comprise/configure/indicate/provide CSI resource sets and/or CSI resource subsets/groups and/or CSI-RS resources for beam measurements for both FSBM and non-FSBM; a CSI resource set could comprise/ configure/indicate/provide CSI resource subsets/groups and/ or CSI-RS resources for beam measurements for both FSBM and non-FSBM; and a CSI resource subset/group could comprise/configure/indicate/provide CSI-RS resources for beam measurements for both FSBM and non-FSBM.

In one example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. The UE could be indicated/configured/provided by the network, via higher layer RRC signaling/parameter and/or MAC CE command and/or dynamic DCI based signaling, a bitmap to indicate RS resource(s) for frequency-selective beam measurement for FSBM.

For example, the higher layer parameter, e.g., CSI-MeasConfig, that configures a CSI measurement setting could provide/include/configure/indicate a bitmap with each bit position/entry of the bitmap corresponding to a CSI resource setting configured therein. If a bit position/entry of the bitmap is set to "1" (or "0"), the corresponding CSI resource setting (and therefore, the CSI resource sets and/or the CSI resource subsets/groups and/or CSI-RS resources configured therein) is for frequency-selective beam measurement for FSBM. Alternatively, the UE could receive in a MAC CE command/DCI format the bitmap; the MAC CE command/DCI format could also include/provide/comprise/ indicate the corresponding CSI measurement setting ID/index.

For another example, the higher layer parameter, e.g., CSI-ResourceConfig, that configures a CSI resource setting could provide/include/comprise a bitmap with each bit position/entry of the bitmap corresponding to a CSI resource set configured therein. If a bit position/entry of the bitmap is set to "1" (or "0"), the corresponding CSI resource set (and therefore, the CSI resource subsets/groups and/or CSI-RS resources configured therein) is for frequency-selective beam measurement for FSBM. Alternatively, the UE could receive in a MAC CE command/DCI format the bitmap; the MAC CE command/DCI format could also include/provide/ comprise/indicate the corresponding CSI resource setting ID/index.

Yet for another example, the higher layer parameter, e.g., CSI-SSB-ResourceSet/NZP-CSI-RS-ResourceSet, that configures a CSI resource set could provide include/comprise a bitmap with each bit position/entry of the bitmap corresponding to a CSI resource subset/group configured therein. If a bit position/entry of the bitmap is set to "1" (or "0"), the corresponding CSI resource subset/group (and therefore, the CSI-RS resources configured therein) is for frequency-selective beam measurement for FSBM. Alternatively, the UE could receive in a MAC CE command/DCI format the bitmap; the MAC CE command/DCI format could also include/provide/comprise/indicate the corresponding CSI resource set ID/index.

Yet for another example, the higher layer parameter, e.g., CSI-SSB-ResourceSet/NZP-CSI-RS-ResourceSet, that configures a CSI resource set could provide/include/comprise a bitmap with each bit position/entry of the bitmap corresponding to a CSI-RS resource configured therein. If a bit position/entry of the bitmap is set to "1" (or "0"), the corresponding CSI-RS resource (e.g., the corresponding SSB resource or NZP CSI-RS resource) is for frequency-selective beam measurement for FSBM. Alternatively, the UE could receive in a MAC CE command/DCI format the bitmap; the MAC CE command/DCI format could also include/provide/comprise/indicate the corresponding CSI resource set ID/index.

Yet for another example, the higher layer parameter, e.g., CSI-SSB-ResourceSubSet/NZP-CSI-RS-ResourceSubSet, that configures a CSI resource subset/group could provide/ include/comprise a bitmap with each bit position/entry of the bitmap corresponding to a CSI-RS resource configured therein. If a bit position/entry of the bitmap is set to "1" (or "0"), the corresponding CSI-RS resource (e.g., the corresponding SSB resource or NZP CSI-RS resource) is for frequency-selective beam measurement for FSBM. Alternatively, the UE could receive in a MAC CE command/DCI format the bitmap; the MAC CE command/DCI format could also include/provide/comprise/indicate the corresponding CSI resource subset/group ID/index.

In another example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. A UE could be indicated/configured/provided by the network, via higher layer RRC signaling/parameter and/or MAC CE command and/or dynamic DCI based signaling, a set of IDs/indexes to indicate RS resource(s) for frequency-selective beam measurement for FSBM.

For example, the higher layer parameter, e.g., CSI-MeasConfig, that configures a CSI measurement setting could provide/include/comprise a set of one or more CSI resource setting IDs/indexes. The CSI resource setting(s) (and therefore, the CSI resource sets and/or the CSI resource subsets/groups and/or CSI-RS resources configured therein) that corresponds to the CSI resource setting ID(s)/index(es) configured in the same CSI measurement setting is for frequency-selective beam measurement for FSBM. Alternatively, the UE could receive in a MAC CE command/DCI format the set of one or more CSI resource setting IDs/indexes; the MAC CE command/DCI format could also include/provide/comprise/indicate the corresponding CSI measurement setting ID/index.

For another example, the higher layer parameter, e.g., CSI-ResourceConfig, that configures a CSI resource setting could provide include/comprise a set of one or more CSI resource set IDs/indexes. The CSI resource set(s) (and therefore, the CSI resource subsets/groups and/or CSI-RS resources configured therein) that corresponds to the CSI resource set ID(s)/index(es) configured in the same CSI resource setting is for frequency-selective beam measurement for FSBM. Alternatively, the UE could receive in a MAC CE command/DCI format the set of one or more CSI resource set IDs/indexes; the MAC CE command/DCI format could also include/provide/comprise/indicate the corresponding CSI resource setting ID/index.

Yet for another example, the higher layer parameter, e.g., CSI-SSB-ResourceSet/NZP-CSI-RS-ResourceSet, that configures a CSI resource set could provide/include/comprise a set of one or more CSI resource subset/group IDs/indexes. The CSI resource subset(s)/group(s) (and therefore, the CSI-RS resources configured therein) that corresponds to the CSI resource subset/group ID(s)/index(es) configured in the same CSI resource subset/group is for frequency-selective beam measurement for FSBM. Alternatively, the UE could receive in a MAC CE command/DCI format the set of one or more CSI resource subset/group IDs/indexes; the MAC CE command/DCI format could also include/provide/comprise/indicate the corresponding CSI resource set ID/index.

Yet for another example, the higher layer parameter, e.g., CSI-SSB-ResourceSet/NZP-CSI-RS-ResourceSet, that configures a CSI resource set could provide/include/comprise a set of one or more CSI-RS resource IDs/indexes. The CSI-RS resource(s) (e.g., the corresponding SSB resource or NZP CSI-RS resource) that corresponds to the CSI-RS resource ID(s)/index(es) configured in the same CSI resource set is for frequency-selective beam measurement for FSBM. Alternatively, the UE could receive in a MAC CE command/DCI format the set of one or more CSI-RS resource IDs/indexes; the MAC CE command/DCI format could also include/provide/comprise/indicate the corresponding CSI resource set ID/index.

Yet for another example, the higher layer parameter, e.g., CSI-SSB-ResourceSubSet/NZP-CSI-RS-ResourceSubSet, that configures a CSI resource subset/group could provide/include/comprise a set of one or more CSI-RS resource IDs/indexes. The CSI-RS resource(s) (e.g., the corresponding SSB resource or NZP CSI-RS resource) that corresponds to the CSI-RS resource ID(s)/index(es) configured in the same CSI resource subset/group is for frequency-selective beam measurement for FSBM. Alternatively, the UE could receive in a MAC CE command/DCI format the set of one or more CSI-RS resource IDs/indexes; the MAC CE command/DCI format could also include/provide/comprise/indicate the corresponding CSI resource subset/group ID/index.

In yet another example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE could be indicated/configured/provided by the network, via higher layer RRC signaling/parameter and/or MAC CE command and/or dynamic DCI based signaling, an indicator to indicate RS resource(s) for frequency-selective beam measurement for FSBM.

For example, the higher layer parameter, e.g., CSI-MeasConfig, that configures a CSI measurement setting could provide/indicate/configure/include the indicator; if the indicator is set to "enabled"/"on" or the like, the CSI resource setting(s)—and therefore, the corresponding CSI resource set(s) and/or CSI resource subset(s)/group(s) and/or CSI-RS resource(s) configured therein—configured in the CSI measurement setting could be for frequency-selective beam measurement for FSBM. Alternatively, the indicator could correspond to a one-bit flag indicator; if the one-bit flag indicator is set to "1" (or "0") or the like, the CSI resource setting(s)—and therefore, the corresponding CSI resource set(s) and/or CSI resource subset(s)/group(s) and/or CSI-RS resource(s) configured therein—configured in the CSI measurement setting could be for frequency-selective beam measurement for FSBM.

For another example, the higher layer parameter, e.g., CSI-ResourceConfig, that configures a CSI resource setting could provide/indicate/configure/include the indicator; if the indicator is set to "enabled"/"on" or the like, the CSI resource set(s)—and therefore, the corresponding CSI resource subset(s)/group(s) and/or CSI-RS resource(s) configured therein—configured in the CSI resource setting could be for frequency-selective beam measurement for FSBM. Alternatively, the indicator could correspond to a one-bit flag indicator; if the one-bit flag indicator is set to "1" (or "0") or the like, the CSI resource set(s)—and therefore, the corresponding CSI resource set(s) and/or CSI resource subset(s)/group(s) and/or CSI-RS resource(s) configured therein—configured in the CSI resource setting could be for frequency-selective beam measurement for FSBM.

Yet for another example, the higher layer parameter, e.g., CSI-SSB-ResourceSet or NZP-CSI-RS-ResourceSet, that configures a CSI resource set could provide/indicate/configure/include the indicator; if the indicator is set to "enabled"/"on" or the like, the CSI resource subset(s)/group(s)—and therefore, the corresponding CSI-RS resource(s) configured therein—configured in the CSI resource set could be for frequency-selective beam measurement for FSBM. Alternatively, the indicator could correspond to a one-bit flag indicator; if the one-bit flag indicator is set to "1" (or "0") or the like, the CSI resource subset(s)/group(s)—and therefore, the corresponding CSI-RS resource(s) configured therein—configured in the CSI resource set could be for frequency-selective beam measurement for FSBM.

Yet for another example, the higher layer parameter, e.g., NZP-CSI-RS-Resource, that configures a CSI-RS resource could provide/indicate/configure/include the indicator; if the indicator is set to "enabled"/"on" or the like, the corresponding CSI-RS resource could be for frequency-selective beam measurement for FSBM. Alternatively, the indicator could correspond to a one-bit flag indicator; if the one-bit flag indicator is set to "1" (or "0") or the like, the corresponding CSI-RS resource could be for frequency-selective beam measurement for FSBM.

A UE could be indicated/configured by the network, e.g., via higher layer RRC signaling/parameter and/or MAC CE command and/or dynamic DCI based signaling, to report, in one or more CSI reports, frequency selective or frequency subband specific/dependent CSI/beam reporting metrics/quantities for FSBM.

In one example, the UE could receive from the network, e.g., in the CSI reporting setting provided by CSI-ResportConfig, a higher layer parameter, e.g., denoted by FrequencySelectiveReporting or FreqSelectiveBeamReporting, to turn on/off frequency selective or frequency subband specific/dependent CSI/beam reporting for FSBM. For instance, when the higher layer parameter (e.g., FrequencySelectiveReporting or FreqSelectiveBeamReporting) in the CSI reporting setting provided by CSI-ReportConfig is configured or set to "enabled," the UE could report, in one or more CSI reports, one or more frequency selective or frequency subband specific/dependent CSI/beam reporting metrics/quantities determined according to the measurement RS resource(s) configured for FSBM (according to those specified in examples in the present disclosure).

In another example, the UE could report, in one or more CSI reports, one or more frequency selective or frequency subband specific/dependent CSI/beam reporting metrics/quantities for FSBM if one or more RS resources are configured for frequency-selective beam measurement for FSBM (according to those specified in examples in the present disclosure).

Yet in another example, a new report quantity could be specified for frequency selective or frequency subband specific/dependent reporting for FSBM (e.g., the new report quantity could be denoted by "frequencySubband"). The UE could report, in one or more CSI reports, one or more frequency selective or frequency subband specific/dependent CSI/beam reporting metrics/quantities such as resource indicator(s) and/or beam metric(s) for one or more frequency subbands if the UE receives, in a CSI reporting setting provided by CSI-ReportConfig, the "reportQuantity" set to "frequencySubband."

Yet in another example, the UE could report, in one or more CSI reports, one or more frequency selective or frequency subband specific/dependent CSI/beam reporting metrics/quantities for FSBM if the UE is configured/indicated by the network that the (beam) measurement for FSBM is enabled—e.g., the UE receives, in a CSI resource setting provided by CSI-ResourceConfig, a higher layer parameter FreqSelectiveBeamMeasurement set to "enabled."

The UE could measure one or more CSI-RS resources (each for a frequency-selective multi-beam) configured in one or more CSI resource settings and/or CSI resource sets and/or CSI resource subsets/groups according to those specified in examples in the present disclosure. When the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, in one or more CSI reports, one or more frequency selective or frequency subband specific/dependent CSI/beam reporting metrics/quantities determined according to the measurement RS resource(s) configured for FSBM (according to those specified in examples in the present disclosure).

The UE could report in a CSI report information in one or more of the following examples (e.g., when the frequency selective or frequency subband specific/dependent reporting for FSBM is enabled/configured—as discussed in examples in the present disclosure).

In one example, a group of one (e.g., P=1) resource indicator (such as SSBRI/CRI) for a CSI-RS resource configured according to examples in the present disclosure for frequency-selective beam measurement for FSBM and/or one or more (e.g., M≥1) beam metrics (such as L1-RSRPs/L1-SINRs) each for a frequency subband configured for a CSI-RS resource configured according to examples in the present disclosure for frequency-selective beam measurement for FSBM. When the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, e.g., in the CSI report, the one or more frequency subbands (or a subset of all frequency subbands configured for the CSI-RS resource for frequency-selective beam measurement for FSBM) associated to the reported one or more beam metrics—for instance, in the CSI report, the first reported beam metric is associated to the first reported frequency subband, the second reported beam metric is associated to the second reported frequency subband, and so on. The UE could be configured/indicated/provided by the network, e.g., via higher layer RRC signaling and/or MAC CE command and/or dynamic DCI based signaling, one or more thresholds to determine the beam metric(s), and therefore, the corresponding frequency subband(s)/subset of frequency subband(s), to report.

For example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, e.g., in the CSI report, a set of one or more frequency subband indexes, each pointing to a frequency subband among all the frequency subbands configured for the corresponding CSI-RS resource for frequency-selective beam measurement for FSBM. Each frequency subband index in the set indicates/provides a frequency subband, from which a reported beam metric is derived/determined.

For another example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, e.g., in the CSI report, a bitmap with each bit position/entry in the bitmap corresponding to a frequency subband among all the frequency subbands configured for the corresponding CSI-RS resource for frequency-selective beam measurement for FSBM. If a bit position/entry of the bitmap is set to "1" (or "0"), the frequency subband corresponding/associated to the bit position/entry is indicated, from which a reported beam metric is derived/determined. The bitmap could have more than one bit positions/entries set to "1" (or "0") each indicating/providing a frequency subband associated/corresponding to a reported beam metric.

Yet for another example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could be indicated/configured by the network, e.g., via higher layer RRC signaling and/or MAC CE command and/or dynamic DCI based signaling, to use one or more of the above described design examples in the present disclosure to report the one or more frequency subbands (or a subset of all frequency subbands configured for the CSI-RS resource for frequency-selective beam measurement for FSBM) associated to the reported one or more beam metrics.

In one example, a group of one (e.g., P=1) resource indicator (such as SSBRI/CRI) for a CSI-RS resource configured according to examples in the present disclosure for frequency-selective beam measurement for FSBM and/or one or more (e.g., M≥1) beam metrics (such as L1-RSRPs/L1-SINRs) each for a subset of the frequency subbands (or a group of frequency subbands) configured for a CSI-RS resource according to examples in the present disclosure for frequency-selective beam measurement for FSBM. When the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, e.g., in the CSI report, the one or more subsets/groups of frequency subbands associated to the reported one or more beam metrics—for instance, in the CSI report, the first reported beam metric is associated to the first reported subset/group of frequency subbands, the second reported beam metric is associated to the second reported subset/group of frequency subbands, and so on. The UE could be configured/indicated/provided by the network, e.g., via higher layer RRC signaling and/or MAC CE command and/or dynamic DCI based signaling, one or more thresholds to determine the beam metric(s), and therefore, the corresponding subset(s)/group(s) of frequency subband(s), to report.

In one example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the CSI report could comprise one or more first CSI fields for reporting the first subset/group of frequency subbands in form of their indexes among all the frequency subbands configured for the corresponding CSI-RS resource for frequency-selective beam measurement for FSBM, one or more second CSI fields for reporting the second subset/group of frequency subbands in form of their indexes among all the frequency subbands configured for the corresponding CSI-RS resource for frequency-selective beam measurement for FSBM, and so on. The number of the one or more first CSI fields, the number of the one or more second CSI fields, and so on, could be fixed in a CSI report. Furthermore, the position(s) of the one or more first CSI fields in a CSI report, the position(s) of the one or more second CSI field(s) in a CSI report, and so on, could also be fixed.

In another example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the CSI report could comprise one or more first CSI fields for reporting the first subset/group of frequency subbands in form of a first bitmap, one or more second CSI fields for reporting the second subset/group of frequency subbands in form of a second bitmap, and so on. The number of the one or more first CSI fields, the number of the one or more second CSI fields, and so on, could be fixed in a CSI report.

Furthermore, the position(s) of the one or more first CSI fields in a CSI report, the position(s) of the one or more second CSI field(s) in a CSI report, and so on, could also be fixed. For this example, each bit position/entry of a bitmap could correspond to a frequency subband configured for a CSI-RS resource (e.g., the $n_k$-th frequency subband for the k-th CSI-RS resource with $n_k \in \{1, \ldots, N_k\}$) for frequency-selective beam measurement for FSBM. If a bit position/entry of a bitmap is set to "1" (or "0"), the frequency subband corresponding/associated to the bit position/entry is indicated/identified as a frequency subband in the subset/group of frequency subbands corresponding/associated to the bitmap.

Yet for another example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, e.g., in the CSI report, the number of subsets/groups of frequency subbands associated to the reported beam metrics. Furthermore, the UE could report, e.g., in the CSI report, the number of frequency subbands in one or more of the subsets/groups of frequency subbands.

Yet for another example, the UE could be first indicated/configured/provided by the network, e.g., via higher layer RRC signaling and/or MAC CE command and/or dynamic DCI based signaling, one or more subsets/groups of frequency subbands each comprising one or more frequency subbands among all the frequency subbands configured for the CSI-RS resource for frequency-selective beam measurement for FSBM. For this case, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could only report, e.g., in the CSI report, one or more beam metrics associated to the configured/indicated one or more subsets/groups of frequency subbands.

Yet for another example, the UE could be first indicated/configured/provided by the network, e.g., via higher layer RRC signaling and/or MAC CE command and/or dynamic DCI based signaling, one or more subsets/groups of frequency subbands each comprising one or more frequency subbands among all the frequency subbands configured for the CSI-RS resource for frequency-selective beam measurement for FSBM. When the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelective-BeamReporting, that can turn on/off frequency selective or frequency subband specific/dependent CSI/beam reporting for FSBM, is configured or set to "enabled," the UE could report, e.g., in the CSI report, indexes of the one or more subsets/groups of frequency subbands associated to the reported beam metrics among the configured/indicated one or more subsets/groups of frequency subbands.

Yet for another example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, e.g., in the CSI report, a set of one or more indexes with each entry in the set corresponding/associated to a frequency subband among all the frequency subbands configured for the CSI-RS resource for frequency-selective beam measurement for FSBM. If an entry in the set is set to an index of a subset/group of frequency subbands, the frequency subband corresponding/associated to the entry is identified/indicated as a frequency subband in the subset/group of frequency subbands whose index is identical to the entry value.

Yet for another example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could (be configured to) use one or more of the above discussed design examples in the present disclosure, to determine and report, e.g., in the CSI report, the one or more subsets/groups of frequency subbands corresponding/associated to the reported beam metrics.

In one example, one or more (e.g., up to $P \geq 1$) groups of resource indicators (such as SSBRIs/CRIs) and/or beam metrics (such as L1-RSRPs/L1-SINRs) with each group comprising one (e.g., P=1) resource indicator (such as SSBRI/CRI) for a CSI-RS resource configured according to examples in the present disclosure for frequency-selective beam measurement for FSBM and/or one or more (e.g., $M \geq 1$) beam metrics (such as L1-RSRPs/L1-SINRs) each for a frequency subband configured for a CSI-RS resource configured according to examples in the present disclosure for frequency-selective beam measurement for FSBM.

When the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could follow those specified in examples in the present disclosure to report, e.g., in the CSI report, the one or more frequency subbands (or a subset of all frequency subbands configured for the CSI-RS resource for frequency-selective beam measurement for FSBM) associated to the reported one or more beam metrics in each group.

In one example, one or more (e.g., up to $L \geq 1$) groups of resource indicators (such as SSBRIs/CRIs) and/or beam metrics (such as L1-RSRPs/L1-SINRs) with each group comprising one (e.g., P=1) resource indicator (such as SSBRI/CRI) for a CSI-RS resource configured according to examples in the present disclosure for frequency-selective beam measurement for FSBM and/or one or more (e.g., $M \geq 1$) beam metrics (such as L1-RSRPs/L1-SINRs) each for a subset of the frequency subbands (or a group of frequency subbands) configured for a CSI-RS resource according to examples in the present disclosure for frequency-selective beam measurement for FSBM.

When the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could follow those specified in examples in the present disclosure to report, e.g., in the CSI report, the one or more subsets/groups of frequency subbands associated to the reported one or more beam metrics in each group.

The UE could be indicated/configured by the network, e.g., via higher layer RRC signaling/parameter (e.g., in a CSI reporting setting provided by CSI-ReportConfig) and/or MAC CE command and/or dynamic DCI based signaling, to report, e.g., in a CSI report, the beam quantities such as resource indicator(s) (e.g., SSBRI(s)/CRI(s)) and/or beam metric(s) (e.g., L1-RSRP(s)/L1-SINR(s)) following those specified in examples in the present disclosure. For instance, the UE could receive from the network, e.g., in the CSI reporting setting provided by CSI-ResportConfig, a higher layer parameter, e.g., denoted by FrequencySelectiveReporting or FreqSelectiveBeamReporting set to "reportPerSubband" or "reportPerSubbandSet." For this case, when the higher layer parameter FrequencySelectiveReporting or FreqSelectiveBeamReporting is set to "reportPerSubband," the UE could report the beam quantities such as resource indicator(s) (e.g., SSBRI(s)/CRI(s)) and/or beam metric(s) (e.g., L1-RSRP(s)/L1-SINR(s)) and/or the corresponding/associated frequency subband information/configuration following those specified in examples in the present disclosure; when the higher layer parameter FrequencySelectiveReporting or FreqSelectiveBeamReporting is set to "reportPerSubbandSet," the UE could report the beam quantities such as resource indicator(s) (e.g., SSBRI(s)/CRI(s)) and/or beam metric(s) (e.g., L1-RSRP(s)/L1-SINR(s)) and/or the corresponding frequency subband information/configuration following those specified in examples in the present disclosure.

The UE could receive from the network, e.g., in the CSI reporting setting provided by CSI-ResportConfig, a higher layer parameter, e.g., denoted by groupBasedFrequencySelectiveReporting or groupBasedFreqSelectiveBeamReporting, to turn on/off the group based frequency-selective CSI/beam reporting for FSBM specified in examples in the present disclosure. For instance, when the higher layer parameter(s) groupBasedFrequencySelectiveReporting or groupBasedFreqSelectiveBeamReporting is configured or set to "enabled," the UE could report, e.g., in a CSI report, groups of beam quantities such as resource indicators (e.g., SSBRIs/CRIs) and/or beam metrics (e.g., L1-RSRPs/L1-SINRs) and/or the corresponding/associated frequency subband information/configuration following those specified in examples in the present disclosure.

Furthermore, the UE could be indicated/configured by the network, e.g., via higher layer RRC signaling/parameter (e.g., in a CSI reporting setting provided by CSI-ReportConfig) and/or MAC CE command and/or dynamic DCI based signaling, to report, e.g., in a CSI report, groups of beam quantities such as resource indicators (e.g., SSBRIs/CRIs) and/or beam metrics (e.g., L1-RSRPs/L1-SINRs) and/or the corresponding/associated frequency subband information/configuration following those specified in examples in the present disclosure. For instance, the UE could receive from the network, e.g., in the CSI reporting setting provided by CSI-ResportConfig, a higher layer parameter, e.g., denoted by groupBasedFrequencySelectiveReporting or groupBasedFreqSelectiveBeamReporting set to "reportPerSubband" or "reportPerSubbandSet."

For this case, when the higher layer parameter groupBasedFrequencySelectiveReporting or groupBasedFreqSelectiveBeamReporting is set to "reportPerSubband," the UE could report, e.g., in a CSI report, the groups of beam quantities such as resource indicators (e.g., SSBRIs/CRIs) and/or beam metrics (e.g., L1-RSRPs/L1-SINRs) and/or the corresponding/associated frequency subband information/configuration following those specified in examples in the present disclosure; when the higher layer parameter groupBasedFrequencySelectiveReporting or groupBasedFreqSelectiveBeamReporting is set to "reportPerSubbandSet," the UE could report, e.g., in a CSI report, the beam quantities such as resource indicators (e.g., SSBRIs/CRIs) and beam metrics (e.g., L1-RSRPs/L1-SINRs) and/or the corresponding frequency subband information/configuration following those specified in examples in the present disclosure.

As discussed/described in examples in the present disclosure, a UE could report, e.g., in a CSI report, more than one (i.e., M>1) beam metrics such as L1-RSRPs/L1-SINRs each for a frequency subband or a subset of the frequency subbands (or a group of frequency subbands) configured for a CSI-RS resource according to examples in the present disclosure for frequency-selective beam measurement for FSBM.

For example, the value/number of M or the maximum value/number of M (e.g., denoted by $M_{max}$) are fixed in the system specifications (e.g., M=2, 4, 8, 16, 32, and 64, and $M_{max}$=2, 4, 8, 16, 32, and 64).

For another example, the UE could be indicated/configured/provided by the network, e.g., via higher layer RRC signaling (e.g., in a CSI reporting setting provided by CSI-ReportConfig) and/or MAC CE command and/or dynamic DCI based signaling, the value/number of M or the maximum value/number of M (e.g., denoted by $M_{max}$).

Yet for another example, the value/number of M could correspond/equal to the number of frequency subbands or the number of subsets/groups of frequency subbands configured for the CSI-RS resource according to examples in the present disclosure for frequency-selective beam measurement for FSBM.

Yet for another example, the UE could autonomously determine the value/number of M, e.g., as the number of reporting frequency subbands determined/reported by the UE according to those specified in examples in the present disclosure or the number of reporting subset/group of frequency subbands determined/reported by the UE according to those specified in examples in the present disclosure. For this case, the UE could also report, e.g., in the CSI report, the value/number of M.

Based on the above discussed/described design examples, when the higher layer parameter, e.g., FrequencySelectiveReporting or FreqSelectiveBeamReporting, is configured and/or set to "enabled," "reportPerSubband" or "reportPerSubbandSet," and/or when the value/number of M—determined/configured according to examples in the present disclosure—is greater than one, the UE could use differential (RSRP/SINR) reporting for one or more of the beam metrics.

Differential RSRP reporting: the largest measured value of L1-RSRP is quantized to a 7-bit value in the range [−140, −44] dBm with 1 dB step size, and a differential L1-RSRP is quantized to a 4-bit value. The differential L1-RSRP value is computed with 2 dB step size with a reference to the largest measured L1-RSRP value which is part of the same L1-RSRP reporting instance.

Differential SINR reporting: the largest measured value of L1-SINR is quantized to a 7-bit value in the range [−23, −40] dBm with 0.5 dB step size, and a differential L1-SINR is quantized to a 4-bit value. The differential L1-SINR value is computed with 1 dB step size with a reference to the largest measured L1-SINR value which is part of the same L1-SINR reporting instance.

As discussed/described in examples in the present disclosure, a UE could report, e.g., in a CSI report, more than one groups (i.e., L>1) of resource indicators and/or beam metrics with each group comprising one or more (e.g., M≥1) beam metrics such as L1-RSRPs/L1-SINRs each for a frequency subband or a subset of the frequency subbands (or a group of frequency subbands) configured for a CSI-RS resource according to examples in the present disclosure for frequency-selective beam measurement for FSBM. The value/number of M and/or the maximum value/number of M, i.e., $M_{max}$, for each group could be determined/configured according to examples in the present disclosure. The value/number of L and/or the maximum value/number of L, e.g., denoted by $L_{max}$, could be determined/configured according to one or more of the following design examples.

For example, the value/number of L or the maximum value/number of L (i.e., $L_{max}$) are fixed in the system specifications (e.g., L=2, 4, 8, 16, 32, and 64, and $L_{max}$=2, 4, 8, 16, 32, and 64).

For another example, the UE could be indicated/configured/provided by the network, e.g., via higher layer RRC signaling (e.g., in a CSI reporting setting provided by CSI-ReportConfig) and/or MAC CE command and/or dynamic DCI based signaling, the value/number of L or the maximum value/number of L (i.e., $L_{max}$).

Yet for another example, the UE could autonomously determine the value/number of L. For this case, the UE could also report, e.g., in the CSI report, the value/number of L.

Based on the above discussed/described design examples, when the higher layer parameter, e.g., FrequencySelectiveReporting or FreqSelectiveBeamReporting, is configured and/or set to "enabled," "reportPerSubband" or "reportPerSubbandSet," and/or when the higher layer parameter, e.g., groupBasedFrequencySelectiveReporting or groupBasedFreqSelectiveBeamReporting, is configured and/or set to "enabled," "reportPerSubband" or "reportPerSubbandSet," and/or when the value/number of L—determined/configured according to examples in the present disclosure—is greater than one, and/or when the value/number of M—determined/configured according to examples in the present disclosure—is greater than one, the UE could use differential (RSRP/SINR) reporting for one or more of the beam metrics in each of the one or more of the reported groups.

In one example, the differential (RSRP/SINR) reporting is applied/enabled per reported group as shown in below examples.

In one example of differential RSRP reporting per reported group, the largest measured value of L1-RSRP in a reported group is quantized to a 7-bit value in the range [−140, −44] dBm with 1 dB step size, and a differential L1-RSRP in a reported group is quantized to a 4-bit value. The differential L1-RSRP value is computed with 2 dB step size with a reference to the largest measured L1-RSRP value which is part of the same reported group and L1-RSRP reporting instance.

In one example of differential SINR reporting per reported group, the largest measured value of L1-SINR in a reported group is quantized to a 7-bit value in the range [−23, −40] dBm with 0.5 dB step size, and a differential L1-SINR in a reported group is quantized to a 4-bit value. The differential L1-SINR value is computed with 1 dB step size with a reference to the largest measured L1-SINR value which is part of the same reported group and L1-SINR reporting instance.

In another example, the differential (RSRP/SINR) reporting is applied/enabled across one or more reported groups as shown in following examples.

In one example of differential RSRP reporting across one or more reported groups, the largest measured value of L1-RSRP in the one or more reported groups is quantized to a 7-bit value in the range [−140, −44] dBm with 1 dB step size, and a differential L1-RSRP in the one or more reported groups is quantized to a 4-bit value. The differential L1-RSRP value is computed with 2 dB step size with a reference to the largest measured L1-RSRP value in the one or more reported groups which is part of the same L1-RSRP reporting instance.

In one example of differential SINR reporting across one or more reported groups, the largest measured value of L1-SINR in the one or more reported groups is quantized to a 7-bit value in the range [−23, −40] dBm with 0.5 dB step size, and a differential L1-SINR in the one or more reported groups is quantized to a 4-bit value. The differential L1-SINR value is computed with 1 dB step size with a reference to the largest measured L1-SINR value in the one or more reported groups which is part of the same L1-SINR reporting instance.

Furthermore, the UE could be indicated/configured/provided by the network, e.g., via higher layer RRC signaling/ parameter (e.g., in a CSI reporting setting provided by CSI-ReportConfig) and/or MAC CE command and/or dynamic DCI based signaling, the differential (RSRP/SINR)

reporting format(s)—i.e., those specified in examples in the present disclosure—to use/apply for the frequency-selective beam reporting for FSBM. Alternatively, the UE could autonomously determine the differential (RSRP/SINR) reporting format(s) to use/apply—i.e., follow those specified in examples in the present disclosure; for this case, the UE could also indicate to the network, e.g., in part of the CSI report, the differential (RSRP/SINR) reporting format(s) applied/used at the UE side.

For the above discussed frequency subband (selective) reporting settings/formats, a UE could report, e.g., in the same CSI report, one or more report quantities (including one or more resource indicators, beam metrics, TTD delay estimates, frequency subband indexes and/or etc.) for FSBM and one or more report quantities (including resource indicators, beam metrics and/or etc.) for non-FSBM.

In one example, the UE could report, e.g., in the CSI report, a bitmap to indicate one or more reporting quantities for frequency-selective beam reporting for FSBM. Each bit position/entry of the bitmap could correspond to a reporting quantity in the same report. If a bit position/entry of the bitmap is set to "1" (or "0"), the corresponding reporting quantity (e.g., a resource indicator, a beam metric, a TTD delay estimate, a frequency subband index and/or etc.) is for the frequency-selective beam reporting for FSBM. Otherwise, if a bit position/entry of the bitmap is set to "0" (or "1"), the corresponding reporting quantity (e.g., a resource indicator, a beam metric and/or etc.) is for the non-FSBM beam reporting.

In another example, the UE could report, e.g., in the same CSI report, one or more report quantities determined according to the RS resource(s) configured for frequency-selective beam measurement for FSBM according to those specified in one or more of the design examples in the present disclosure and one or more report quantities determined according to the RS resource(s) configured for non-FSBM beam measurement according to those specified in one or more of the design examples in the present disclosure.

A UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM.

In yet another example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/pro vided in CSI-ResourceConfig to turn on/off the frequency-selective beam measurement for FSBM. The UE could be configured by the network, e.g., in a CSI resource setting provided by CSI-ResourceConfig, a CSI resource set (e.g., provided by CSI-SSB-ResourceSet or NZP-CSI-RS-ResourceSet) comprising one or more (e.g., K≥1) groups of CSI-RS resources (e.g., SSB resources or NZP CSI-RS resources) with each group comprising one or more (e.g., $N_k$) CSI-RS resources for FSBM, where k=1, . . . , K. Here, a group of CSI-RS resources can be referred to as a CSI resource subset or a CSI resource group for FSBM.

In particular, the k-th CSI resource subset/group, and therefore, the $N_k$ CSI-RS resources configured therein, in the resource set could correspond to a set of $N_k \geq 1$ frequency-selective beams (and therefore, the corresponding set of $N_k \geq 1$ frequency subbands), where each CSI-RS resource configured in the k-th CSI resource subset/group could correspond to a frequency-selective beam (and therefore, the corresponding frequency subband). In the present disclosure, the set of $N_k \geq 1$ frequency-selective beams can also be referred to as a frequency-selective multi-beam. There are various means to indicate/configure/provide one or more CSI resource subsets/groups in a CSI resource set.

For example, the UE could be provided/indicated/configured by the network, via higher layer RRC signaling/parameter (e.g., in a CSI resource set provided by CSI-SSB-ResourceSet/NZP-CSI-RS-ResourceSet or in a CSI resource setting provided by CSI-ResourceConfig) and/or MAC CE command and/or dynamic DCI based signaling, K CSI resource subsets/groups each provided by a different higher layer parameter with a different/unique CSI resource subset/group ID/index. Each CSI resource subset/group could comprise/provide one or more CSI-RS resources each corresponding to a SSB resource index and/or a NZP CSI-RS resource configuration index.

For another example, the UE could be provided/indicated/configured by the network, via higher layer RRC signaling/parameter (e.g., in a CSI resource set provided by CSI-SSB-ResourceSet/NZP-CSI-RS-ResourceSet or in a CSI resource setting provided by CSI-ResourceConfig) and/or MAC CE command and/or dynamic DCI based signaling, the number of CSI resource subsets/groups configured in the CSI resource set and/or the number of CSI-RS resources in each (or one or more) of the CSI resource subsets/groups. For this case, the indexes/IDs of the CSI-RS resources configured in the first CSI resource subset/group, the second CSI resource subset/group and so on, could be continuous from low to high (or high to low).

Yet for another example, the UE could be provided/indicated/configured by the network, via higher layer RRC signaling/parameter (e.g., in a CSI resource set provided by CSI-SSB-ResourceSet/NZP-CSI-RS-ResourceSet or in a CSI resource setting provided by CSI-ResourceConfig) and/or MAC CE command and/or dynamic DCI based signaling, the number of CSI resource subsets/groups configured in the CSI resource set and/or the number of CSI-RS resources for each CSI resource subset/group. For this case, the number of CSI-RS resources configured in each CSI resource subset/group is equal, and the indexes/IDs of the CSI-RS resources configured in the first CSI resource subset/group, the second CSI resource subset/group and so on, could be continuous from low to high (or high to low).

Yet for another example, the UE could be provided/indicated/configured by the network, via higher layer RRC signaling/parameter (e.g., in a CSI resource set provided by CSI-SSB-ResourceSet/NZP-CSI-RS-ResourceSet or in a CSI resource setting provided by CSI-ResourceConfig) and/ or MAC CE command and/or dynamic DCI based signaling, one or more bitmaps each corresponding/associated to a CSI resource subset/group. For instance, the first bitmap could correspond to the first CSI resource subset/group in the resource set, the second bitmap could correspond to the second CSI resource subset/group in the resource set, and so on, and the last bitmap could correspond to the last CSI resource subset/group in the resource set.

Alternatively, the UE could be indicated/provided/configured by the network, via higher layer RRC signaling/parameter and/or MAC CE command and/or dynamic DCI based signaling, the mapping/association between the bitmaps and the CSI resource subsets/groups in the CSI resource set for FSBM. Each bitmap could have the same length/size as that of the CSI resource set, and each bit position/entry in a bitmap could correspond to a CSI-RS resource in the corresponding CSI resource set. If a bit position/entry of a bitmap is set to "1" (or "0"), the CSI-RS resource in the resource set corresponding/associated to the bit position/entry is configured/indicated/provided/included in the CSI resource subset/group corresponding/associated to the bitmap. Furthermore, the higher layer parameter(s), e.g., CSI-SSB-ResourceSet/NZP-CSI-RS-ResourceSet/CSI-ResourceConfig, and/or the MAC CE command and/or the DCI format that provides/indicates/configures the one or more bitmaps could also include/indicate/provide one or more CSI resource subset/group IDs/indexes each corresponding/associated to a bitmap indicated/configured therein.

Yet for another example, the UE could receive from the network a MAC CE activation command activating one or more CSI-RS resources—from all the CSI-RS resources configured in the CSI resource set—for a CSI resource subset/group. For this case, the MAC CE command could also include/indicate/provide the corresponding CSI resource subset/group ID/index. Furthermore, the UE could receive from the network K MAC CE activation commands each activating one or more CSI-RS resources for one of the K CSI resource subsets/groups.

Yet for another example, the UE could receive from the network a MAC CE activation command activating one or more CSI-RS resources—from all the CSI-RS resources configured in the CSI resource set—for each of the K CSI resource subset/group configured in the CSI resource set for FSBM. For instance, the MAC CE activation command could activate a first set of one or more CSI-RS resources—from all the CSI-RS resources configured in the CSI resource set—for the first CSI resource subset/group, a second set of one or more CSI-RS resources—from all the CSI-RS resources configured in the CSI resource set—for the second CSI resource subset/group, and so on, and a K-th set of one or more CSI-RS resources—from all the CSI-RS resources configured in the CSI resource set—for the K-th CSI resource subset/group. The MAC CE command could also include/indicate/provide one or more CSI resource subset/group IDs/indexes each corresponding/associated to a set of activated CSI-RS resources.

Yet for another example, one or more of the above described design examples could be combined to indicate/configure/provide one or more CSI resource subsets/groups in a CSI resource set for FSBM.

There are various means to configured/indicate TTD setting(s) for one or more CSI resource subsets/groups (and therefore, the CSI-RS resources configured therein) for FSBM.

For example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. For a CSI resource subset/group configured in the resource set, the UE could be indicated/configured by the network the corresponding/associated (hypothetical) TTD setting; this indication/configuration could be via higher layer RRC signaling (e.g., indicated/configured in the same CSI resource setting provided by CSI-ResourceConfig or in the same CSI resource set provided by CSI-SSB-ResourceSet/NZP-CSI-RS-ResourceSet) and/or MAC CE command and/or dynamic DCI based signaling.

In the present disclosure, the (hypothetical) TTD setting for a CSI resource subset/group (e.g., the k-th CSI resource subset/group in the resource set, and therefore, the $N_k$ CSI-RS resources configured therein) could comprise at least one of the following example.

In one example, one or more of the TTD delays and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}$, . . . , $\tau_{Nk,k}$ (depicted in FIG. 10).

In one example, a reference TTD delay $\tau_0$ and/or one or more scaling factors for one or more of the TTD delays with respect to the reference TTD delay and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}$, . . . , $\tau_{Nk,k}$ (depicted in FIG. 10). For this case, a set of scaling factors $\{\alpha_{1,k}, \alpha_{2,k}, . . . , \alpha_{Nk,k}\}$ for the $N_k$ TTD delays could be determined as $\{\tau_{1,k}/\tau_0, \tau_{2,k}/\tau_0, . . . , \tau_{Nk,k}/\tau_0\}$.

In one example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or one or more scaling factors for one or more of the TTD delays with respect to the reference TTD delay and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}$, . . . , $\tau_{Nk,k}$ (depicted in FIG. 10). If the reference TTD delay corresponds to $\tau_{1,k}$, a set of scaling factors $\{\alpha_{1,k},$ $\alpha_{2,k}, . . . , \alpha_{Nk,k}\}$ for the $N_k$ TTD delays could be determined as $\{1, \tau_{2,k}/\tau_{1,k}, . . . , \tau_{Nk,k}/\tau_{1,k}\}$.

In one example, a reference TTD delay $\tau_0$ and/or differences between one or more of the TTD delays and the reference TTD delay and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}$, . . . , $\tau_{Nk,k}$ (depicted in FIG. 10). For this case, a set of differences $\{d_{1,k}, d_{2,k}, . . . , d_{Nk,k}\}$ between the $N_k$ TTD delays and the reference TTD delay $\tau_0$ could be determined as $\{\tau_{1,k}-\tau_0, \tau_{2,k}-\tau_0, . . . , \tau_{Nk,k}-\tau_0\}$.

In one example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or differences between one or more of the TTD delays and the reference TTD delay and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}, \tau_{2,k}, . . . , \tau_{Nk,k}$ (depicted in FIG. 10). If the reference TTD delay corresponds to $\tau_{1,k}$, a set of differences $\{d_{1,k}, d_{2,k}, . . . , d_{Nk,k}\}$ for the $N_k$ TTD delays could be determined as $\{0, \tau_{2,k}-\tau_{1,k}, . . . , \tau_{Nk,k}-\tau_{1,k}\}$.

In one example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or the common difference between any two adjacent TTD delays and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}, . . . , \tau_{Nk,k}$ (depicted in FIG. 10). If $\tau_{j,k}-\tau_{i,k}=\Delta_k$ for all j-i=1, j, i$\in\{1, . . . , N_k\}$, the common difference between any two adjacent TTD delays is $\Delta_k$.

In one example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or the common scaling factor between any two adjacent TTD delays and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}, . . . , \tau_{Nk,k}$ (depicted in FIG. 10). If $\tau_{j,k}/\tau_{i,k}=\beta_k$ for all j-i=1, j, i$\in\{1, . . . , N_k\}$, the common scaling factor between any two adjacent TTD delays is $\beta_k$.

For a CSI-RS resource configured in a CSI resource subset/group (and therefore, in a CSI resource set) for FSBM, the UE could be indicated/configured by the network the corresponding/associated (hypothetical) TTD configuration; this indication/configuration could be via higher layer RRC signaling (e.g., indicated/configured in the higher layer parameter NZP-CSI-RS-Resource) and/or MAC CE command and/or dynamic DCI based signaling.

In the present disclosure, the (hypothetical) TTD configuration for a CSI-RS resource configured in a CSI resource subset/group (e.g., the k-th CSI resource subset/group in the resource set) for FSBM could comprise at least one of the following example.

In one example, the TTD delay: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 10), where $n_k \in \{1, \ldots, N_k\}$.

In one example, a reference TTD delay $\tau_0$ and/or a scaling factor for the TTD delay with respect to the reference TTD delay: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 10), where $n_k \in \{1, \ldots, N_k\}$. For this case, the scaling factor $\alpha_{nk,k}$ for the TTD delay could be determined as $\tau_{nk,k}/\tau_0$.

In one example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or a scaling factor for the TTD delay with respect to the reference TTD delay: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 10), where $n_k \in \{1, \ldots, N_k\}$. If the reference TTD delay corresponds to $\tau_{1,k}$, a scaling factor $\alpha_{nk,k}$ for the TTD delay could be determined as $\tau nk,k/\tau_{1,k}$.

In one example, a reference TTD delay $\tau_0$ and/or a difference between the TTD delay and the reference TTD delay: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 10), where $n_k \in \{1, \ldots, N_k\}$. For this case, the difference $d_{nk,k}$ between the TTD delay and the reference TTD delay $\tau_0$ could be determined as $\tau_{nk,k}-\tau_0$.

In one example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or a difference between the TTD delay and the reference TTD delay: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 10), where $n_k \in \{1, \ldots, N_k\}$. If the reference TTD delay corresponds to $\tau_{1,k}$, the difference $d_{nk,k}$ for the TTD delay could be determined as $\tau_{nk,k}-\tau_{1,k}$.

In one example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or the common difference between any two adjacent TTD delays: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 10), where $n_k \in \{1, \ldots, N_k\}$. If $\tau_{j,k}-\tau_{i,k}=\Delta_k$ for all j−i=1, j, i∈{1, . . . , $N_k$}, the common difference between any two adjacent TTD delays is $\Delta_k$.

In one example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or the common scaling factor between any two adjacent TTD delays: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 10), where $n_k \in \{1, \ldots, N_k\}$. If $\tau_{j,k}/\tau_{1,k}=\beta_k$ for all j−i=1, j, i∈{1, . . . , $N_k$}, the common scaling factor between any two adjacent TTD delays is $\beta_k$.

There are various means to indicate/configure K TTD settings—e.g., in a CSI resource setting/CSI resource set, and associate/map them to the K CSI resource subsets/groups (each comprising one or more CSI-RS resources with one or more frequency subbands) indicated/configured in the CSI resource setting/CSI resource set for FSBM.

For example, the set of K TTD settings could be explicitly indicated/included in the CSI resource setting provided by CSI-ResourceConfig and/or the CSI resource set (e.g., provided by CSI-SSB-ResourceSet or NZP-CSI-RS-Resource-Set) and/or one or more MAC CE commands and/or one or more DCIs (e.g., via one or more new DCI fields or repurposing one or more bits/codepoints of one or more existing DCI fields); e.g., the K TTD settings are one-to-one mapped to the K CSI resource subsets/groups indicated/configured in the same CSI resource setting/CSI resource set such that the first TTD setting is associated/mapped to the first CSI resource subset/group (and therefore, the CSI-RS resources for FSBM configured therein), the second TTD setting is associated/mapped to the second CSI resource subset/group (and therefore, the CSI-RS resources for FSBM configured therein), and so on, and the K-th TTD setting is associated/mapped to the K-th CSI resource subset/group (and therefore, the CSI-RS resources for FSBM configured therein).

For another example, the set of K TTD settings could be explicitly indicated/included in the CSI resource setting provided by CSI-ResourceConfig and/or the CSI resource set (e.g., provided by CSI-SSB-ResourceSet or NZP-CSI-RS-ResourceSet) and/or one or more MAC CE commands and/or one or more DCIs (e.g., via one or more new DCI fields or repurposing one or more bits/codepoints of one or more existing DCI fields); furthermore, the UE could be indicated/configured/provided by the network, via higher layer RRC signaling/parameter and/or MAC CE command and/or dynamic DCI based signaling, the association/mapping between the K TTD settings and the K CSI resource subsets/groups (and therefore, the CSI-RS resources for FSBM configured therein), e.g., in the same CSI resource setting/CSI resource set.

Yet for another example, the higher layer parameter that configures a CSI-RS resource (e.g., NZP-CSI-RS-Resource) or the higher layer parameter that configures/provides resource allocation for a CSI-RS resource (e.g., CSI-RS-ResourceMapping or CSI-FrequencyOccupation) could explicitly indicate/include the TTD setting corresponding/associated to the CSI resource subset/group, in which the CSI-RS resource is configured/indicated. Optionally, the higher layer parameter that configures a CSI resource subset/group (e.g., NZP-CSI-RS-ResourceSubSet) could explicitly indicate/include the TTD setting corresponding/associated to the CSI resource subset/group.

Yet for another example, a MAC CE command could indicate a TTD setting for a CSI resource subset/group (and therefore, the CSI-RS resources for FSBM configured therein). For this case, the corresponding CSI resource subset/group ID could be included/provided in the MAC CE command.

Yet for another example, a MAC CE command could indicate the K TTD settings each for a CSI resource subset/group configured/indicated in a CSI resource set for FSBM. The set of K TTD settings provided in the MAC CE command are one-to-one mapped to the K CSI resource subsets/groups indicated/configured in the CSI resource setting/CSI resource set such that the first TTD setting in the MAC CE command is associated/mapped to the first CSI resource subset/group (and therefore, the CSI-RS resources for FSBM configured therein), the second TTD setting in the MAC CE command is associated/mapped to the second CSI resource subset/group (and therefore, the CSI-RS resources for FSBM configured therein), and so on, and the K-th TTD setting in the MAC CE command is associated/mapped to the K-th CSI resource subset/group (and therefore, the CSI-RS resources for FSBM configured therein). For this example, the MAC CE command could also indicate/provide/include one or more (e.g., K) CSI resource subset/group IDs/indexes each corresponding/associated to one of the (e.g., K) TTD settings.

Yet for another example, one or more new DCI fields could be introduced in a DCI format to indicate one or more of the K TTD settings. Alternatively, one or more bits or codepoints of one or more existing DCI fields in a DCI format could be repurposed to indicate one or more of the K TTD settings. The TTD setting(s) indicated in the DCI and the CSI resource subset(s)/group(s) indicated/configured for FSBM could be one-to-one mapped following those specified in the above discussed design examples.

Yet for another example, one or more of the above described design examples can be combined to indicate/configure one or more of the K TTD settings, and associate/map them to one or more of the K CSI resource subsets/groups (and therefore, the CSI-RS resources for FSBM configured therein).

There are various means to indicate/configure $N_k$ TTD configurations—e.g., in a CSI-RS resource provided by NZP-CSI-RS-Resource or a CSI resource subset/group provided by CSI-SSB-ResourceSubSet or NZP-CSI-RS-ResourceSubSet, and associate/map them to the $N_k$ CSI-RS resources configured in the CSI resource subset/group for FSBM.

For example, the set of $N_k$ TTD configurations could be explicitly indicated/included/provided in the higher layer parameter, e.g., CSI-SSB-ResourceSubSet or NZP-CSI-RS-ResourceSubSet, that configures a CSI resource subset/group and/or one or more MAC CE commands and/or one or more DCIs (e.g., via one or more new DCI fields or repurposing one or more bits/codepoints of one or more existing DCI fields); e.g., the $N_k$ TTD configurations are one-to-one mapped to the $N_k$ CSI-RS resources indicated/configured in the CSI resource subset/group such that the first TTD configuration is associated/mapped to the first CSI-RS resource in the CSI resource subset/group, the second TTD configuration is associated/mapped to the second CSI-RS resource in the CSI resource subset/group, and so on, and the $N_k$-th TTD configuration is associated/mapped to the $N_k$-th CSI-RS resource in the CSI resource subset/group.

For another example, the set of $N_k$ TTD configurations could be explicitly indicated/included in the higher layer parameter, e.g., CSI-SSB-ResourceSubSet or NZP-CSI-RS-ResourceSubSet that configures a CSI resource subset/group and/or one or more MAC CE commands and/or one or more DCIs (e.g., via one or more new DCI fields or repurposing one or more bits/codepoints of one or more existing DCI fields); furthermore, the UE could be indicated/configured/provided by the network, via higher layer RRC signaling/parameter and/or MAC CE command and/or dynamic DCI based signaling, the association/mapping between the $N_k$ TTD configurations and the $N_k$ CSI-RS resources configured in the CSI resource subset/group.

Yet for another example, the higher layer parameter that configures a CSI-RS resource (e.g., NZP-CSI-RS-Resource) or the higher layer parameter that configures/provides resource allocation for a CSI-RS resource (e.g., CSI-RS-ResourceMapping or CSI-FrequencyOccupation) could explicitly indicate/include the TTD configuration corresponding/associated to the CSI-RS resource.

Yet for another example, a MAC CE command could indicate a TTD configuration for a CSI-RS resource configured in the CSI resource subset/group. For this case, the corresponding CSI-RS resource ID could be included/provided in the MAC CE command.

Yet for another example, a MAC CE command could indicate the $N_k$ TTD configurations each for a CSI-RS resource configured/indicated in a CSI resource subset/group for FSBM. The set of $N_k$ TTD configurations provided in the MAC CE command are one-to-one mapped to the $N_k$ CSI-RS resources indicated/configured in the CSI resource subset/group such that the first TTD configuration in the MAC CE command is associated/mapped to the first CSI-RS resource in the CSI resource subset/group, the second TTD configuration in the MAC CE command is associated/mapped to the second CSI-RS resource in the CSI resource subset/group, and so on, and the $N_k$-th TTD configuration in the MAC CE command is associated/mapped to the $N_k$-th CSI-RS resource in the CSI resource subset/group. For this case, the corresponding CSI resource subset/group ID could be included/provided in the MAC CE command.

Yet for another example, one or more new DCI fields could be introduced in a DCI format to indicate one or more of the $N_k$ TTD configurations. Alternatively, one or more bits or codepoints of one or more existing DCI fields in a DCI format could be repurposed to indicate one or more of the $N_k$ TTD configurations. The TTD configuration(s) indicated in the DCI and the CSI-RS resource(s) indicated/configured for FSBM could be one-to-one mapped following those specified in the above discussed design examples.

Yet for another example, one or more of the above described design examples can be combined to indicate/configure one or more of the $N_k$ TTD configurations, and associate/map them to one or more of the $N_k$ CSI-RS resources in the CSI resource subset/group.

For another example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. For a CSI resource subset/group (and therefore, the corresponding CSI-RS resources configured therein for FSBM) configured in the resource set, the UE could be indicated/configured by the network the corresponding/associated frequency subbands including their bandwidths/sizes, starting RBs and etc.; this indication/configuration could be via higher layer RRC signaling and/or MAC CE command and/or dynamic DCI based signaling. There are various means to indicate/configure the frequency subbands corresponding/associated to the CSI resource subset/group (and therefore, the corresponding CSI-RS resources configured therein for FSBM).

For example, the frequency subband for FSBM, across which the $n_k$-th CSI-RS resource in the k-th CSI resource subset/group spans, could be determined according to the (existing) frequency domain resource allocation for the CSI-RS resource, where $n_k$=1, . . . , $N_k$. Here, the (existing) frequency domain resource allocation for a CSI-RS resource could comprise/include/contain at least the frequency domain allocation of REs provided by frequencyDomain-Allocation in CSI-RS-ResourceMapping for the CSI-RS resource and/or the frequency domain allocation of RBs provided by CSI-FrequencyOccupation (including the starting RB provided by startingRB and the number of PRBs provided by nrofRBs) in CSI-RS-ResourceMapping for the CSI-RS resource.

For another example, the UE could be provided/indicated/configured by the network, e.g., via higher layer RRC signaling/parameter and/or MAC CE command and/or dynamic DCI based signaling, a set of frequency domain resource allocation parameters for the frequency subband for FSBM, across which the $n_k$-th CSI-RS resource in the k-th CSI resource subset/group spans, where $n_k$=1, . . . , $N_k$. The set of frequency domain resource allocation parameters could comprise/include/contain at least a frequency domain allocation of REs and a frequency domain allocation of RBs (comprising at least a starting RB and the number of PRBs across which the corresponding frequency subband spans).

The set of frequency domain resource allocation parameters for the frequency subband could be provided in the higher layer parameter, e.g., NZP-CSI-RS-Resource, that configures the corresponding CSI-RS resource (i.e., the $n_k$-th CSI-RS resource in the k-th CSI resource subset/group in this example), and/or the higher layer parameter, e.g., CSI-RS-ResourceMapping/CSI-FrequencyOccupation, that provides resource allocation for the corresponding CSI-RS resource (i.e., the $n_k$-th CSI-RS resource in the k-th CSI resource subset/group in this example).

Alternatively, the set of frequency domain resource allocation parameters discussed above could be indicated in one or more DCIs, via one or more new DCI fields or by repurposing one or more bits/codepoints of one or more existing DCI fields in the DCI(s). Optionally, the set of frequency domain resource allocation parameters discussed above could be indicated/provided/included in one or more MAC CE commands; for this case, a MAC CE command could also include/indicate/provide the corresponding CSI-RS resource ID/index and or frequency subband index.

Yet for another example, the UE could receive from the network, via higher layer RRC signaling (e.g., in NZP-CSI-RS-Resource, CSI-RS-ResourceMapping or CSI-FrequencyOccupation) and/or MAC CE command and/or dynamic DCI based signaling, a bitmap to indicate/provide the frequency domain resource allocation (e.g., configuration of a frequency subband) for the $n_k$-th CSI-RS resource in the k-th CSI resource subset/group, where $n_k$=1, . . . , $N_k$. Each bit position/entry in a bitmap could correspond to a PRB or PRB index among all the PRBs across which all the $N_k$ CSI-RS resources in the k-th CSI resource subset/group spans. If a bit position/entry of a bitmap is set to "1" (or "0"), the corresponding PRB or PRB index is allocated for the frequency subband for the CSI-RS resource corresponding/associated to the bitmap.

A bitmap for a CSI-RS resource (and therefore, the corresponding frequency subband) could contain/comprise more than one bit positions/entries set to "1" (or "0"). Different bitmaps for different CSI-RS resources could have the same bit position(s)/entry(s) set to "1" (or "0") meaning that different frequency subbands for different CSI-RS resources in a CSI resource subset/group for FSBM could be overlapped in frequency. If the frequency subband size/allocation for a CSI-RS resource (e.g., the bitmap discussed above) is indicated via one or more DCIs, one or more new DCI fields can be introduced to indicate the bitmap; alternatively, one or more bits/codepoints of one or more existing DCI fields could be repurposed to indicate the bitmap. If the frequency subband size/allocation for a CSI-RS resource (e.g., the bitmap discussed above) is indicated in one or more MAC CE commands, a MAC CE command could also indicate/provide include the corresponding CSI-RS resource ID/index and/or frequency subband index(es).

Yet for another example, the higher layer parameter that configures a CSI resource subset/group (e.g., the k-th CSI resource subset/group in the resource set), e.g., NZP-CSI-RS-ResourceSubSet, could indicate/include $N_k$ CSI-RS resource mapping configurations each for a frequency subband. A CSI-RS resource mapping configuration could contain/comprise at least a CSI-RS resource ID/index or a frequency subband index, a frequency domain allocation of REs for a CSI-RS resource/frequency subband and a frequency domain allocation of RBs for a CSI-RS resource/frequency subband. The frequency domain allocation of RBs for a CSI-RS resource/frequency subband could contain/comprise at least a starting RB and a number of PRBs across which the corresponding CSI-RS resource/frequency subband spans.

For this case, the higher layer parameter NZP-CSI-RS-ResourceSubSet that indicates/provides the $N_k$ CSI-RS resource mapping configurations could also include/provide/indicate the $N_k$ CSI-RS resource IDs/indexes and/or the $N_k$ frequency subband indexes each associated/mapped to a CSI-RS resource mapping configuration indicated/configured therein. Alternatively, one or more of the above discussed $N_k$ CSI-RS resource mapping configurations could be indicated in one or more DCIs, via one or more new DCI fields or by repurposing one or more bits/codepoints of one or more existing DCI fields in the DCI(s).

Optionally, one or more of the above discussed $N_k$ CSI-RS resource mapping configurations could be indicated/provided/included in one or more MAC CE commands; for this case, a MAC CE command could also include indicate/provide the corresponding CSI resource subset/group ID and/or CSI-RS resource ID(s)/index(es) and/or frequency subband index(es). The $N_k$ CSI-RS resource mapping configurations discussed above and the $N_k$ CSI-RS resources configured in the k-th CSI resource subset/group for frequency-selective beam measurement for FSBM could be one-to-one mapped; for instance, the first CSI-RS resource mapping configuration could correspond to the first CSI-RS resource in the CSI resource subset/group, the second CSI-RS resource mapping configuration could correspond to the second CSI-RS resource in the CSI resource subset/group, and so on, and the $N_k$-th CSI-RS resource mapping configuration could correspond to the $N_k$-th CSI-RS resource in the CSI resource subset/group.

Alternatively, the UE could be indicated/provided by the network, e.g., via higher layer RRC signaling/parameter and/or MAC CE command and/or dynamic DCI based signaling, the mapping/association between the $N_k$ CSI-RS resource mapping configurations and the $N_k$ CSI-RS resources configured in the k-th CSI resource subset/group.

Yet for another example, the UE could receive from the network, via higher layer RRC signaling (e.g., in a CSI resource subset/group provided by NZP-CSI-RS-Resource-SubSet) and/or MAC CE command and/or dynamic DCI based signaling, one or more bitmaps (e.g., $N_k$ bitmaps) each for a frequency subband corresponding/associated to a CSI-RS resource (e.g., the $n_k$-th CSI-RS resource in the k-th CSI resource subset/group for FSBM). Each bit position/entry in a bitmap could correspond to a PRB or PRB index among all the PRBs across which all the $N_k$ CSI-RS resources in the k-th CSI resource subset/group spans. If a bit position/entry of a bitmap is set to "1" (or "0"), the corresponding PRB or PRB index is allocated for the frequency subband for the CSI-RS resource corresponding/associated to the bitmap. A bitmap for a CSI-RS resource/frequency subband could contain/comprise more than one bit positions/entries set to "1" (or "0"). Different bitmaps for different CSI-RS resources could have the same bit position(s)/entry(s) set to "1" (or "0") meaning that different frequency subbands for different CSI-RS resources configured in a CSI resource subset/group for FSBM could be overlapped in frequency.

For this case, the higher layer parameter NZP-CSI-RS-ResourceSubSet that indicates/provides the $N_k$ bitmaps could also include/provide/indicate $N_k$ CSI-RS resource IDs/indexes and/or $N_k$ frequency subband indexes each associated/mapped to a bitmap indicated/configured therein. If the frequency subband size/allocation for one or more CSI-RS resources in the CSI resource subset/group (e.g., the one or more bitmaps discussed above) is indicated via one or more DCIs, one or more new DCI fields can be introduced to indicate the one or more bitmaps; alternatively, one or more bits/codepoints of one or more existing DCI fields could be repurposed to indicate the one or more bitmaps. If the frequency subband size/allocation for one or more CSI-RS resources in the CSI resource subset/group (e.g., the one or more bitmaps discussed above) is indicated in one or more MAC CE commands, a MAC CE command could also indicate/provide/include the corresponding CSI resource subset/group ID and/or CSI-RS resource ID(s)/index(es) and/or frequency subband index(es).

The $N_k$ bitmaps discussed above, and the $N_k$ CSI-RS resources configured in the k-th CSI resource subset/group for FSBM could be one-to-one mapped; for instance, the first bitmap could correspond to the first CSI-RS resource in the CSI resource subset/group, the second bitmap could correspond to the second CSI-RS resource in the CSI resource subset/group, and so on, and the $N_k$-th bitmap could correspond to the $N_k$-th CSI-RS resource in the CSI resource subset/group. Alternatively, the UE could be indicated/provided by the network, e.g., via higher layer RRC signaling/parameter and/or MAC CE command and/or dynamic DCI based signaling, the mapping/association between the $N_k$ bitmaps and the $N_k$ CSI-RS resources configured in the k-th CSI resource subset/group.

Yet for another example, the UE could receive from the network, via higher layer RRC signaling (e.g., in a CSI resource subset/group provided by NZP-CSI-RS-Resource- SubSet) and/or MAC CE command and/or dynamic DCI based signaling, a bitmap for one or more of the frequency subbands corresponding/associated to one or more of the $N_k$ CSI-RS resources configured in the k-th CSI resource subset/group for FSBM. Each bit position/entry in the bitmap could correspond to a PRB or PRB index among all the PRBs across which all the $N_k$ CSI-RS resources in the k-th CSI resource subset/group spans. Furthermore, each bit position/entry in the bitmap could be mapped/associated to a frequency subband for a CSI-RS resource. The mapping/association between the bit positions/entries in the bitmap and the frequency subbands for the CSI-RS resources in a CSI resource subset/group could be fixed.

For instance, the bitmap can be partitioned into $N_k$ parts each comprising one or more bit positions/entries; for this case, the first part of the bitmap could correspond to the first frequency subband for the first CSI-RS resource in the CSI resource subset/group, the second part of the bitmap could correspond to the second frequency subband for the second CSI-RS resource in the CSI resource subset/group, and so on, and the $N_k$-th part of the bitmap could correspond to the $N_k$-th frequency subband for the $N_k$-th CSI-RS resource in the CSI resource subset/group; the UE could be provided/indicated/configured by the network, via higher layer RRC signaling and/or MAC CE command and/or dynamic DCI based signaling, how the bitmap is partitioned.

Alternatively, the UE could be provided/indicated/configured by the network, via higher layer RRC signaling and/or MAC CE command and/or dynamic DCI based signaling, the mapping/association between the bit positions/entries in the bitmap and the frequency subbands for the corresponding CSI-RS resources in the CSI resource subset/group for FSBM. If a bit position/entry of a bitmap is set to "1" (or "0"), the corresponding PRB or PRB index is allocated for the frequency subband (and therefore, the corresponding CSI-RS resource) corresponding/associated to the bit position/entry. The bitmap could contain/comprise more than one bit positions/entries set to "1" (or "0"). The higher layer parameter(s), e.g., NZP-CSI-RS-ResourceSubSet, that provides the bitmap could also include/provide/indicate the $N_k$ CSI-RS resource IDs/indexes and/or the $N_k$ frequency subband indexes each associated/mapped to one or more bit positions/entries (e.g., a part discussed above) in the bitmap.

If the frequency subband size/allocation for one or more CSI-RS resources in the CSI resource subset/group (e.g., the bitmap discussed above) is indicated via one or more DCIs, one or more new DCI fields can be introduced to indicate the bitmap; alternatively, one or more bits/codepoints of one or more existing DCI fields could be repurposed to indicate the bitmap. If the frequency subband size/allocation for one or more CSI-RS resources in the CSI resource subset/group (e.g., the bitmap discussed above) is indicated in one or more MAC CE commands, a MAC CE command could also indicate/provide/include the corresponding CSI resource subset/group ID and/or CSI-RS resource ID(s)/index(es) and/or frequency subband index(es).

Yet for another example, the UE could receive from the network one or more MAC CE activation commands (e.g., $N_k$ MAC CE activation commands) each for a frequency subband corresponding/associated to a CSI-RS resource configured in a CSI resource subset/group for FSBM (e.g., the $n_k$-th CSI-RS resource in the k-th CSI resource subset/group in the resource set). Each MAC CE activation command could activate one or more PRBs or PRB indexes—from all the PRBs across which all the $N_k$ CSI-RS resources in the k-th CSI resource subset/group spans—for the corresponding/associated frequency subband (and therefore, the corresponding CSI-RS resource). For this case, each MAC CE activation command could include/provide/indicate the corresponding CSI resource subset/group ID/index and/or CSI-RS resource ID/index and frequency subband index.

Yet for another example, the UE could receive from the network a MAC CE activation command activating one or more PRBs or PRB indexes—from all the PRBs across which all the $N_k$ CSI-RS resources in the k-th CSI resource subset/group spans—for one or more of the frequency subbands corresponding/associated to the one or more of the $N_k$ CSI-RS resources in the k-th CSI resource subset/group for FSBM. For instance, for the k-th CSI resource subset/group in the resource set, the MAC CE activation command could activate one or more PRBs or PRB indexes—from all the PRBs across which all the $N_k$ CSI-RS resources in the k-th CSI resource subset/group spans—for the first frequency subband corresponding/associated to the first CSI-RS resource in the CSI resource subset/group, one or more PRBs or PRB indexes—from all the PRBs across which all the $N_k$ CSI-RS resources in the k-th CSI resource subset/group spans—for the second frequency subband corresponding/associated to the second CSI-RS resource in the CSI resource subset/group, and so on, and one or more PRBs or PRB indexes—from all the PRBs across which all the $N_k$ CSI-RS resources in the k-th CSI resource subset/group spans—for the $N_k$-th frequency subband corresponding/associated to the $N_k$-th CSI-RS resource in the CSI resource subset/group. For this case, the MAC CE activation command could include/provide/indicate the corresponding CSI resource subset/group ID and/or CSI-RS resource ID(s)/index(es) and/or frequency subband index(es).

Yet for another example, the frequency subbands for different CSI-RS resources configured in the same CSI resource subset/group—e.g., the $N_k$ frequency subbands for the $N_k$ CSI-RS resources configured in the k-th CSI resource subset/group in the CSI resource set—could have the same bandwidth/size. For this case, the UE could be provided by the network, via higher layer RRC signaling (e.g., in a CSI resource subset/group provided by NZP-CSI-RS-Resource-SubSet, or in a CSI-RS resource provided by NZP-CSI-RS-Resource, CSI-RS-ResourceMapping or CSI-FrequencyOccupation) and/or MAC CE command and/or dynamic DCI based signaling, a common frequency subband bandwidth/size (e.g., in number of PRBs) and/or one or more starting RBs of one or more frequency subbands.

In addition, the frequency subbands for different CSI-RS resources configured in the same CSI resource subset/group—e.g., the $N_k$ frequency subbands for the $N_k$ CSI-RS resources configured in the k-th CSI resource subset/group in the CSI resource set—could equally divide the total PRBs across which all the $N_k$ CSI-RS resources in the k-th CSI resource subset/group spans. For this case, the UE could be provided by the network, via higher layer RRC signaling (e.g., in a CSI resource subset/group provided by NZP-CSI-RS-ResourceSubSet, or in a CSI-RS resource provided by NZP-CSI-RS-Resource, CSI-RS-ResourceMapping or CSI-FrequencyOccupation) and/or MAC CE command and/or dynamic DCI based signaling, one or more starting RBs of one or more frequency subbands for one or more CSI-RS resources configured in the CSI resource subset/group.

Yet for another example, the higher layer parameter that configures a CSI resource set for FSBM, e.g., CSI-SSB-ResourceSet or NZP-CSI-RS-ResourceSet, could include/indicate K sets of frequency domain resource allocation parameters each corresponding/associated to a CSI resource subset/group configured therein. A set of frequency domain resource allocation parameters could comprise at least one or more (e.g., $N_k$) frequency domain allocations of REs for one or more frequency subbands corresponding/associated to one or more CSI-RS resources configured in a CSI resource subset/group (e.g., the $N_k$ CSI-RS resources in the k-th CSI resource subset/group in the resource set) and one or more (e.g., $N_k$) frequency domain allocations of RBs (comprising at least a starting RB and the number of PRBs across which the corresponding CSI-RS resource/frequency subband spans) for one or more frequency subbands corresponding/associated to one or more CSI-RS resources configured in a CSI resource subset/group (e.g., the $N_k$ CSI-RS resources in the k-th CSI resource subset/group in the resource set).

In one example, the K sets of frequency domain resource allocation parameters and the K CSI resource subsets/groups configured in the same CSI resource set are one-to-one mapped; for instance, the first set of frequency domain resource allocation parameters could correspond to the first CSI resource subset/group (and therefore, the $N_1$ CSI-RS resources for FSBM configured therein) in the CSI resource set, the second set of frequency domain resource allocation parameters could correspond to the second CSI resource subset/group (and therefore, the $N_2$ CSI-RS resources for FSBM configured therein) in the CSI resource set, and so on, and the K-th set of frequency domain resource allocation parameters could correspond to the K-th CSI resource subset/group (and therefore, the $N_K$ CSI-RS resources for FSBM configured therein) in the CSI resource set.

In another example, the UE could be indicated/provided by the network, e.g., via higher layer RRC signaling/parameter and/or MAC CE command and/or dynamic DCI based signaling, the mapping/association between the K sets of frequency domain resource allocation parameters and the K CSI resource subsets/groups (and therefore, the corresponding CSI-RS resources for FSBM configured therein) configured in the same CSI resource set. Optionally, the higher layer parameter(s), e.g., CSI-SSB-ResourceSet/NZP-CSI-RS-ResourceSet, that configures a CSI resource set and provides the K sets of frequency domain resource allocation parameters could also include/provide/indicate the K CSI resource subset IDs/indexes each associated/mapped to a set of frequency domain resource allocation parameters discussed above.

Alternatively, one or more of the above discussed K sets of frequency domain resource allocation parameters could be indicated in one or more DCIs, via one or more new DCI fields or by repurposing one or more bits/codepoints of one or more existing DCI fields in the DCI(s). One or more of the above discussed K sets of frequency domain resource allocation parameters could also be indicated in one or more MAC CE commands; for this case, the MAC CE command(s) that provides/indicates the K sets of frequency domain resource allocation parameters could also include/provide/indicate the K CSI resource subset IDs/indexes each associated/mapped to a set of frequency domain resource allocation parameters discussed above. For both MAC CE and DCI based indication of the K sets of frequency domain resource allocation parameters, the association/mapping between the MAC CE/DCI indicated K sets of frequency domain resource allocation parameters and the K CSI resource subsets/groups (and therefore, the corresponding CSI-RS resources for FSBM configured therein) configured in the same CSI resource set could follow those discussed above for the RRC based configuration/indication of the K sets of frequency domain resource allocation parameters.

Yet for another example, the higher layer parameter that configures a CSI resource setting comprising at least one CSI resource set for FSBM, e.g., CSI-ResourceConfig, could include/indicate K sets of frequency domain resource allocation parameters each corresponding/associated to a CSI resource subset/group configured in the CSI resource set(s) for FSBM. A set of frequency domain resource allocation parameters could comprise at least one or more (e.g., $N_k$) frequency domain allocations of REs for one or more frequency subbands corresponding/associated to one or more CSI-RS resources configured in a CSI resource subset/group (e.g., the $N_k$ CSI-RS resources in the k-th CSI resource subset/group in the resource set for FSBM) and one or more (e.g., $N_k$) frequency domain allocations of RBs (comprising at least a starting RB and the number of PRBs across which the corresponding CSI-RS resource/frequency subband spans) for one or more frequency subbands corresponding/associated to one or more CSI-RS resources in a CSI resource subset/group (e.g., the $N_k$ CSI-RS resources in the k-th CSI resource subset/group in the resource set for FSBM).

In one example, the K sets of frequency domain resource allocation parameters configured in the CSI resource setting and the K CSI resource subsets/groups configured in the CSI resource set(s) for FSBM are one-to-one mapped; for instance, the first set of frequency domain resource allocation parameters in the CSI resource setting could correspond to the first CSI resource subset/group (and therefore, the $N_1$ CSI-RS resources for FSBM configured therein) in the CSI resource set(s) for FSBM, the second set of frequency domain resource allocation parameters in the CSI resources setting could correspond to the second CSI resource subset/group (and therefore, the $N_2$ CSI-RS resources for FSBM configured therein) in the CSI resource set(s) for FSBM, and so on, and the K-th set of frequency domain resource allocation parameters in the CSI resource setting could correspond to the K-th CSI resource subset/group (and therefore, the $N_K$ CSI-RS resources for FSBM configured therein) in the CSI resource set(s) for FSBM.

In another example, the UE could be indicated/provided by the network, e.g., via higher layer RRC signaling/parameter and/or MAC CE command and/or dynamic DCI based signaling, the mapping/association between the K sets of frequency domain resource allocation parameters in the CSI resource setting and the K CSI resource subsets/groups (and therefore, the corresponding CSI-RS resources for FSBM configured therein) configured in the CSI resource set(s) for FSBM. Optionally, the higher layer parameter(s), e.g., CSI-ResourceConfig, that configures a CSI resource setting and provides the K sets of frequency domain resource allocation parameters could also include/provide/indicate the K CSI resource subset IDs/indexes each associated/mapped to a set of frequency domain resource allocation parameters discussed above.

Alternatively, one or more of the above discussed K sets of frequency domain resource allocation parameters could be indicated in one or more DCIs, via one or more new DCI fields or by repurposing one or more bits/codepoints of one or more existing DCI fields in the DCI(s). One or more of the above discussed K sets of frequency domain resource allocation parameters could also be indicated in one or more MAC CE commands; for this case, the MAC CE command(s) that provides/indicates the K sets of frequency domain resource allocation parameters could also include/provide/indicate the K CSI resource subset IDs/indexes each associated/mapped to a set of frequency domain resource allocation parameters discussed above.

For both MAC CE and DCI based indication of the K sets of frequency domain resource allocation parameters, the association/mapping between the MAC CE/DCI indicated K sets of frequency domain resource allocation parameters and the K CSI resource subsets/groups (and therefore, the corresponding CSI-RS resources for FSBM configured therein) configured in the CSI resource set(s) for FSBM could follow those discussed above for the RRC based configuration/indication of the K sets of frequency domain resource allocation parameters.

Yet for another example, the higher layer parameter that configures a CSI resource set for FSBM, e.g., CSI-SSB-ResourceSet or NZP-CSI-RS-ResourceSet, could include/indicate K sets of bitmaps with each set comprising one or more bitmaps for a CSI resource subset/group (e.g., a set of $N_k$ bitmaps for the $N_k$ CSI-RS resources configured in the k-th CSI resource subset/group in the resource set). In this example, the configuration/indication of the one or more bitmaps in a set, and the association/mapping between the one or more bitmaps in a set and the frequency subband(s) for the corresponding CSI-RS resource(s) could follow those specified in examples in the present disclosure.

In one example, the K sets of bitmaps and the K CSI resource subsets/groups configured in the same CSI resource set are one-to-one mapped; for instance, the first set of bitmaps could correspond to the first CSI resource subset/group (and therefore, the $N_1$ CSI-RS resources for FSBM configured therein) in the CSI resource set, the second set of bitmaps could correspond to the second CSI resource subset/group (and therefore, the $N_2$ CSI-RS resources for FSBM configured therein) in the CSI resource set, and so on, and the K-th set of bitmaps could correspond to the K-th CSI resource subset/group (and therefore, the $N_K$ CSI-RS resources for FSBM configured therein) in the CSI resource set.

In another example, the UE could be indicated/provided by the network, e.g., via higher layer RRC signaling/parameter and/or MAC CE command and/or dynamic DCI based signaling, the mapping/association between the K sets of bitmaps and the K CSI resource subsets/groups (and therefore, the corresponding CSI-RS resources for FSBM configured therein) configured in the CSI resource set. Optionally, the higher layer parameter(s), e.g., CSI-SSB-ResourceSet/NZP-CSI-RS-ResourceSet, that configures a CSI resource set and provides the K sets of bitmaps could also include/provide indicate the K CSI resource subset IDs/indexes each associated/mapped to a set of bitmaps discussed above.

Alternatively, one or more of the above discussed K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI resource subsets/groups (and therefore, the corresponding CSI-RS resources for FSBM configured therein) configured in the same CSI resource set could follow those discussed above for the RRC based configuration/indication of the K sets of bitmaps.

Yet for another example, the higher layer parameter that configures a CSI resource setting comprising at least one CSI resource set for FSBM, e.g., CSI-ResourceConfig, could include/indicate K sets of bitmaps with each set comprising one or more bitmaps for a CSI resource subset/group configured in the CSI resource set(s) for FSBM (e.g., a set of $N_k$ bitmaps for the $N_k$ CSI-RS resources configured in the k-th CSI resource subset/group in the resource set). In this example, the configuration/indication of the one or more bitmaps in a set, and the association/mapping between the one or more bitmaps in a set and the frequency subband(s)

for the corresponding CSI-RS resource(s) could follow those specified in examples in the present disclosure.

In one example, the K sets of bitmaps in the CSI resource setting and the K CSI resource subsets/groups configured in the CSI resource set(s) for FSBM are one-to-one mapped; for instance, the first set of bitmaps in the CSI resource setting could correspond to the first CSI resource subset/group (and therefore, the $N_1$ CSI-RS resources for FSBM configured therein) in the CSI resource set(s) for FSBM, the second set of bitmaps in the CSI resource setting could correspond to the second CSI resource subset/group (and therefore, the $N_2$ CSI-RS resources for FSBM configured therein) in the CSI resource set(s) for FSBM, and so on, and the K-th set of bitmaps in the CSI resource setting could correspond to the K-th CSI resource subset/group (and therefore, the $N_K$ CSI-RS resources for FSBM configured therein) in the CSI resource set(s) for FSBM.

In another example, the UE could be indicated/provided by the network, e.g., via higher layer RRC signaling/parameter and/or MAC CE command and/or dynamic DCI based signaling, the mapping/association between the K sets of bitmaps configured in the CSI resource setting and the K CSI resource subsets/groups (and therefore, the corresponding CSI-RS resources for FSBM configured therein) configured in the CSI resource set(s) for FSBM. Optionally, the higher layer parameter(s), e.g., CSI-ResourceConfig, that configures a CSI resource setting and provides the K sets of bitmaps could also include/provide indicate the K CSI resource subset IDs/indexes each associated/mapped to a set of bitmaps discussed above.

Alternatively, one or more of the above discussed K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI resource subsets/groups (and therefore, the corresponding CSI-RS resources for FSBM configured therein) configured in the CSI resource set(s) for FSBM could follow those discussed above for the RRC based configuration/indication of the K sets of bitmaps.

Yet for another example, the higher layer parameter that configures a CSI resource set for FSBM, e.g., CSI-SSB-ResourceSet or NZP-CSI-RS-ResourceSet, could include/indicate K bitmaps each corresponding/associated to a CSI resource subset/group configured therein. In this example, the configuration/indication of a bitmap, and the association/mapping between each bit position/entry in a bitmap and the frequency subband(s) for the corresponding CSI-RS resource(s) could follow those specified in examples in the present disclosure.

In one example, the K bitmaps and the K CSI resource subsets/groups configured in the same CSI resource set are one-to-one mapped; for instance, the first bitmap could correspond to the first CSI resource subset/group (and therefore, the $N_1$ CSI-RS resources for FSBM configured therein) in the CSI resource set, the second bitmap could correspond to the second CSI resource subset/group (and therefore, the $N_2$ CSI-RS resources for FSBM configured therein) in the CSI resource set, and so on, and the K-th bitmap could correspond to the K-th CSI resource subset/group (and therefore, the $N_K$ CSI-RS resources for FSBM configured therein) in the CSI resource set.

In another example, the UE could be indicated/provided by the network, e.g., via higher layer RRC signaling/parameter and/or MAC CE command and/or dynamic DCI based signaling, the mapping/association between the K bitmaps and the K CSI resource subsets/groups (and therefore, the corresponding CSI-RS resources for FSBM configured therein) configured in the CSI resource set. Optionally, the higher layer parameter(s), e.g., CSI-SSB-ResourceSet or NZP-CSI-RS-ResourceSet, that configures a CSI resource set and provides the K bitmaps could also include/provide/indicate the K CSI resource subset IDs/indexes each associated/mapped to a bitmap discussed above.

Alternatively, one or more of the above discussed K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI resource subsets/groups (and therefore, the corresponding CSI-RS resources for FSBM configured therein) configured in the same CSI resource set could follow those discussed above for the RRC based configuration/indication of the K bitmaps.

Yet for another example, the higher layer parameter that configures a CSI resource setting comprising at least one CSI resource set for FSBM, e.g., CSI-ResourceConfig, could include/indicate K bitmaps each corresponding/associated to a CSI resource subset/group configured in the CSI resource set(s) for FSBM. In this example, the configuration/indication of a bitmap, and the association/mapping between each bit position/entry in a bitmap and the frequency subband(s) for the corresponding CSI-RS resource(s) could follow those specified in examples in the present disclosure.

In one example, the K bitmaps in the CSI resource setting and the K CSI resource subsets/groups configured in the CSI resource set(s) for FSBM are one-to-one mapped; for instance, the first bitmap in the CSI resource setting could correspond to the first CSI resource subset/group (and therefore, the $N_1$ CSI-RS resources for FSBM configured therein) in the CSI resource set(s) for FSBM, the second bitmap in the CSI resource setting could correspond to the second CSI resource subset/group (and therefore, the $N_2$ CSI-RS resources for FSBM configured therein) in the CSI resource set(s) for FSBM, and so on, and the K-th bitmap in the CSI resource setting could correspond to the K-th CSI resource subset/group (and therefore, the $N_K$ CSI-RS resources for FSBM configured therein) in the CSI resource set(s) for FSBM.

In another example, the UE could be indicated/provided by the network, e.g., via higher layer RRC signaling/parameter and/or MAC CE command and/or dynamic DCI based signaling, the mapping/association between the K bitmaps configured in the CSI resource setting and the K CSI resource subsets/groups (and therefore, the corresponding CSI-RS resources for FSBM configured therein) configured in the CSI resource set(s) for FSBM. Optionally, the higher layer parameter(s), e.g., CSI-ResourceConfig, that configures a CSI resource setting and provides the K bitmaps could also include/provide/indicate the K CSI resource subset IDs/indexes each associated/mapped to a bitmap discussed above.

Alternatively, one or more of the above discussed K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI resource subsets/groups (and therefore, the corresponding CSI-RS resources for FSBM configured therein) configured in the CSI resource set(s) for FSBM could follow those discussed above for the RRC based configuration/indication of the K bitmaps.

Yet for another example, the UE could receive from the network a MAC CE command indicating/providing/including K sets of bitmaps with each set comprising one or more bitmaps for a CSI resource subset/group (and therefore, the corresponding CSI-RS resources configured therein) configured in the CSI resource set(s) for FSBM (e.g., a set of $N_k$ bitmaps for the $N_k$ CSI-RS resources configured in the k-th CSI resource subset/group in the resource set).

In this example, the configuration/indication of the one or more bitmaps in a set, and the association/mapping between the one or more bitmaps in a set and the frequency subband(s) for the corresponding CSI-RS resource(s) could follow those specified in examples in the present disclosure.

In one example, the K sets of bitmaps in the MAC CE command and the K CSI resource subsets/groups configured in the CSI resource set(s) for FSBM are one-to-one mapped; for instance, the first set of bitmaps in the MAC CE command could correspond to the first CSI resource subset/group (and therefore, the $N_1$ CSI-RS resources for FSBM configured therein) in the CSI resource set(s) for FSBM, the second set of bitmaps in the MAC CE command could correspond to the second CSI resource subset/group (and therefore, the $N_2$ CSI-RS resources for FSBM configured therein) in the CSI resource set(s) for FSBM, and so on, and the K-th set of bitmaps in the MAC CE command could correspond to the K-th CSI resource subset/group (and therefore, the $N_K$ CSI-RS resources for FSBM configured therein) in the CSI resource set(s) for FSBM.

In another example, the UE could be indicated/provided by the network, e.g., via higher layer RRC signaling/parameter and/or MAC CE command and/or dynamic DCI based signaling, the mapping/association between the K sets of bitmaps configured in the MAC CE command and the K CSI resource subsets/groups (and therefore, the corresponding CSI-RS resources for FSBM configured therein) configured in the CSI resource set(s) for FSBM. Optionally, the MAC CE command that provides/indicates the K sets of bitmaps could also include/provide/indicate the K CSI resource subset IDs/indexes each associated/mapped to a set of bitmaps discussed above.

Yet for another example, a UE could receive from the network a MAC CE command indicating/providing/including K bitmaps each corresponding/associated to a CSI resource subset/group configured in a CSI-RS resource set for FSBM. In this example, the configuration/indication of a bitmap, and the association/mapping between each bit position/entry in a bitmap and the frequency subband(s) for the corresponding CSI-RS resource(s) could follow those specified in examples in the present disclosure.

In one example, the K bitmaps indicated in the MAC CE command and the K CSI resource subsets/groups configured in the CSI resource set(s) for FSBM are one-to-one mapped; for instance, the first bitmap in the MAC CE command could correspond to the first CSI resource subset/group (and therefore, the $N_1$ CSI-RS resources for FSBM configured therein) in the CSI resource set(s) for FSBM, the second bitmap in the MAC CE command could correspond to the second CSI resource subset/group (and therefore, the $N_2$ CSI-RS resources for FSBM configured therein) in the CSI resource set(s) for FSBM, and so on, and the K-th bitmap in the MAC CE command could correspond to the K-th CSI resource subset/group (and therefore, the $N_K$ CSI-RS resources for FSBM configured therein) in the CSI resource set(s) for FSBM.

In another example, the UE could be indicated/provided by the network, e.g., via higher layer RRC signaling/parameter and/or MAC CE command and/or dynamic DCI based signaling, the mapping/association between the K bitmaps in the MAC CE command and the K CSI resource subsets/groups (and therefore, the corresponding CSI-RS resources for FSBM configured therein) configured in the CSI resource set(s) for FSBM. Optionally, the MAC CE command that provides/indicates the K bitmaps could also include/provide/indicate the K CSI resource subset IDs/indexes each associated/mapped to a bitmap discussed above.

Yet for another example, one or more of the above described design examples can be combined to indicate/configure one or more frequency subbands for one or more CSI-RS resources in each of the K CSI resource subsets/groups configured in the CSI resource set(s) for FSBM.

A UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. For a CSI resource subset/group configured in the CSI resource set for FSBM, and therefore, the corresponding/associated frequency subbands (e.g., the $N_k$ frequency subbands for the $N_k$ CSI-RS resources configured in the k-th CSI resource subset/group in the resource set for FSBM) configured/indicated according to one or more of the above discussed design examples, the UE could be further indicated/configured/provided by the network, via higher layer RRC signaling/parameter and/or MAC CE command and/or dynamic DCI based signaling, one or more of the total configured/indicated frequency subbands (e.g., one or more of the $N_k$ frequency subbands for the k-th CSI resource subset/group in the resource set), and therefore, the corresponding one or more of the total configured/indicated CSI-RS resources in the CSI resource subset/group (e.g., one or more of the $N_k$ CSI-RS resources in the k-th CSI resource subset/group in the resource set), for FSBM.

For example, the UE could receive from the network, via higher layer RRC signaling/parameter and/or MAC CE command and/or dynamic DCI based signaling, a bitmap of length $N_k$ for the k-th CSI resource subset/group in the resource set, where $k \in \{1, \ldots, K\}$. Each bit position/entry in the bitmap could correspond to a frequency subband, and therefore a CSI-RS resource—configured in the k-th CSI resource subset/group in the resource set—corresponding/associated to the frequency subband. If a bit position/entry in the bitmap is set to "1" (or "0"), the corresponding frequency subband/CSI-RS resource in the CSI resource subset/group is used/active for FSBM. The bitmap could comprise more than one bit positions/entries set to "1" (or "0") indicating that more than one frequency subbands/CSI-RS resources in the CSI resource subset/group can be used/active for FSBM.

The UE could receive at least one bitmap for each CSI resource subset/group configured in the resource set for FSBM. For RRC based configuration, following examples can be provided.

In one example, the bitmap(s) corresponding/associated to a CSI resource subset/group could be provided in the higher layer parameter NZP-CSI-RS-ResourceSubSet that configures the CSI resource subset/group.

In another example, the higher layer parameter that configures a CSI resource set for FSBM, e.g., NZP-CSI-RS-ResourceSet, could include/indicate a set of one or more (e.g., K) such bitmaps each corresponding/associated to a CSI resource subset/group configured in the same CSI resource set. For example, the K bitmaps are one-to-one mapped to the K CSI resource subsets/groups configured in the same CSI resource set; for instance, the first bitmap could correspond to the first CSI resource subset/group (and therefore, the $N_1$ CSI-RS resources for FSBM configured therein) in the resource set, the second bitmap could correspond to the second CSI resource subset/group (and therefore, the $N_2$ CSI-RS resources for FSBM configured therein) in the resource set, and so on, and the K-th bitmap could correspond to the K-th CSI resource subset/group (and therefore, the $N_K$ CSI-RS resources for FSBM configured therein) in the resource set.

For another example, the UE could be provided/indicated by the network, via higher layer RRC signaling/parameter and/or MAC CE command and/or dynamic DCI based signaling, the mapping/association between the K bitmaps and the K CSI resource subsets/groups (and therefore, the corresponding CSI-RS resources for FSBM configured therein) indicated/configured in the same CSI resource set. Optionally, the higher layer parameter(s), e.g., CSI-SSB-ResourceSet/NZP-CSI-RS-ResourceSet, that configures a CSI resource set and provides the K bitmaps could also include/provide indicate the K CSI resource subset/group IDs/indexes each associated/mapped to a bitmap discussed above.

In yet another example, the higher layer parameter that configures a CSI resource setting comprising at least one CSI resource set for FSBM, e.g., CSI-ResourceConfig, could include/indicate a set of one or more (e.g., K) such bitmaps each corresponding/associated to a CSI resource subset/group configured in the CSI resource set(s) for FSBM. For example, the K bitmaps provided in the CSI resource setting are one-to-one mapped to the K CSI resource subsets/groups configured in the CSI resource set(s) for FSBM; for instance, the first bitmap in the resource setting could correspond to the first CSI resource subset/group (and therefore, the $N_1$ CSI-RS resources for FSBM configured therein) in the resource set, the second bitmap in the resource setting could correspond to the second CSI resource subset/group (and therefore, the $N_2$ CSI-RS resources for FSBM configured therein) in the resource set, and so on, and the K-th bitmap in the resource setting could correspond to the K-th CSI resource subset/group (and therefore, the $N_K$ CSI-RS resources for FSBM configured therein) in the resource set.

For another example, the UE could be provided/indicated by the network, via higher layer RRC signaling/parameter and/or MAC CE command and/or dynamic DCI based signaling, the mapping/association between the K bitmaps indicated/configured in the CSI resource setting and the K CSI resource subsets/groups (and therefore, the corresponding CSI-RS resources for FSBM configured therein) indicated/configured in the CSI resource set(s) for FSBM. Optionally, the higher layer parameter(s), e.g., CSI-ResourceConfig, that configures a CSI resource setting and provides the K bitmaps could also include/provide/indicate the K CSI resource subset/group IDs/indexes each associated/mapped to a bitmap discussed above.

For MAC CE based indication, following examples can be provided.

In one example, a MAC CE command could contain/comprise/include/provide at least one bitmap corresponding/associated to a CSI resource subset/group configured/indicated in the CSI resource set for FSBM. For this case, the MAC CE command could also contain/comprise/include the corresponding CSI resource subset/group ID.

In another example, a MAC CE command could contain/comprise/include/provide multiple (e.g., K) bitmaps each corresponding/associated to a CSI resource subset/group configured/indicated in the CSI resource set for FSBM. For example, the K bitmaps provided in the MAC CE command are one-to-one mapped to the K CSI resource subsets/groups configured in the CSI resource set(s) for FSBM; for instance, the first bitmap in the MAC CE command could correspond to the first CSI resource subset/group (and therefore, the $N_1$ CSI-RS resources for FSBM configured therein) in the resource set, the second bitmap in the MAC CE command could correspond to the second CSI resource subset/group (and therefore, the $N_2$ CSI-RS resources for FSBM configured therein) in the resource set, and so on, and the K-th bitmap in the MAC CE command could correspond to the K-th CSI resource subset/group (and therefore, the $N_K$ CSI-RS resources for FSBM configured therein) in the resource set.

For another example, the UE could be provided/indicated by the network, via higher layer RRC signaling/parameter and/or MAC CE command and/or dynamic DCI based signaling, the mapping/association between the K bitmaps indicated/configured/provided in the MAC CE command and the K CSI resource subsets/groups (and therefore, the corresponding CSI-RS resources for FSBM configured therein) indicated/configured in the CSI resource set(s) for FSBM. Optionally, the MAC CE command that provides the K bitmaps could also include/provide/indicate the K CSI resource subset/group IDs/indexes each associated/mapped to a bitmap discussed above.

For dynamic DCI based signaling, one or more new DCI fields can be introduced to indicate one or more of the bitmaps each indicating one or more frequency subbands/CSI-RS resources (in a CSI resource subset/group) for FSBM; alternatively, one or more bits/codepoints of one or more existing DCI fields could be repurposed to indicate one or more of the bitmaps each indicating one or more frequency subbands/CSI-RS resources (in a CSI resource subset/group) for FSBM.

For another example, the UE could receive from the network, via higher layer RRC signaling/parameter and/or MAC CE command and/or dynamic DCI based signaling, a set of one or more frequency subband indexes each determined from $\{1, \ldots, N_k\}$ for the k-th CSI resource subset/group in the resource set, where $k \in \{1, \ldots, K\}$. Here, a frequency subband index is equivalent to a CSI-RS resource ID/index, a frequency subband is equivalent to a CSI-RS resource, a set of one or more frequency subband indexes are equivalent to a set of one or more CSI-RS resource indexes/IDs, and a set of one or more frequency subbands are equivalent to a set of one or more CSI-RS resources. For this case, the frequency subband(s) corresponding to the indicated/configured/provided frequency subband index(es), and therefore, the corresponding CSI-RS resource(s) configured in the CSI resource subset/group, is used/active for FSBM.

The UE could receive at least one set of one or more frequency subband indexes for each CSI resource subset/ group configured in the resource set for FSBM. For RRC based configuration, following examples can be provided.

In one example, the set of one or more frequency subband indexes corresponding/associated to a CSI resource subset/group could be provided in the higher layer parameter NZP-CSI-RS-ResourceSubSet that configures the CSI resource subset/group.

In another example, the higher layer parameter that configures a CSI resource set for FSBM, e.g., NZP-CSI-RS-ResourceSet, could include indicate one or more sets (e.g., K) of one or more frequency subband indexes with each set corresponding/associated to a CSI resource subset/group configured in the same CSI resource set. For example, the K sets of frequency subband index(es) are one-to-one mapped to the K CSI resource subsets/groups configured in the same CSI resource set; for instance, the first set of one or more frequency subband indexes could correspond to the first CSI resource subset/group (and therefore, the $N_1$ CSI-RS resources for FSBM configured therein) in the resource set, the second set of one or more frequency subband indexes could correspond to the second CSI resource subset/group (and therefore, the $N_2$ CSI-RS resources for FSBM configured therein) in the resource set, and so on, and the K-th set of one or more frequency subband indexes could correspond to the K-th CSI resource subset/group (and therefore, the $N_K$ CSI-RS resources for FSBM configured therein) in the resource set.

For another example, the UE could be provided/indicated by the network, via higher layer RRC signaling/parameter and/or MAC CE command and/or dynamic DCI based signaling, the mapping/association between the K sets of frequency subband index(es) and the K CSI resource subsets/groups (and therefore, the corresponding CSI-RS resources for FSBM configured therein) indicated/configured in the same CSI resource set. Optionally, the higher layer parameter(s), e.g., CSI-SSB-ResourceSet/NZP-CSI-RS-ResourceSet, that configures a CSI resource set and provides the K sets of frequency subband indexes could also include/provide/indicate the K CSI resource subset/group IDs/indexes each associated/mapped to a set of frequency subband indexes discussed above.

In yet another example, the higher layer parameter that configures a CSI resource setting comprising at least one CSI resource set for FSBM, e.g., CSI-ResourceConfig, could include/indicate one or more sets (e.g., K) of one or more frequency subband indexes with each set corresponding/associated to a CSI resource subset/group configured in the CSI resource set(s) for FSBM. For example, the K sets of frequency subband index(es) configured in the resource setting are one-to-one mapped to the K CSI resource subsets/groups configured in the CSI resource set(s) for FSBM; for instance, the first set of one or more frequency subband indexes in the resource setting could correspond to the first CSI resource subset/group (and therefore, the $N_1$ CSI-RS resources for FSBM configured therein) in the resource set, the second set of one or more frequency subband indexes in the resource setting could correspond to the second CSI resource subset/group (and therefore, the $N_2$ CSI-RS resources for FSBM configured therein) in the resource set, and so on, and the K-th set of one or more frequency subband indexes in the resource setting could correspond to the K-th CSI resource subset/group (and therefore, the $N_K$ CSI-RS resources for FSBM configured therein) in the resource set.

For another example, the UE could be provided/indicated by the network, via higher layer RRC signaling/parameter and/or MAC CE command and/or dynamic DCI based signaling, the mapping/association between the K sets of frequency subband index(es) indicated/configured in the CSI resource setting and the K CSI resource subsets/groups (and therefore, the corresponding CSI-RS resources for FSBM configured therein) indicated/configured in the CSI resource set(s) for FSBM. Optionally, the higher layer parameter(s), e.g., CSI-ResourceConfig, that configures a CSI resource setting and provides the K sets of frequency subband indexes could also include/provide/indicate the K CSI resource subset/group IDs/indexes each associated/mapped to a set of frequency subband indexes discussed above.

For MAC CE based indication, following examples can be provided.

In one example, a MAC CE command could contain/comprise/include/provide at least one set of frequency subband index(es) corresponding/associated to a CSI resource subset/group configured/indicated in the CSI resource set for FSBM. For this case, the MAC CE command could also contain/comprise/include/provide the corresponding CSI resource subset/group ID.

In another example, a MAC CE command could contain/comprise/include/provide multiple (e.g., K) sets of frequency subband index(es) each corresponding/associated to a CSI resource subset/group configured/indicated in the CSI resource set for FSBM. For example, the K sets of frequency subband index(es) provided in the MAC CE command are one-to-one mapped to the K CSI resource subsets/groups configured in the CSI resource set(s) for FSBM; for instance, the first set of one or more frequency subband indexes in the MAC CE command could correspond to the first CSI resource subset/group (and therefore, the $N_1$ CSI-RS resources for FSBM configured therein) in the resource set, the second set of one or more frequency subband indexes in the MAC CE command could correspond to the second CSI resource subset/group (and therefore, the $N_2$ CSI-RS resources for FSBM configured therein) in the resource set, and so on, and the K-th set of one or more frequency subband indexes in the MAC CE command could correspond to the K-th CSI resource subset/group (and therefore, the $N_K$ CSI-RS resources for FSBM configured therein) in the resource set.

For another example, the UE could be provided/indicated by the network, via higher layer RRC signaling/parameter and/or MAC CE command and/or dynamic DCI based signaling, the mapping/association between the K sets of frequency subband index(es) indicated/configured/provided in the MAC CE command and the K CSI resource subsets/groups (and therefore, the corresponding CSI-RS resources for FSBM configured therein) indicated/configured in the CSI resource set(s) for FSBM. Optionally, the MAC CE command that provides the K sets of frequency subband indexes could also include/provide/indicate the K CSI resource subset/group IDs/indexes each associated/mapped to a set of frequency subband indexes discussed above.

For dynamic DCI based signaling, one or more new DCI fields can be introduced to indicate one or more of the sets of frequency subband index(es), wherein each set could indicate one or more frequency subbands/CSI-RS resources configured in a CSI resource subset/group for FSBM; alternatively, one or more bits/codepoints of one or more existing DCI fields in a DCI format could be repurposed to indicate one or more of the sets of frequency subband index(es), wherein each set could indicate one or more frequency subbands/CSI-RS resources in a CSI resource subset/group for FSBM.

Yet for another example, the UE could receive from the network one or more MAC CE activation commands each activating one or more of the frequency subbands/CSI-RS resources configured in one or more CSI resource subsets/groups, where the activated one or more frequency subbands/CSI-RS resources are used/active for FSBM.

In one example, a MAC CE activation command could activate one or more of the frequency subbands configured/indicated for a CSI resource subset/group (and therefore, one or more of the CSI-RS resources configured/indicated in the CSI resource subset/group), and the activated one or more frequency subbands/CSI-RS resources in the CSI resource subset/group are used/active for FSBM. For this case, the MAC CE activation command could also contain/comprise/include/provide the corresponding CSI resource subset/ group ID.

In another example, a MAC CE activation command could activate multiple (e.g., K) sets of one or more frequency subbands/CSI-RS resources with each set corresponding/associated to a CSI resource subset/group configured/indicated in the CSI resource set for FSBM. For example, the MAC CE activation command could activate the first set of one or more frequency subbands/CSI-RS resources from the $N_1$ frequency subbands/CSI-RS resources indicated/configured for/in the first CSI resource subset/group in the resource set, the second set of one or more frequency subbands/CSI-RS resources from the $N_2$ frequency subbands/CSI-RS resources indicated/configured for/in the second CSI resource subset/group in the resource set, and so on, and the K-th set of one or more frequency subbands/CSI-RS resources from the $N_K$ frequency subbands/CSI-RS resources indicated/configured for/in the K-th CSI resource subset/group in the resource set.

For another example, the UE could be provided/indicated by the network, via higher layer RRC signaling/parameter and/or MAC CE command and/or dynamic DCI based signaling, the mapping/association between the K sets of frequency subbands/CSI-RS resources activated by the MAC CE activation command and the K CSI resource subsets/groups indicated/configured in the CSI resource set(s) for FSBM. A set of frequency subbands/CSI-RS resources activated by the MAC CE activation command are used/active for FSBM. Optionally, the MAC CE activation command that activates the K sets of frequency subbands/CSI-RS resources could also include/provide/indicate the K CSI-RS resource IDs/indexes each associated/mapped to a set of activated frequency subbands/CSI-RS resources.

Yet for another example, the higher layer parameter, e.g., NZP-CSI-RS-Resource, that configures a CSI-RS resource in a CSI resource subset/group for FSBM could include/ indicate/comprise an indicator. If the indicator is set to "enabled"/"on" or the like, the corresponding CSI-RS resource (and therefore, the corresponding frequency subband) is used/active for FSBM for the corresponding CSI resource subset/group. Alternatively, the indicator could correspond to a one-big flag indicator. That is, if the one-bit flag indicator is set to "1" (or "0") or the like, the corresponding CSI-RS resource (and therefore, the corresponding frequency subband) is used/active for FSBM for the corresponding CSI resource subset/group.

In yet another example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. The UE could be configured by the network, e.g., in a CSI resource setting provided by CSI-ResourceConfig, one or more (e.g., K≥1) CSI resource sets (each provided by, e.g., CSI-SSB-ResourceSet/NZP-CSI-RS-ResourceSet) each comprising one or more (e.g., $N_k$) CSI-RS resources for FSBM, where k=1, . . . , K. In particular, the k-th CSI resource set, and therefore, the $N_k$ CSI-RS resources configured therein, could correspond to a set of $N_k \geq 1$ frequency-selective beams (and therefore, the corresponding set of $N_k \geq 1$ frequency subbands), where each CSI-RS resource configured in the k-th CSI resource set could correspond to a frequency-selective beam (and therefore, the corresponding frequency subband).

In the present disclosure, the set of $N_k \geq 1$ frequency-selective beams can also be referred to as a frequency-selective multi-beam. The indication/configuration of the TTD settings, TTD configurations, frequency subbands (in terms of their sizes and/or frequency domain resource allocations and/or etc.) for one or more CSI-RS resources, and the mapping/association between the TTD settings/TTD configurations/frequency subbands and the CSI-RS resources could follow those specified in the design examples in the present disclosure (e.g., by replacing CSI resource subset/group with CSI resource set in one or more of these design examples). Furthermore, the activation/indication of one or more frequency subbands/CSI-RS resources in a CSI resource set for FSBM could follow those specified in the design examples in the present disclosure (e.g., by replacing CSI resource subset/group with CSI resource set in one or more of these design examples).

In yet another example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. The UE could be configured by the network one or more (e.g., K≥1) CSI resource settings (each provided by, e.g., CSI-ResourceConfig) each comprising one or more (e.g., $N_k$) CSI-RS resources for FSBM, where k=1, . . . , K. In particular, the k-th CSI resource setting, and therefore, the $N_k$ CSI-RS resources configured therein, could correspond to a set of $N_k \geq 1$ frequency-selective beams (and therefore, the corresponding set of $N_k \geq 1$ frequency subbands), where each CSI-RS resource configured in the k-th CSI resource setting could correspond to a frequency-selective beam (and therefore, the corresponding frequency subband).

In the present disclosure, the set of $N_k \geq 1$ frequency-selective beams can also be referred to as a frequency-selective multi-beam. The indication/configuration of the TTD settings, TTD configurations, frequency subbands (in terms of their sizes and/or frequency domain resource allocations and/or etc.) for one or more CSI-RS resources, and the mapping/association between the TTD settings/TTD configurations/frequency subbands and the CSI-RS resources could follow those specified in the design examples in the present disclosure (e.g., by replacing CSI resource subset/group with CSI resource setting in one or more of these design examples).

Furthermore, the activation/indication of one or more frequency subbands/CSI-RS resources in a CSI resource setting for FSBM could follow those specified in the design examples in the present disclosure (e.g., by replacing CSI resource subset/group with CSI resource setting in one or more of these design examples).

A UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. As discussed above, a UE could be provided/indicated by the network, e.g., via higher layer RRC signaling/parameter and/or MAC CE command and/or dynamic DCI based signaling, that one or more CSI-RS resources (each corresponding to a SSB resource or a NZP CSI-RS resource) and/or one or more CSI resource subsets/groups (each comprising one or more CSI-RS resources) and/or one or more CSI resource sets (each comprising one or more CSI resource subsets/groups or one or more CSI-RS resources) and/or one or more CSI resource settings (each comprising one or more CSI resource sets or one or more CSI resource subsets/groups or one or more CSI-RS resources) are (configured) for frequency-selective beam measurement for FSBM.

That is, a CSI measurement setting could comprise/configure/indicate/provide CSI resource settings and/or CSI resource sets and/or CSI resource subsets/groups and/or CSI-RS resources for beam measurements for both FSBM and BM (or, non-frequency-selective BM (non-FSBM)); a CSI resource setting could comprise/configure/indicate/provide CSI resource sets and/or CSI resource subsets/groups and/or CSI-RS resources for beam measurements for both FSBM and non-FSBM; a CSI resource set could comprise/configure/indicate/provide CSI resource subsets/groups and/or CSI-RS resources for beam measurements for both FSBM and non-FSBM; and a CSI resource subset/group could comprise/configure/indicate/provide CSI-RS resources for beam measurements for both FSBM and non-FSBM.

In one example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. The UE could be indicated/configured/provided by the network, via higher layer RRC signaling/parameter and/or MAC CE command and/or dynamic DCI based signaling, a bitmap to indicate RS resource(s) for frequency-selective beam measurement for FSBM.

For example, the higher layer parameter, e.g., CSI-MeasConfig, that configures a CSI measurement setting could provide/include/configure/indicate a bitmap with each bit position/entry of the bitmap corresponding to a CSI resource setting configured therein. If a bit position/entry of the bitmap is set to "1" (or "0"), the corresponding CSI resource setting (and therefore, the CSI resource sets and/or the CSI resource subsets/groups and/or CSI-RS resources configured therein) is for frequency-selective beam measurement for FSBM. Alternatively, the UE could receive in a MAC CE command/DCI format the bitmap; the MAC CE command/DCI format could also include/provide/comprise/indicate the corresponding CSI measurement setting ID/index.

For another example, the higher layer parameter, e.g., CSI-ResourceConfig, that configures a CSI resource setting could provide/include/comprise a bitmap with each bit position/entry of the bitmap corresponding to a CSI resource set configured therein. If a bit position/entry of the bitmap is set to "1" (or "0"), the corresponding CSI resource set (and therefore, the CSI resource subsets/groups and/or CSI-RS resources configured therein) is for frequency-selective beam measurement for FSBM. Alternatively, the UE could receive in a MAC CE command/DCI format the bitmap; the MAC CE command/DCI format could also include/provide/comprise/indicate the corresponding CSI resource setting ID/index.

Yet for another example, the higher layer parameter, e.g., CSI-SSB-ResourceSet/NZP-CSI-RS-ResourceSet, that configures a CSI resource set could provide/include/comprise a bitmap with each bit position/entry of the bitmap corresponding to a CSI resource subset/group configured therein. If a bit position/entry of the bitmap is set to "1" (or "0"), the corresponding CSI resource subset/group (and therefore, the CSI-RS resources configured therein) is for frequency-selective beam measurement for FSBM. Alternatively, the UE could receive in a MAC CE command/DCI format the bitmap; the MAC CE command/DCI format could also include/provide/comprise/indicate the corresponding CSI resource set ID/index.

Yet for another example, the higher layer parameter, e.g., CSI-SSB-ResourceSet/NZP-CSI-RS-ResourceSet, that configures a CSI resource set could provide/include/comprise a bitmap with each bit position/entry of the bitmap corresponding to a CSI-RS resource configured therein. If a bit position/entry of the bitmap is set to "1" (or "0"), the corresponding CSI-RS resource (e.g., the corresponding SSB resource or NZP CSI-RS resource) is for frequency-selective beam measurement for FSBM. Alternatively, the UE could receive in a MAC CE command/DCI format the bitmap; the MAC CE command/DCI format could also include/provide/comprise/indicate the corresponding CSI resource set ID/index.

Yet for another example, the higher layer parameter, e.g., CSI-SSB-ResourceSubSet/NZP-CSI-RS-ResourceSubSet, that configures a CSI resource subset/group could provide include/comprise a bitmap with each bit position/entry of the bitmap corresponding to a CSI-RS resource configured therein. If a bit position/entry of the bitmap is set to "1" (or "0"), the corresponding CSI-RS resource (e.g., the corresponding SSB resource or NZP CSI-RS resource) is for frequency-selective beam measurement for FSBM. Alternatively, the UE could receive in a MAC CE command/DCI format the bitmap; the MAC CE command/DCI format could also include/provide/comprise/indicate the corresponding CSI resource subset/group ID/index.

In another example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. A UE could be indicated/configured/provided by the network, via higher layer RRC signaling/parameter and/or MAC CE command and/or dynamic DCI based signaling, a set of IDs/indexes to indicate RS resource(s) for frequency-selective beam measurement for FSBM.

For example, the higher layer parameter, e.g., CSI-MeasConfig, that configures a CSI measurement setting could provide/include/comprise a set of one or more CSI resource setting IDs/indexes. The CSI resource setting(s) (and therefore, the CSI resource sets and/or the CSI resource subsets/groups and/or CSI-RS resources configured therein) that corresponds to the CSI resource setting ID(s)/index(es) configured in the same CSI measurement setting is for frequency-selective beam measurement for FSBM. Alternatively, the UE could receive in a MAC CE command/DCI format the set of one or more CSI resource setting IDs/indexes; the MAC CE command/DCI format could also include/provide/comprise/indicate the corresponding CSI measurement setting ID/index.

For another example, the higher layer parameter, e.g., CSI-ResourceConfig, that configures a CSI resource setting could provide/include/comprise a set of one or more CSI resource set IDs/indexes. The CSI resource set(s) (and therefore, the CSI resource subsets/groups and/or CSI-RS resources configured therein) that corresponds to the CSI resource set ID(s)/index(es) configured in the same CSI resource setting is for frequency-selective beam measurement for FSBM. Alternatively, the UE could receive in a MAC CE command/DCI format the set of one or more CSI resource set IDs/indexes; the MAC CE command/DCI format could also include/provide/comprise/indicate the corresponding CSI resource setting ID/index.

Yet for another example, the higher layer parameter, e.g., CSI-SSB-ResourceSet/NZP-CSI-RS-ResourceSet, that configures a CSI resource set could provide/include/comprise a set of one or more CSI resource subset/group IDs/indexes. The CSI resource subset(s)/group(s) (and therefore, the CSI-RS resources configured therein) that corresponds to the CSI resource subset/group ID(s)/index(es) configured in the same CSI resource subset/group is for frequency-selective beam measurement for FSBM. Alternatively, the UE could receive in a MAC CE command/DCI format the set of one or more CSI resource subset/group IDs/indexes; the MAC CE command/DCI format could also include/provide/comprise/indicate the corresponding CSI resource set ID/index.

Yet for another example, the higher layer parameter, e.g., CSI-SSB-ResourceSet/NZP-CSI-RS-ResourceSet, that configures a CSI resource set could provide/include/comprise a set of one or more CSI-RS resource IDs/indexes. The CSI-RS resource(s) (e.g., the corresponding SSB resource or NZP CSI-RS resource) that corresponds to the CSI-RS resource ID(s)/index(es) configured in the same CSI resource set is for frequency-selective beam measurement for FSBM. Alternatively, the UE could receive in a MAC CE command/DCI format the set of one or more CSI-RS resource IDs/indexes; the MAC CE command/DCI format could also include/provide/comprise/indicate the corresponding CSI resource set ID/index.

Yet for another example, the higher layer parameter, e.g., CSI-SSB-ResourceSubSet/NZP-CSI-RS-ResourceSubSet, that configures a CSI resource subset/group could provide/include/comprise a set of one or more CSI-RS resource IDs/indexes. The CSI-RS resource(s) (e.g., the corresponding SSB resource or NZP CSI-RS resource) that corresponds to the CSI-RS resource ID(s)/index(es) configured in the same CSI resource subset/group is for frequency-selective beam measurement for FSBM. Alternatively, the UE could receive in a MAC CE command/DCI format the set of one or more CSI-RS resource IDs/indexes; the MAC CE command/DCI format could also include/provide/comprise/indicate the corresponding CSI resource subset/group ID/index.

In yet another example, a UE could be configured by the network one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE could be indicated by the network that the one or more RS resources are configured for frequency-selective beam measurement for FSBM; this indication could be via higher layer RRC signaling/parameter and/or MAC CE command and/or dynamic DCI based signaling.

For instance, a higher layer parameter, e.g., denoted by FreqSelectiveBeamMeasurement, could be indicated/provided in CSI-ResourceConfig to turn on/off the frequency-selective beam measurement for FSBM. The UE could be indicated/configured/provided by the network, via higher layer RRC signaling/parameter and/or MAC CE command and/or dynamic DCI based signaling, an indicator to indicate RS resource(s) for frequency-selective beam measurement for FSBM.

For example, the higher layer parameter, e.g., CSI-MeasConfig, that configures a CSI measurement setting could provide/indicate/configure/include the indicator; if the indicator is set to "enabled"/"on" or the like, the CSI resource setting(s)—and therefore, the corresponding CSI resource set(s) and/or CSI resource subset(s)/group(s) and/or CSI-RS resource(s) configured therein—configured in the CSI measurement setting could be for frequency-selective beam measurement for FSBM. Alternatively, the indicator could correspond to a one-bit flag indicator; if the one-bit flag indicator is set to "1" (or "0") or the like, the CSI resource setting(s)—and therefore, the corresponding CSI resource set(s) and/or CSI resource subset(s)/group(s) and/or CSI-RS resource(s) configured therein—configured in the CSI measurement setting could be for frequency-selective beam measurement for FSBM.

For another example, the higher layer parameter, e.g., CSI-ResourceConfig, that configures a CSI resource setting could provide/indicate/configure/include the indicator; if the indicator is set to "enabled"/"on" or the like, the CSI resource set(s)—and therefore, the corresponding CSI resource subset(s)/group(s) and/or CSI-RS resource(s) configured therein—configured in the CSI resource setting could be for frequency-selective beam measurement for FSBM.

Alternatively, the indicator could correspond to a one-bit flag indicator; if the one-bit flag indicator is set to "1" (or "0") or the like, the CSI resource set(s)—and therefore, the corresponding CSI resource set(s) and/or CSI resource subset(s)/group(s) and/or CSI-RS resource(s) configured therein—configured in the CSI resource setting could be for frequency-selective beam measurement for FSBM.

Yet for another example, the higher layer parameter, e.g., CSI-SSB-ResourceSet or NZP-CSI-RS-ResourceSet, that configures a CSI resource set could provide/indicate/configure/include the indicator; if the indicator is set to "enabled"/"on" or the like, the CSI resource subset(s)/group(s)—and therefore, the corresponding CSI-RS resource(s) configured therein—configured in the CSI resource set could be for frequency-selective beam measurement for FSBM.

Alternatively, the indicator could correspond to a one-bit flag indicator; if the one-bit flag indicator is set to "1" (or "0") or the like, the CSI resource subset(s)/group(s)—and therefore, the corresponding CSI-RS resource(s) configured therein—configured in the CSI resource set could be for frequency-selective beam measurement for FSBM.

Yet for another example, the higher layer parameter, e.g., NZP-CSI-RS-Resource, that configures a CSI-RS resource could provide/indicate/configure/include the indicator; if the indicator is set to "enabled"/"on" or the like, the corresponding CSI-RS resource could be for frequency-selective beam measurement for FSBM. Alternatively, the indicator could correspond to a one-bit flag indicator; if the one-bit flag indicator is set to "1" (or "0") or the like, the corresponding CSI-RS resource could be for frequency-selective beam measurement for FSBM.

In yet another example, the RS resource(s) configured/indicated in a CSI resource subset/group as discussed above is for frequency-selective beam measurement for FSBM.

A UE could be indicated/configured by the network, e.g., via higher layer RRC signaling/parameter and/or MAC CE command and/or dynamic DCI based signaling, to report, in one or more CSI reports, frequency selective or frequency subband specific/dependent CSI/beam reporting metrics/quantities for FSBM.

In one example, the UE could receive from the network, e.g., in the CSI reporting setting provided by CSI-Resport-Config, a higher layer parameter, e.g., denoted by Frequen-cySelectiveReporting or FreqSelectiveBeamReporting, to turn on/off frequency selective or frequency subband specific/dependent CSI/beam reporting for FSBM. For instance, when the higher layer parameter (e.g., FrequencySelectiveReporting or FreqSelectiveBeamReporting) in the CSI reporting setting provided by CSI-ReportConfig is configured or set to "enabled," the UE could report, in one or more CSI reports, one or more frequency selective or frequency subband specific/dependent CSI/beam reporting metrics/quantities determined according to the measurement RS resource(s) configured for FSBM (according to those specified in examples in the present disclosure).

In another example, the UE could report, in one or more CSI reports, one or more frequency selective or frequency subband specific/dependent CSI/beam reporting metrics/quantities for FSBM if one or more RS resources are configured for frequency-selective beam measurement for FSBM (according to those specified in examples in the present disclosure).

Yet in another example, a new report quantity could be specified for frequency selective or frequency subband specific/dependent reporting for FSBM (e.g., the new report quantity could be denoted by "frequencySubband"). The UE could report, in one or more CSI reports, one or more frequency selective or frequency subband specific/dependent CSI/beam reporting metrics/quantities such as resource indicator(s) and/or beam metric(s) for one or more frequency subbands if the UE receives, in a CSI reporting setting provided by CSI-ReportConfig, the "reportQuantity" set to "frequencySubband."

Yet in another example, the UE could report, in one or more CSI reports, one or more frequency selective or frequency subband specific/dependent CSI/beam reporting metrics/quantities for FSBM if the UE is configured/indicated by the network that the (beam) measurement for FSBM is enabled—e.g., the UE receives, in a CSI resource setting provided by CSI-ResourceConfig, a higher layer parameter FreqSelectiveBeamMeasurement set to "enabled."

The UE could measure one or more CSI-RS resources (each for a beam) configured in one or more CSI resource settings and/or CSI resource sets and/or CSI resource subsets/groups according to those specified in examples in the present disclosure.

When the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, in one or more CSI reports, one or more frequency selective or frequency subband specific/dependent CSI/beam reporting metrics/quantities determined according to the measurement RS resource(s) configured for FSBM (according to those specified in examples in the present disclosure).

The UE could report information in a CSI report one or more of the following examples (e.g., when the frequency selective or frequency subband specific/dependent reporting for FSBM is enabled/configured—as discussed in examples in the present disclosure).

In one example, a group of one or more (e.g., L≥1) resource indicators (such as SSBRIs/CRIs) each for a CSI-RS resource/frequency subband configured according to examples in the present disclosure for frequency-selective beam measurement for FSBM and/or one or more (e.g., M≥1) beam metrics (such as L1-RSRPs/L1-SINRs) each for a CSI-RS resource/frequency subband configured according to examples in the present disclosure for frequency-selective beam measurement for FSBM.

When the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could also report, e.g., in the CSI report, one or more frequency subbands (or a subset of all frequency subbands configured for a CSI resource subset/group or CSI resource set or CSI resource setting for frequency-selective beam measurement for FSBM) associated to the reported one or more resource indicators/beam metrics—for instance, in the CSI report, the first reported resource indicator/beam metric is associated to the first reported frequency subband, the second reported resource indicator/beam metric is associated to the second reported frequency subband, and so on.

The UE could be configured/indicated/provided by the network, e.g., via higher layer RRC signaling and/or MAC CE command and/or dynamic DCI based signaling, one or more thresholds to determine the resource indicator(s)/beam metric(s), and therefore, the corresponding frequency subband(s)/subset of frequency subband(s), to report.

For example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, e.g., in the CSI report, a set of one or more frequency subband indexes, each pointing to a frequency subband among all the frequency subbands configured for all the CSI-RS resources in the CSI resource subset/group or CSI resource set or CSI resource setting for frequency-selective beam measurement for FSBM. Each frequency subband index in the set indicates/provides a frequency subband, from which a reported resource indicator/beam metric is derived/determined.

For another example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSeleciveBeamReporting, that can turn on/off frequency selective or frequency subband specific/dependent CSI/beam reporting for FSBM, is configured or set to "enabled," the UE could report, e.g., in the CSI report, a bitmap with each bit position/entry in the bitmap corresponding to a frequency subband among all the frequency subbands configured for all the CSI-RS resources in the corresponding CSI resource subset/group or CSI resource set or CSI resource setting for frequency-selective beam measurement for FSBM.

If a bit position/entry of the bitmap is set to "1" (or "0"), the frequency subband corresponding/associated to the bit position/entry is indicated, from which a reported resource indicator/beam metric is derived/determined. The bitmap could have more than one bit positions/entries set to "1" (or "0") each indicating/providing a frequency subband associated/corresponding to a reported resource indicator/beam metric.

Yet for another example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could be indicated/configured by the network, e.g., via higher layer RRC signaling and/or MAC CE command and/or dynamic DCI based signaling, to use one or more of the above described design examples in the present disclosure to report the one or more frequency subbands (or a subset of all frequency subbands configured for the CSI resource subset/group or CSI resource set or CSI resource setting for frequency-selective beam measurement for FSBM) associated to the reported one or more resource indicators/beam metrics.

In one example, a group of one or more (e.g., L≥1) resource indicators (such as SSBRIs/CRIs) each for a CSI-RS resource/frequency subband or a subset of the frequency subbands (or a group of frequency subbands) configured for a CSI resource subset/group or CSI resource set or CSI resource setting configured according to examples in the present disclosure for frequency-selective beam measurement for FSBM and/or one or more beam metrics (such as L1-RSRPs/L1-SINRs) each for a subset of the frequency subbands (or a group of frequency subbands) configured for a CSI resource subset/group or CSI resource set or CSI resource setting configured according to examples in the present disclosure for frequency-selective beam measurement for FSBM.

When the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, e.g., in the CSI report, the one or more subsets/groups of frequency subbands associated to the reported one or more beam metrics/resource indicators—for instance, in the CSI report, the first reported beam metric/resource indicator is associated to the first reported subset/group of frequency subbands, the second reported beam metric/resource indicator is associated to the second reported subset/group of frequency subbands, and so on. The UE could be configured/indicated/provided by the network, e.g., via higher layer RRC signaling and/or MAC CE command and/or dynamic DCI based signaling, one or more thresholds to determine the beam metric(s), and therefore, the corresponding subset(s)/group(s) of frequency subband(s), to report.

For example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the CSI report could comprise one or more first CSI fields for reporting the first subset/group of frequency subbands in form of their indexes among all the frequency subbands configured for all the CSI-RS resources in the corresponding CSI resource subset/group or CSI resource set or CSI resource setting for frequency-selective beam measurement for FSBM, one or more second CSI fields for reporting the second subset/group of frequency subbands in form of their indexes among all the frequency subbands configured for all the CSI-RS resources in the corresponding CSI resource subset/group or CSI resource set or CSI resource setting for frequency-selective beam measurement for FSBM, and so on. The number of the one or more first CSI fields, the number of the one or more second CSI fields, and so on, could be fixed in a CSI report. Furthermore, the position(s) of the one or more first CSI fields in a CSI report, the position(s) of the one or more second CSI field(s) in a CSI report, and so on, could be fixed.

For another example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the CSI report could comprise one or more first CSI fields for reporting the first subset/group of frequency subbands in form of a first bitmap, one or more second CSI fields for reporting the second subset/group of frequency subbands in form of a second bitmap, and so on.

The number of the one or more first CSI fields, the number of the one or more second CSI fields, and so on, could be fixed in a CSI report. Furthermore, the position(s) of the one or more first CSI fields in a CSI report, the position(s) of the one or more second CSI field(s) in a CSI report, and so on, could be fixed. For this example, each bit position/entry of a bitmap could correspond to a frequency subband configured for a CSI resource subset or CSI resource set or CSI resource setting (e.g., the $n_k$-th frequency subband for the k-th CSI resource subset/group with $n_k \in \{1, \ldots, N_k\}$) for frequency-selective beam measurement for FSBM. If a bit position/entry of a bitmap is set to "1" (or "0"), the frequency subband corresponding/associated to the bit position/entry is indicated/identified as a frequency subband in the subset/group of frequency subbands corresponding/associated to the bitmap.

Yet for another example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, e.g., in the CSI report, the number of subsets/groups of frequency subbands associated to the reported beam metrics. Furthermore, the UE could report, e.g., in the CSI report, the number of frequency subbands in one or more of the subsets/groups of frequency subbands.

Yet for another example, the UE could be first indicated/configured/provided by the network, e.g., via higher layer RRC signaling and/or MAC CE command and/or dynamic DCI based signaling, one or more subsets/groups of frequency subbands each comprising one or more frequency subbands among all the frequency subbands configured for all the CSI-RS resources in the corresponding CSI resource subset/group or CSI resource set or CSI resource setting for frequency-selective beam measurement for FSBM. For this case, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could only report, e.g., in the CSI report, one or more beam metrics associated to the configured/indicated one or more subsets/groups of frequency subbands.

Yet for another example, the UE could be first indicated/configured/provided by the network, e.g., via higher layer RRC signaling and/or MAC CE command and/or dynamic DCI based signaling, one or more subsets/groups of frequency subbands each comprising one or more frequency subbands among all the frequency subbands configured for all the CSI-RS resources in the corresponding CSI resource subset/group or CSI resource set or CSI resource setting for frequency-selective beam measurement for FSBM.

When the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, e.g., in the CSI report, indexes of the one or more subsets/groups of frequency subbands associated to the reported beam metrics among the configured/indicated one or more subsets/groups of frequency subbands.

Yet for another example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could report, e.g., in the CSI report, a set of one or more indexes with each entry in the set corresponding/associated to a frequency subband among all the frequency subbands configured for all the CSI-RS resources in the corresponding CSI resource subset/group or CSI resource set or CSI resource setting for frequency-selective beam measurement. If an entry in the set is set to an index of a subset/group of frequency subbands, the frequency subband corresponding/associated to the entry is identified/indicated as a frequency subband in the subset/group of frequency subband whose index is identical to the entry value.

Yet for another example, when the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could (be configured to) use one or more of the above discussed design examples in the present disclosure, to determine and report, e.g., in the CSI report, the one or more subsets/groups of frequency subbands corresponding/associated to the reported beam metrics.

In one example, one or more (e.g., up to $P \geq 1$) groups of resource indicators (such as SSBRIs/CRIs) and/or beam metrics (such as L1-RSRPs/L1-SINRs) with each group comprising one or more (e.g., $L \geq 1$) resource indicators (such as SSBRIs/CRIs) each for a CSI-RS resource/frequency subband configured according to examples in the present disclosure for frequency-selective beam measurement for FSBM and/or one or more (e.g., $M \geq 1$) beam metrics (such as L1-RSRPs/L1-SINRs) each for a CSI-RS resource/frequency subband configured according to examples in the present disclosure for frequency-selective beam measurement for FSBM.

When the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could follow those specified in examples in the present disclosure to report, e.g., in the CSI report, the one or more frequency subbands (or a subset of all frequency subbands configured for a CSI resource subset/group or CSI resource set or CSI resource setting for frequency-selective beam measurement for FSBM) associated to the reported one or more resource indicators/beam metrics in each group.

In one example, one or more (e.g., up to P≥1) groups of resource indicators (such as SSBRIs/CRIs) and/or beam metrics (such as L1-RSRPs/L1-SINRs) with each group comprising one or more (e.g., L≥1) resource indicators (such as SSBRIs/CRIs) each for a CSI-RS resource/frequency subband or a subset of the frequency subbands (or a group of frequency subbands) configured for a CSI resource subset/group or CSI resource set or CSI resource setting configured according to examples in the present disclosure for frequency-selective beam measurement for FSBM and/or one or more beam metrics (such as L1-RSRPs/L1-SINRs) each for a subset of the frequency subbands (or a group of frequency subbands) configured for a CSI resource subset/group or CSI resource set or CSI resource setting configured according to examples in the present disclosure for frequency-selective beam measurement for FSBM.

When the frequency-selective CSI/beam reporting is configured/enabled, e.g., when the UE receives from the network, e.g., in the CSI reporting setting provided by CSI-ResportConfig, a higher layer parameter, e.g., denoted by FrequencySelectiveReporting or FreqSelectiveBeamReporting, that can turn on/off frequency selective or frequency subband specific/dependent CSI/beam reporting for FSBM, is configured or set to "enabled," the UE could follow those specified in examples in the present disclosure to report, e.g., in the CSI report, the one or more subsets/groups of frequency subbands associated to the reported one or more beam metrics/resource indicators in each group.

In the present disclosure, (1) L could be equal to M (L=M), (2) L could be greater than M (L>M) or (3) M could be greater than L (M>L).

The UE could be indicated/configured by the network, e.g., via higher layer RRC signaling/parameter (e.g., in a CSI reporting setting provided by CSI-ReportConfig) and/or MAC CE command and/or dynamic DCI based signaling, to report, e.g., in a CSI report, the beam quantities such as resource indicator(s) (e.g., SSBRI(s)/CRI(s)) and/or beam metric(s) (e.g., L1-RSRP(s)/L1-SINR(s)) following those specified in examples in the present disclosure. For instance, the UE could receive from the network, e.g., in the CSI reporting setting provided by CSI-ResportConfig, a higher layer parameter, e.g., denoted by FrequencySelectiveReporting or FreqSelectiveBeamReporting set to "reportPerSubband" or "reportPerSubbandSet." For this case, when the higher layer parameter FrequencySelectiveReporting or FreqSelectiveBeamReporting is set to "reportPerSubband," the UE could report the beam quantities such as resource indicator(s) (e.g., SSBRI(s)/CRI(s)) and/or beam metric(s) (e.g., L1-RSRP(s)/L1-SINR(s)) and/or the corresponding/associated frequency subband information/configuration following those specified in examples in the present disclosure; when the higher layer parameter FrequencySelectiveReporting or FreqSelectiveBeamReporting is set to "reportPerSubbandSet," the UE could report the beam quantities such as resource indicator(s) (e.g., SSBRI(s)/CRI(s)) and/or beam metric(s) (e.g., L1-RSRP(s)/L1-SINR(s)) and/or the corresponding frequency subband information/configuration following those specified in examples in the present disclosure.

The UE could receive from the network, e.g., in the CSI reporting setting provided by CSI-ResportConfig, a higher layer parameter, e.g., denoted by groupBasedFrequencySelectiveReporting or groupBasedFreqSelectiveBeamReporting, to turn on/off the group based frequency-selective CSI/beam reporting for FSBM specified in examples in the present disclosure. For instance, when the higher layer parameter(s) groupBasedFrequencySelectiveReporting or groupBasedFreqSelectiveBeamReporting is configured or set to "enabled," the UE could report, e.g., in a CSI report, groups of beam quantities such as resource indicators (e.g., SSBRIs/CRIs) and/or beam metrics (e.g., L1-RSRPs/L1-SINRs) and/or the corresponding/associated frequency subband information/configuration following those specified in examples in the present disclosure.

Furthermore, the UE could be indicated/configured by the network, e.g., via higher layer RRC signaling/parameter (e.g., in a CSI reporting setting provided by CSI-ReportConfig) and/or MAC CE command and/or dynamic DCI based signaling, to report, e.g., in a CSI report, groups of beam quantities such as resource indicators (e.g., SSBRIs/CRIs) and/or beam metrics (e.g., L1-RSRPs/L1-SINRs) and/or the corresponding/associated frequency subband information/configuration following those specified in examples in the present disclosure.

For instance, the UE could receive from the network, e.g., in the CSI reporting setting provided by CSI-ResportConfig, a higher layer parameter, e.g., denoted by groupBasedFrequencySelectiveReporting or groupBasedFreqSelectiveBeamReporting set to "reportPerSubband" or "reportPerSubbandSet." For this case, when the higher layer parameter groupBasedFrequencySelectiveReporting or groupBasedFreqSelectiveBeamReporting is set to "reportPerSubband," the UE could report, e.g., in a CSI report, the groups of beam quantities such as resource indicators (e.g., SSBRIs/CRIs) and/or beam metrics (e.g., L1-RSRPs/L1-SINRs) and/or the corresponding/associated frequency subband information/configuration following those specified in examples in the present disclosure; when the higher layer parameter groupBasedFrequencySelectiveReporting or groupBasedFreqSelectiveBeamReporting is set to "reportPerSubbandSet," the UE could report, e.g., in a CSI report, the beam quantities such as resource indicators (e.g., SSBRIs/CRIs) and beam metrics (e.g., L1-RSRPs/L1-SINRs) and/or the corresponding frequency subband information/configuration following those specified in examples in the present disclosure.

As discussed/described in examples in the present disclosure, a UE could report, e.g., in a CSI report, more than one (i.e., L>1) resource indicators such as SSBRIs/CRIs each for a CSI-RS resource/frequency subband or a subset of the frequency subbands (or a group of frequency subbands) configured for a CSI resource subset/group or CSI resource set or CSI resource setting configured according to examples in the present disclosure for frequency-selective beam measurement for FSBM.

For example, the value/number of L or the maximum value/number of L (e.g., denoted by $L_{max}$) are fixed in the system specifications (e.g., L=2, 4, 8, 16, 32, and 64, and $L_{max}$=2, 4, 8, 16, 32, and 64).

For another example, the UE could be indicated/configured/provided by the network, e.g., via higher layer RRC signaling (e.g., in a CSI reporting setting provided by CSI-ReportConfig) and/or MAC CE command and/or dynamic DCI based signaling, the value/number of L or the maximum value/number of L (e.g., denoted by $L_{max}$).

Yet for another example, the value/number of L could correspond/equal to the number of CSI-RS resources/frequency subbands or the number of subsets/groups of frequency subbands configured for a CSI resource subset/group or CSI resource set or CSI resource setting configured according to examples in the present disclosure for frequency-selective beam measurement for FSBM.

Yet for another example, the UE could autonomously determine the value/number of L, e.g., as the number of reporting frequency subbands determined/reported by the UE according to those specified in examples in the present disclosure or the number of reporting subset/group of frequency subbands determined/reported by the UE according to those specified in examples in the present disclosure. For this case, the UE could also report, e.g., in the CSI report, the value/number of L.

As discussed/described in examples in the present disclosure, a UE could report, e.g., in a CSI report, more than one (i.e., M>1) beam metrics such as L1-RSRPs/L1-SINRs each for a CSI-RS resource/frequency subband or a subset of the frequency subbands (or a group of frequency subbands) configured for a CSI resource subset/group or CSI resource set or CSI resource setting configured according to examples in the present disclosure for frequency-selective beam measurement for FSBM.

For example, the value/number of M or the maximum value/number of M (e.g., denoted by $M_{max}$) are fixed in the system specifications (e.g., M=2, 4, 8, 16, 32, and 64, and $M_{max}$=2, 4, 8, 16, 32, and 64).

For another example, the UE could be indicated/configured/provided by the network, e.g., via higher layer RRC signaling (e.g., in a CSI reporting setting provided by CSI-ReportConfig) and/or MAC CE command and/or dynamic DCI based signaling, the value/number of M or the maximum value/number of M (e.g., denoted by $M_{max}$).

Yet for another example, the value/number of M could correspond/equal to the number of CSI-RS resources/frequency subbands or the number of subsets/groups of frequency subbands configured for a CSI resource subset/group or CSI resource set or CSI resource setting configured according to examples in the present disclosure for frequency-selective beam measurement for FSBM.

Yet for another example, the UE could autonomously determine the value/number of M, e.g., as the number of reporting frequency subbands determined/reported by the UE according to those specified in examples in the present disclosure or the number of reporting subset/group of frequency subbands determined/reported by the UE according to those specified in examples in the present disclosure. For this case, the UE could also report. e.g., in the CSI report, the value/number of M.

Based on the above discussed/described design examples, when the higher layer parameter, e.g., FrequencySelectiveReporting or FreqSelectiveBeamReporting, is configured and/or set to "enabled," "reportPerSubband" or "reportPerSubbandSet," and/or when the value/number of M—determined/configured according to examples in the present disclosure—is greater than one, the UE could use differential (RSRP/SINR) reporting for one or more of the beam metrics.

Differential RSRP reporting: the largest measured value of L1-RSRP is quantized to a 7-bit value in the range [−140, −44] dBm with 1 dB step size, and a differential L1-RSRP is quantized to a 4-bit value. The differential L1-RSRP value is computed with 2 dB step size with a reference to the largest measured L1-RSRP value which is part of the same L1-RSRP reporting instance.

Differential SINR reporting: the largest measured value of L1-SINR is quantized to a 7-bit value in the range [−23, −40] dBm with 0.5 dB step size, and a differential L1-SINR is quantized to a 4-bit value. The differential L1-SINR value is computed with 1 dB step size with a reference to the largest measured L1-SINR value which is part of the same L1-SINR reporting instance.

As discussed/described in examples in the present disclosure, a UE could report, e.g., in a CSI report, more than one groups (i.e., P>1) of resource indicators and/or beam metrics with each group comprising one or more (e.g., L≥1) resource indicators (such as SSBRIs/CRIs) each for a CSI-RS resource/frequency subband or a subset of the frequency subbands (or a group of frequency subbands) configured for a CSI resource subset/group or CSI resource set or CSI resource setting configured according to examples in the present disclosure for frequency-selective beam measurement for FSBM and/or one or more beam metrics (such as L1-RSRPs/L1-SINRs) each for a CSI-RS resource/frequency subband or a subset of the frequency subbands (or a group of frequency subbands) configured for a CSI resource subset/group or CSI resource set or CSI resource setting configured according to examples in the present disclosure for frequency-selective beam measurement for FSBM.

The value/number of L and/or the maximum value/number of L, i.e., $L_{max}$, for each group could be determined/configured according to examples in the present disclosure. The value/number of L and/or the maximum value/number of L, i.e., $L_{max}$, for each group could be determined/configured according to examples in the present disclosure. The value/number of P and/or the maximum value/number of P, e.g., denoted by $P_{max}$, could be determined/configured according to one or more of the following design examples.

For example, the value/number of P or the maximum value/number of P (i.e., $P_{max}$) are fixed in the system specifications (e.g., P=2, 4, 8, 16, 32, and 64, and $P_{max}$=2, 4, 8, 16, 32, and 64).

For another example, the UE could be indicated/configured/provided by the network, e.g., via higher layer RRC signaling (e.g., in a CSI reporting setting provided by CSI-ReportConfig) and/or MAC CE command and/or dynamic DCI based signaling, the value/number of P or the maximum value/number of P (i.e., $P_{max}$).

Yet for another example, the UE could autonomously determine the value/number of P. For this case, the UE could also report, e.g., in the CSI report, the value/number of P.

Based on the above discussed/described design examples, when the higher layer parameter, e.g., FrequencySelectiveReporting or FreqSelectiveBeamReporting, is configured and/or set to "enabled," "reportPerSubband" or "reportPerSubbandSet," and/or when the higher layer parameter, e.g., groupBasedFrequencySelectiveReporting or groupBasedFreqSelectiveBeamReporting, is configured and/or set to "enabled," "reportPerSubband" or "reportPerSubbandSet," and/or when the value/number of P—determined/configured according to examples in the present disclosure—is greater than one, and/or when the value/number of M—determined/configured according to examples in the present disclosure—is greater than one, the UE could use differential (RSRP/SINR) reporting for one or more of the beam metrics in each of the one or more of the reported groups.

In one example, the differential (RSRP/SINR) reporting is applied/enabled per reported group as shown in following examples.

In one example of differential RSRP reporting per reported group, the largest measured value of L1-RSRP in a reported group is quantized to a 7-bit value in the range

[−140, −44] dBm with 1 dB step size, and a differential L1-RSRP in a reported group is quantized to a 4-bit value. The differential L1-RSRP value is computed with 2 dB step size with a reference to the largest measured L1-RSRP value which is part of the same reported group and L1-RSRP reporting instance.

In one example of differential SINR reporting per reported group, the largest measured value of L1-SINR in a reported group is quantized to a 7-bit value in the range [−23, −40] dBm with 0.5 dB step size, and a differential L1-SINR in a reported group is quantized to a 4-bit value. The differential L1-SINR value is computed with 1 dB step size with a reference to the largest measured L1-SINR value which is part of the same reported group and L1-SINR reporting instance.

In another example, the differential (RSRP/SINR) reporting is applied/enabled across one or more reported groups as show in following examples.

In one example of differential RSRP reporting across one or more reported groups, the largest measured value of L1-RSRP in the one or more reported groups is quantized to a 7-bit value in the range [−140, −44] dBm with 1 dB step size, and a differential L1-RSRP in the one or more reported groups is quantized to a 4-bit value. The differential L1-RSRP value is computed with 2 dB step size with a reference to the largest measured L1-RSRP value in the one or more reported groups which is part of the same L1-RSRP reporting instance.

In one example of differential SINR reporting across one or more reported groups, the largest measured value of L1-SINR in the one or more reported groups is quantized to a 7-bit value in the range [−23, −40] dBm with 0.5 dB step size, and a differential L1-SINR in the one or more reported groups is quantized to a 4-bit value. The differential L1-SINR value is computed with 1 dB step size with a reference to the largest measured L1-SINR value in the one or more reported groups which is part of the same L1-SINR reporting instance.

Furthermore, the UE could be indicated/configured/provided by the network, e.g., via higher layer RRC signaling/parameter (e.g., in a CSI reporting setting provided by CSI-ReportConfig) and/or MAC CE command and/or dynamic DCI based signaling, the differential (RSRP/SINR) reporting format(s)—i.e., those specified in examples in the present disclosure—to use/apply for the frequency-selective beam reporting for FSBM. Alternatively, the UE could autonomously determine the differential (RSRP/SINR) reporting format(s) to use/apply—i.e., follow those specified in examples in the present disclosure; for this case, the UE could also indicate to the network, e.g., in part of the CSI report, the differential (RSRP/SINR) reporting format(s) applied/used at the UE side.

For the above discussed frequency subband (selective) reporting settings/formats, a UE could report, e.g., in the same CSI report, one or more report quantities (including one or more resource indicators, beam metrics, TTD delay estimates, frequency subband indexes and/or etc.) for FSBM and one or more report quantities (including resource indicators, beam metrics and/or etc.) for non-FSBM.

In one example, the UE could report, e.g., in the CSI report, a bitmap to indicate one or more reporting quantities for frequency-selective beam reporting for FSBM. Each bit position/entry of the bitmap could correspond to a reporting quantity in the same report. If a bit position/entry of the bitmap is set to "1" (or "0"), the corresponding reporting quantity (e.g., a resource indicator, a beam metric, a TTD delay estimate, a frequency subband index and/or etc.) is for the frequency-selective beam reporting for FSBM. Otherwise, if a bit position/entry of the bitmap is set to "0" (or "1"), the corresponding reporting quantity (e.g., a resource indicator, a beam metric and/or etc.) is for the non-FSBM beam reporting.

In another example, the UE could report, e.g., in the same CSI report, one or more report quantities determined according to the RS resource(s) configured for frequency-selective beam measurement for FSBM according to those specified in one or more of the design examples in the present disclosure and one or more report quantities determined according to the RS resource(s) configured for non-FSBM beam measurement according to those specified in one or more of the design examples in the present disclosure.

A UE could be indicated/configured/provided by the network, e.g., via higher layer RRC signaling/parameter and/or MAC CE command and/or dynamic DCI based signaling, that frequency-selective beam management (FSBM) is enabled (or not enabled/disabled).

In one example, the UE could receive from the network, e.g., in the higher layer parameter CSI-ResportConfig that configures a CSI reporting setting, CSI-ResourceConfig that configures a CSI resource setting, CSI-SSB-ResourceSet/NZP-CSI-RS-ResourceSet that configures a CSI resource set, NZP-CSI-RS-Resource that configures a NZP CSI-RS resource, TCI-State/QCL-Info/DLorJointTCI-State/UL-TCIState that configures a TCI state, a higher layer parameter, e.g., denoted by FreqSelectiveBeamManagement, set to "enabled"/"disabled" to turn on/off frequency selective or frequency subband specific/dependent beam management. When/if the higher layer parameter FreqSelectiveBeamManagement that is configured/provided in the higher layer parameter(s) CSI-ReportConfig, CSI-ResourceConfig, CSI-SSB-ResourceSet/NZP-CSI-RS-ResourceSet or NZP-CSI-RS-Resource is set to "enabled," the corresponding CSI reporting setting, CSI resource setting, CSI resource set (e.g., SSB resource set or NZP CSI-RS resource set) or NZP CSI-RS resource could be referred to as the CSI reporting setting for FSBM, CSI resource setting for FSBM, CSI resource set (e.g., SSB resource set or NZP CSI-RS resource set) for FSBM, or NZP CSI-RS resource for FSBM.

In another example, the UE could receive from the network, e.g., a MAC CE activation/deactivation command, to activate and/or deactivate the FSBM or the frequency selective/frequency subband specific/dependent beam management.

In yet another example, one or more new/dedicated DCI fields could be introduced in a DCI format (e.g., DCI format 1_1 or 1_2) or one or more bits/codepoints of one or more existing/reserved DCI fields in a DCI format (e.g., DCI format 1_1 or 1_2) could be repurposed to indicate that the FSBM or the frequency selective/frequency subband specific/dependent beam management is enabled. For instance, the UE could receive, e.g., in a DCI, a one-bit indicator set to "1" (or "0") indicating that the FSBM or the frequency selective/frequency subband specific/dependent beam management is enabled, and/or "0" (or "1") indicating that the FSBM or the frequency selective/frequency subband specific/dependent beam management is not enabled/disabled. As discussed above, the one-bit indicator could be indicated in a DCI by introducing one or more new/dedicated DCI fields in a DCI format (e.g., DCI format 1_1 or 1_2) or repurposing one or more bits/codepoints of one or more existing/reserved DCI fields in a DCI format (e.g., DCI format 1_1 or 1_2).

When the FSBM or frequency selective/frequency subband specific/dependent beam management is enabled (according to examples in the present disclosure), a UE could be configured/indicated/provided by the network, e.g., via higher layer RRC signaling/parameter and/or MAC CE command and/or dynamic DCI based signaling, one or more (e.g., $N_{meas} \geq 1$) frequency subbands each comprising one or more PRBs for frequency-selective beam measurement for FSBM—referred to as $N_{meas}$ FSBM measurement subbands in the present disclosure. The one or more PRBs in each FSBM measurement subband could be continuous, e.g., continuously indexed in frequency, or non-continuous. The UE could be configured/indicated/provided by the network, e.g., via higher layer RRC signaling/parameter and/or MAC CE command and/or dynamic DCI based signaling, the FSBM measurement subband size—in number of PRBs (or size of each of the FSBM measurement subbands in number of PRBs).

In one instance, the UE could be first indicated/configured/provided by the network, e.g., via higher layer RRC signaling/parameter and/or MAC CE command and/or dynamic DCI based signaling, a BWP (and therefore, the corresponding BWP size in number of PRBs and etc.) for FSBM.

In one instance, the UE could be provided by the network, e.g., in a CSI resource setting provided by CSI-ResourceConfig or a CSI reporting setting provided by CSI-ReportConfig, a higher layer parameter subbandsizeforFSBMmeas set to either "value1" or "value2."

If the higher layer parameter subbandsizeforFSBMmeas is set to "value1," the first value/number of subband size corresponding/associated to the BWP is used/determined as the FSBM measurement subband size; if the higher layer parameter subbandsizeforFSBMmeas is set to "value2," the second value/number of subband size corresponding/associated to the BWP is used/determined as the FSBM measurement subband size.

The association/mapping between the potential/candidate subband size(s) and BWP(s) could be fixed in the system specifications (e.g., in the 3GPP standard specification)—see TABLE 1 in the present disclosure, and known to both the network and UE sides a prior. As can be seen from TABLE 1 in the present disclosure, each BWP could correspond to two candidate values/numbers of (FSBM) subband size. Alternatively, the UE could be configured/indicated/provided by the network, e.g., via higher layer RRC signaling/parameter and/or MAC CE command and/or dynamic DCI based signaling, the potential/candidate subband size(s) for a BWP or the association/mapping between the potential/candidate subband size(s) and BWP(s).

TABLE I

| Mapping/association relationship between BWP(s) and candidate subband size(s) | |
|---|---|
| Bandwidth part (BWP) - PRBs | Subband size (PRBs) |
| <24 | N/A |
| 24-72 | 4, 8 |
| 73-144 | 8, 16 |
| 145-275 | 16, 32 |

Furthermore, the UE could be indicated/configured/provided by the network, e.g., via higher layer RRC signaling/parameter and/or MAC CE command and/or dynamic DCI based signaling, a bitmap with each bit position/entry in the bitmap corresponding/associated to a subband within the BWP. For instance, the UE could receive from the network, e.g., in a CSI resource setting provided by CSI-ResourceConfig or a CSI resource set provided by CSI-SSB-ResourceSet/NZP-CSI-RS-ResourceSet or a CSI-RS resource provided by NZP-CSI-RS-Resource or a CSI reporting setting provided by CSI-ReportConfig, the bitmap. If a bit position/entry of the bitmap is set to "1" (or "0"), the frequency subband corresponding/associated to the bit position/entry is used/determined as a FSBM measurement subband. For this case, the bitmap could contain/comprise $N_{meas}$ bit positions/entries set to "1"s (or "0"s) indicating/configuring a total of $N_{meas}$ FSBM measurement subbands.

In the present disclosure, when the FSBM or frequency selective/frequency subband specific/dependent beam management is enabled (according to examples in the present disclosure), a UE could be configured by the network one or more RS resources for frequency-selective beam measurement for FSBM, and report to the network, e.g., in a CSI report, one or more beam/report quantities for one or more of the RS resources configured for the frequency-selective beam measurement for FSBM, wherein one RS resource (e.g., corresponding to a SSB resource index or a NZP CSI-RS resource configuration index) could correspond to one or more FSBM measurement subbands, and each of the reported beam/report quantities (e.g., comprising at least one resource indicator such as SSBRI/CRI and/or one beam metric such as L1-RSRP/L1-SINR) could correspond to one or more FSBM measurement subbands.

In one example, when the FSBM or frequency selective/frequency subband specific/dependent beam management is enabled (according to examples in the present disclosure), the UE could be configured by the network one or more CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSubSet)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with one or more (e.g., $1 \leq M_{meas} \leq N_{meas}$) of the total configured $N_{meas} \geq 1$ FSBM measurement subbands. In particular, for a CSI-RS resource (e.g., a NZP CSI-RS resource provided by NZP-CSI-RS-Resource) or each of the CSI-RS resources configured for frequency-selective beam measurement for FSBM, For example, all of the configured $N_{meas}$ FSBM measurement subbands could be active/used for frequency-selective beam measurement/reporting for the corresponding CSI-RS resource. For this case, $M_{meas}=N_{meas}$. The UE could also be indicated/configured/provided by the network, e.g., via higher layer RRC signaling and/or MAC CE command and/or dynamic DCI based signaling, that $M_{meas}=N_{meas}$.

For another example, the UE could be configured/indicated/provided by the network, e.g., via higher layer RRC signaling/parameter and/or MAC CE command and/or dynamic DCI based signaling, a bitmap of length $N_{meas}$ for the CSI-RS resource with each bit position/entry of the bitmap corresponding/associated to a FSBM measurement subband. For instance, the UE could receive from the network, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap.

If a bit position/entry of the bitmap is set to "1" (or "0"), the FSBM measurement subband corresponding/associated to the bit position/entry is active/used for frequency-selective beam measurement/reporting for the corresponding CSI-RS resource. For this example, the bitmap could contain/comprise $1 \leq M_{meas} \leq N_{meas}$ bit positions/entries set to "1"s (or "0"s) indicating that a total of $M_{meas}$ FSBM measurement subbands—out of the total $N_{meas}$ configured FSBM measurement subbands—could be active/used for the frequency-selective beam measurement/reporting for the corresponding CSI-RS resource.

Furthermore, the UE could be configured/indicated/provided by the network, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K \geq 1$ such bitmaps each associated/mapped to a CSI-RS resource configured therein—e.g., the first bitmap could be associated/mapped to the first CSI-RS resource, the second bitmap could be associated/mapped to the second CSI-RS resource, and so on. Different bitmaps could have the same bit position(s)/entry(s) set to "1" (or "0").

Yet for another example, the UE could be configured/indicated/provided by the network, e.g., via higher layer RRC signaling/parameter and/or MAC CE command and/or dynamic DCI based signaling, a set of $1 \leq M_{meas} \leq N_{meas}$ (subband) indexes for the CSI-RS resource with each (subband) index corresponding/pointing to a FSBM measurement subband—e.g., the (subband) indexes 1, 2, . . . , $M_{meas}$ could correspond/point to the first FSBM measurement subband, the second FSBM measurement subband, . . . , the $M_{meas}$-th FSBM measurement subband, respectively, among all the configured $N_{meas}$ FSBM measurement subbands.

For instance, the UE could receive from the network, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes.

For this case, the $M_{meas}$ FSBM measurement subband(s) corresponding/associated to the indicated/provided/configured (subband) index(es) could be active/used for the frequency-selective beam measurement/reporting for the corresponding CSI-RS resource. Furthermore, the UE could be configured/indicated/provided by the network, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K \geq 1$ such sets of (subband) indexes each associated/mapped to a CSI-RS resource configured therein—e.g., the first set could be associated/mapped to the first CSI-RS resource, the second set could be associated/mapped to the second CSI-RS resource, and so on. Different sets of (subband) indexes could contain/comprise the same (subband) indexes.

In another example, when the FSBM or frequency selective/frequency subband specific/dependent beam management is enabled (according to examples in the present disclosure), the UE could be configured by the network one or more (e.g., $K \geq 1$) CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSub-Set)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with a FSBM measurement subband.

In particular, for the one or more (e.g., $K \geq 1$) CSI-RS resources (e.g., $K \geq 1$ NZP CSI-RS resources each provided by NZP-CSI-RS-Resource) configured in the same CSI resource subset/group (e.g., provided by NZP-CSI-RS-ResourceSubSet) or the same CSI resource set (e.g., provided by NZP-CSI-RS-ResourceSet) or the same CSI resource setting (e.g., provided by CSI-ResourceConfig) for frequency-selective beam measurement for FSBM, following examples can be provided.

In one example, the first configured CSI-RS resource (e.g., the first NZP CSI-RS resource) could be associated/mapped to the first configured FSBM measurement subband, the second configured CSI-RS resource (e.g., the second NZP CSI-RS resource) could be associated/mapped to the second configured FSBM measurement subband, and so on, and the K-th configured CSI-RS resource (e.g., the K-th NZP CSI-RS resource) could be associated/mapped to the $N_{meas}$-th configured FSBM measurement subband. For this case, $K=N_{meas}$.

In one example, the UE could be configured/indicated/provided by the network, e.g., via higher layer RRC signaling/parameter and/or MAC CE command and/or dynamic DCI based signaling, a bitmap of length $N_{meas}$ for the one or more (e.g., $K \geq 1$) CSI-RS resources configured in the same CSI resource subset/group or the same CSI resource set or the same CSI resource setting with each bit position/entry of the bitmap corresponding/associated to a FSBM measurement subband. For instance, the UE could receive from the network, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap.

If a bit position/entry of the bitmap is set to "1" (or "0"), the FSBM measurement subband corresponding/associated to the bit position/entry is active/used for frequency-selective beam measurement/reporting for one of the one or more (e.g., $K \geq 1$) CSI-RS resources (e.g., one of the $K \geq 1$ NZP CSI-RS resources). For this example, the bitmap could contain/comprise $1 \leq M_{meas} \leq N_{meas}$ bit positions/entries set to "1"s (or "0"s) indicating that a total of M. FSBM measurement subbands—out of the total $N_{meas}$ configured FSBM measurement subbands—could be active/used for the frequency-selective beam measurement/reporting for the one or more (e.g., K≥1) CSI-RS resources (or the K≥1 NZP CSI-RS resources)—e.g., the first bit position/entry in the bitmap set to "1" (or "0")—and therefore, the corresponding FSBM measurement subband—could be associated/mapped to the first CSI-RS resource (or the first NZP CSI-RS resource), the second bit position/entry in the bitmap set to "1" (or "0")—and therefore, the corresponding FSBM measurement subband—could be associated/mapped to the second CSI-RS resource (or the second NZP CSI-RS resource), and so on, and the $M_{meas}$-th bit position/entry set to "1" (or "0")—and therefore, the corresponding FSBM measurement subband—could be associated/mapped to the K-th CSI-RS resource (or the K-th NZP CSI-RS resource).

For this case, $M_{meas}$=K. Alternatively, the higher layer parameter NZP-CSI-RS-Resource that configures a NZP CSI-RS resource could contain/comprise/provide a bitmap of length $N_{meas}$ for the corresponding NZP CSI-RS resource with each bit position/entry of the bitmap corresponding/associated to a FSBM measurement subband. For instance, if a bit position/entry of the bitmap is set to "1" (or "0"), the FSBM measurement subband corresponding/associated to the bit position/entry could be used/active for the frequency-selective beam measurement/reporting for the corresponding NZP CSI-RS resource.

In one example, the UE could be configured/indicated/provided by the network, e.g., via higher layer RRC signaling/parameter and/or MAC CE command and/or dynamic DCI based signaling, a set of 1≤$M_{meas}$ δ$N_{meas}$ (subband) indexes for the one or more (e.g., K≥1) CSI-RS resources configured in the same CSI resource subset/group or the same CSI resource set or the same CSI resource setting with each (subband) index corresponding/pointing to a FSBM measurement subband—e.g., the (subband) indexes 1, 2, . . . , $M_{meas}$ could correspond/point to the first FSBM measurement subband, the second FSBM measurement subband, . . . , the $M_{meas}$-th FSBM measurement subband, respectively, among all the configured $N_{meas}$ FSBM measurement subbands.

For instance, the UE could receive from the network, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes.

For this case, each of the $M_{meas}$ FSBM measurement subband(s) corresponding/associated to the indicated/provided/configured (subband) index(es) could be active/used for the frequency-selective beam measurement/reporting for one of the one or more (e.g., K≥1) CSI-RS resources (e.g., one of the K≥1 NZP CSI-RS resources)—e.g., the first (subband) index in the set—and therefore, the corresponding FSBM measurement subband—could be associated/mapped to the first CSI-RS resource (or the first NZP CSI-RS resource), the second (subband) index in the set—and therefore, the corresponding FSBM measurement subband—could be associated/mapped to the second CSI-RS resource (or the second NZP CSI-RS resource), and so on, and the $M_{meas}$-th (subband) index in the set—and therefore, the corresponding FSBM measurement subband—could be associated/mapped to the K-th CSI-RS resource (or the K-th NZP CSI-RS resource).

For this case, $M_{meas}$=K. Alternatively, the higher layer parameter NZP-CSI-RS-Resource that configures a NZP CSI-RS resource could contain/comprise/provide a (subband) index for the corresponding NZP CSI-RS resource. For instance, the FSBM measurement subband corresponding/associated to the (subband) index could be used/active for the frequency-selective beam measurement/reporting for the corresponding NZP CSI-RS resource.

When the FSBM or frequency selective/frequency subband specific/dependent beam management is enabled (according to examples in the present disclosure), a UE could be configured/indicated/provided by the network, e.g., via higher layer RRC signaling/parameter and/or MAC CE command and/or dynamic DCI based signaling, one or more (e.g., $N_{report}$≥1) frequency subbands each comprising one or more PRBs for frequency-selective beam reporting for FSBM—referred to as $N_{report}$ FSBM reporting subbands in the present disclosure. The one or more PRBs in each FSBM reporting subband could be continuous, e.g., continuously indexed in frequency, or non-continuous. The UE could be configured/indicated/provided by the network, e.g., via higher layer RRC signaling/parameter and/or MAC CE command and/or dynamic DCI based signaling, the FSBM reporting subband size—in number of PRBs (or size of each of the FSBM reporting subbands in number of PRBs).

In one instance, the UE could be first indicated/configured/provided by the network, e.g., via higher layer RRC signaling/parameter and/or MAC CE command and/or dynamic DCI based signaling, a BWP (and therefore, the corresponding BWP size in number of PRBs and etc.) for FSBM.

In one instance, the UE could be provided by the network, e.g., in a CSI resource setting provided by CSI-ResourceConfig or a CSI reporting setting provided by CSI-ReportConfig, a higher layer parameter subbandsizeforFSBMreport set to either "value1" or "value2."

In one instance, if the higher layer parameter subbandsizeforFSBMreport is set to "value1," the first value/number of subband size corresponding/associated to the BWP is used/determined as the FSBM reporting subband size; if the higher layer parameter subbandsizeforFSBMreport is set to "value2," the second value/number of subband size corresponding/associated to the BWP is used/determined as the FSBM reporting subband size.

In one instance, the association/mapping between the potential/candidate subband size(s) and BWP(s) could be fixed in the system specifications (e.g., in the 3GPP standard specification)—see TABLE 1 in the present disclosure, and known to both the network and UE sides a prior. As can be seen from TABLE 1 in the present disclosure, each BWP could correspond to two candidate values/numbers of (FSBM) subband size. Alternatively, the UE could be configured/indicated/provided by the network, e.g., via higher layer RRC signaling/parameter and/or MAC CE command and/or dynamic DCI based signaling, the potential/candidate subband size(s) for a BWP or the association/mapping between the potential/candidate subband size(s) and BWP(s).

Furthermore, the UE could be indicated/configured/provided by the network, e.g., via higher layer RRC signaling/parameter and/or MAC CE command and/or dynamic DCI based signaling, a bitmap with each bit position/entry corresponding/associated to a subband within the BWP. For instance, the UE could receive from the network, e.g., in a CSI resource setting provided by CSI-ResourceConfig or a CSI resource set provided by CSI-SSB-ResourceSet/NZP-CSI-RS-ResourceSet or a CSI-RS resource provided by ZP-CSI-RS-Resource or a CSI reporting setting provided by CSI-ReportConfig, the bitmap. If a bit position/entry of the bitmap is set to "1" (or "0"), the frequency subband corresponding/associated to the bit position/entry is used/determined as a FSBM reporting subband. For this case, the bitmap could contain/comprise $N_{report}$ bit positions/entries set to "1"s (or "0"s) indicating/configuring a total of $N_{report}$ FSBM reporting subbands.

In the present disclosure, when the FSBM or frequency selective/frequency subband specific/dependent beam management is enabled (according to examples in the present disclosure), a UE could be configured by the network one or more RS resources for frequency-selective beam measurement for FSBM, and report to the network, e.g., in a CSI report, one or more beam/report quantities for one or more of the RS resources configured for the frequency-selective beam measurement for FSBM, wherein one RS resource (e.g., corresponding to a SSB resource index or a NZP CSI-RS resource configuration index) could correspond to one or more FSBM reporting subbands, and each of the reported beam/report quantities (e.g., comprising at least one resource indicator such as SSBRI/CRI and/or one beam metric such as L1-RSRP/L1-SINR) could correspond to one or more FSBM reporting subbands.

In one example, when the FSBM or frequency selective/frequency subband specific/dependent beam management is enabled (according to examples in the present disclosure), the UE could be configured by the network one or more CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSubSet)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with one or more (e.g., $1 \leq M_{report} \leq N_{report}$) of the total configured $N_{report} \geq 1$ FSBM reporting subbands. In particular, for a CSI-RS resource (e.g., a NZP CSI-RS resource provided by NZP-CSI-RS-Resource) or each of the CSI-RS resources configured for frequency-selective beam measurement for FSBM.

For example, all of the configured $N_{report}$ FSBM reporting subbands could be active/used for frequency-selective beam measurement/reporting for the corresponding CSI-RS resource. For this case, $M_{report} = N_{report}$. The UE could also be indicated/configured/provided by the network, e.g., via higher layer RRC signaling and/or MAC CE command and/or dynamic DCI based signaling, that $M_{report} = N_{report}$.

For another example, the UE could be configured/indicated/provided by the network, e.g., via higher layer RRC signaling/parameter and/or MAC CE command and/or dynamic DCI based signaling, a bitmap of length $N_{report}$ for the CSI-RS resource with each bit position/entry of the bitmap corresponding/associated to a FSBM reporting subband. For instance, the UE could receive from the network, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap.

If a bit position/entry of the bitmap is set to "1" (or "0"), the FSBM reporting subband corresponding/associated to the bit position/entry is active/used for frequency-selective beam measurement/reporting for the corresponding CSI-RS resource. For this example, the bitmap could contain/comprise $1 \leq M_{report} \leq N_{report}$ bit positions/entries set to "1"s (or "0"s) indicating that a total of $M_{report}$ FSBM reporting subbands—out of the total $N_{report}$ configured FSBM reporting subbands—could be active/used for the frequency-selective beam measurement/reporting for the corresponding CSI-RS resource.

Furthermore, the UE could be configured/indicated/provided by the network, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K \geq 1$ such bitmaps each associated/mapped to a CSI-RS resource configured therein—e.g., the first bitmap could be associated/mapped to the first CSI-RS resource, the second bitmap could be associated/mapped to the second CSI-RS resource, and so on. Different bitmaps could have the same bit position(s)/entry(s) set to "1" (or "0").

Yet for another example, the UE could be configured/indicated/provided by the network, e.g., via higher layer RRC signaling/parameter and/or MAC CE command and/or dynamic DCI based signaling, a set of $1 \leq M_{report} \leq N_{report}$ (subband) indexes for the CSI-RS resource with each (subband) index corresponding/pointing to a FSBM reporting subband—e.g., the (subband) indexes $1, 2, \ldots, M_{report}$ could correspond/point to the first FSBM reporting subband, the second FSBM reporting subband, ..., the $M_{report}$-th FSBM reporting subband, respectively, among all the configured $N_{report}$ FSBM reporting subbands.

For instance, the UE could receive from the network, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, the $M_{report}$ FSBM reporting subband(s) corresponding/associated to the indicated/provided/configured (subband) index(es) could be active/used for the frequency-selective beam measurement/reporting for the corresponding CSI-RS resource.

Furthermore, the UE could be configured/indicated/provided by the network, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, K≥1 such sets of (subband) indexes each associated/mapped to a CSI-RS resource configured therein—e.g., the first set could be associated/mapped to the first CSI-RS resource, the second set could be associated/mapped to the second CSI-RS resource, and so on. Different sets of (subband) indexes could contain/comprise the same (subband) indexes.

In another example, when the FSBM or frequency selective/frequency subband specific/dependent beam management is enabled (according to examples in the present disclosure), the UE could be configured by the network one or more (e.g., K≥1) CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSub-Set)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with a FSBM reporting subband.

In particular, for the one or more (e.g., K≥1) CSI-RS resources (e.g., K≥1 NZP CSI-RS resources each provided by NZP-CSI-RS-Resource) configured in the same CSI resource subset/group (e.g., provided by NZP-CSI-RS-ResourceSubSet) or the same CSI resource set (e.g., provided by NZP-CSI-RS-ResourceSet) or the same CSI resource setting (e.g., provided by CSI-ResourceConfig) for frequency-selective beam measurement for FSBM, following examples can be provided.

For example, the first configured CSI-RS resource (e.g., the first NZP CSI-RS resource) could be associated/mapped to the first configured FSBM reporting subband, the second configured CSI-RS resource (e.g., the second NZP CSI-RS resource) could be associated/mapped to the second configured FSBM reporting subband, and so on, and the K-th configured CSI-RS resource (e.g., the K-th NZP CSI-RS resource) could be associated/mapped to the $N_{report}$-th configured FSBM reporting subband. For this case, $K=N_{report}$.

For another example, the UE could be configured/indicated/provided by the network, e.g., via higher layer RRC signaling/parameter and/or MAC CE command and/or dynamic DCI based signaling, a bitmap of length $N_{report}$ for the one or more (e.g., K≥1) CSI-RS resources configured in the same CSI resource subset/group or the same CSI resource set or the same CSI resource setting with each bit position/entry of the bitmap corresponding/associated to a FSBM reporting subband. For instance, the UE could receive from the network, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap.

If a bit position/entry of the bitmap is set to "1" (or "0"), the FSBM reporting subband corresponding/associated to the bit position/entry is active/used for frequency-selective beam measurement/reporting for one of the one or more (e.g., K≥1) CSI-RS resources (e.g., one of the K≥1 NZP CSI-RS resources). For this example, the bitmap could contain/comprise $1≤M_{report}≤N_{report}$ bit positions/entries set to "1"s (or "0"s) indicating that a total of $M_{report}$ FSBM measurement subbands—out of the total $N_{report}$ configured FSBM reporting subbands—could be active/used for the frequency-selective beam measurement/reporting for the one or more (e.g., K≥1) CSI-RS resources (or the K≥1 NZP CSI-RS resources)—e.g., the first bit position/entry in the bitmap set to "1" (or "0")—and therefore, the corresponding FSBM reporting subband—could be associated/mapped to the first CSI-RS resource (or the first NZP CSI-RS resource), the second bit position/entry in the bitmap set to "1" (or "0")—and therefore, the corresponding FSBM reporting subband—could be associated/mapped to the second CSI-RS resource (or the second NZP CSI-RS resource), and so on, and the $M_{report}$-th bit position/entry set to "1" (or "0")—and therefore, the corresponding FSBM reporting subband—could be associated/mapped to the K-th CSI-RS resource (or the K-th NZP CSI-RS resource). For this case, $M_{report}=K$.

Alternatively, the higher layer parameter NZP-CSI-RS-Resource that configures a NZP CSI-RS resource could contain/comprise/provide a bitmap of length $N_{report}$ for the corresponding NZP CSI-RS resource with each bit position/entry of the bitmap corresponding/associated to a FSBM reporting subband. For instance, if a bit position/entry of the bitmap is set to "1" (or "0"), the FSBM reporting subband corresponding/associated to the bit position/entry could be used/active for the frequency-selective beam measurement/reporting for the corresponding NZP CSI-RS resource.

Yet for another example, the UE could be configured/indicated/provided by the network, e.g., via higher layer RRC signaling/parameter and/or MAC CE command and/or dynamic DCI based signaling, a set of $1≤M_{report}≤N_{report}$ (subband) indexes for the one or more (e.g., K≥1) CSI-RS resources configured in the same CSI resource subset/group or the same CSI resource set or the same CSI resource setting with each (subband) index corresponding/pointing to a FSBM reporting subband—e.g., the (subband) indexes 1, 2, . . . , $M_{report}$ could correspond/point to the first FSBM reporting subband, the second FSBM reporting subband, . . . , the $M_{report}$-th FSBM reporting subband, respectively, among all the configured $N_{report}$ FSBM reporting subbands.

For instance, the UE could receive from the network, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes.

For this case, each of the $M_{report}$ FSBM reporting subband(s) corresponding/associated to the indicated/provided/configured (subband) index(es) could be active/used for the frequency-selective beam measurement/reporting for one of the one or more (e.g., K≥1) CSI-RS resources (e.g., one of the K≥1 NZP CSI-RS resources)—e.g., the first (subband) index in the set—and therefore, the corresponding FSBM reporting subband—could be associated/mapped to the first CSI-RS resource (or the first NZP CSI-RS resource), the second (subband) index in the set—and therefore, the corresponding FSBM reporting subband—could be associated/mapped to the second CSI-RS resource (or the second NZP CSI-RS resource), and so on, and the $M_{report}$-th (subband) index in the set—and therefore, the corresponding FSBM reporting subband—could be associated/mapped to the K-th CSI-RS resource (or the K-th NZP CSI-RS resource).

For this case, $M_{report}$=K. Alternatively, the higher layer parameter NZP-CSI-RS-Resource that configures a NZP CSI-RS resource could contain/comprise/provide a (subband) index for the corresponding NZP CSI-RS resource. For instance, the FSBM reporting subband corresponding/associated to the (subband) index could be used/active for the frequency-selective beam measurement/reporting for the corresponding NZP CSI-RS resource.

FIG. 12 illustrates an example of mapping a CSI-RS resource to one or more measurement/reporting frequency subbands 1200 according to embodiments of the present disclosure. An embodiment of the mapping between the CSI-RS resource and the one or more measurement/reporting frequency subbands 1200 shown in FIG. 12 is for illustration only.

When the FSBM or frequency selective/frequency subband specific/dependent beam management is enabled (according to examples in the present disclosure), the FSBM measurement subband(s) and the FSBM reporting subband(s) could be the same or different (i.e., $N_{meas}$=$N_{meas}$, $N_{meas}$≥$N_{report}$ on or $N_{meas}$≤$N_{report}$)—see FIG. 12.

For example, when the FSBM or frequency selective/frequency subband specific/dependent beam management is enabled (according to examples in the present disclosure), the UE could be configured/indicated/provided by the network, e.g., via higher layer RRC signaling/parameter and/or MAC CE command and/or dynamic DCI based signaling, the same frequency subband(s) for both frequency-selective beam measurement and reporting (i.e., $N_{meas}$=$N_{report}$). For this case, the UE could only be configured/indicated/provided by the network, e.g., via higher layer RRC signaling/parameter and/or MAC CE command and/or dynamic DCI based signaling, either the FSBM measurement subband(s) or the FSBM reporting subband(s) according to the above discussed/described design examples. The UE could be further indicated by the network that the FSBM measurement subband(s) is the same as the FSBM reporting subband(s) or vice versa; this indication could be via higher layer RRC signaling/parameter and/or MAC CE command and/or dynamic DCI based signaling.

For another example, when the FSBM or frequency selective/frequency subband specific/dependent beam management is enabled (according to examples in the present disclosure), the FSBM measurement subband(s) could be a subset of the FSBM reporting subband(s), or vice versa.

In one example, when the FSBM or frequency selective/frequency subband specific/dependent beam management is enabled (according to examples in the present disclosure), the association/mapping between the FSBM measurement subband(s) and the FSBM reporting subband(s) could be fixed in the system specification(s)—e.g., the first FSBM measurement subband could correspond to the first FSBM reporting subband, the second FSBM measurement subband could correspond to the second FSBM reporting subband, and so on.

In another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between one or more of the FSBM measurement subband(s) and one or more of the FSBM reporting subband(s).

Furthermore, when the FSBM or frequency selective/frequency subband specific/dependent beam management is enabled (according to examples in the present disclosure), the FSBM measurement subband(s) that is active/used for frequency-selective beam measurement/reporting for one or more CSI-RS resources—referred to as active FSBM measurement subband(s) in the present disclosure (configured according to those specified in examples in the present disclosure) and the FSBM reporting subband(s) that is active/used for frequency-selective beam measurement/reporting for one or more CSI-RS resources—referred to as active FSBM reporting subband(s) in the present disclosure (configured according to those specified in examples in the present disclosure) could be the same or different (i.e., $M_{meas}$=$M_{report}$, $M_{meas}$≥$M_{report}$ or $M_{meas}$≤$M_{report}$).

For example, when the FSBM or frequency selective/frequency subband specific/dependent beam management is enabled (according to examples in the present disclosure), the UE could be configured/indicated/provided by the network, e.g., via higher layer RRC signaling/parameter and/or MAC CE command and/or dynamic DCI based signaling, the same frequency subband(s) for both active FSBM measurement subband(s) and active FSBM reporting subband(s) (i.e., $M_{meas}$=$M_{report}$). For this case, the UE could only be configured/indicated/provided by the network, e.g., via higher layer RRC signaling/parameter and/or MAC CE command and/or dynamic DCI based signaling, either the active FSBM measurement subband(s)—following those specified in examples in the present disclosure, or the active FSBM reporting subband(s)—following those specified in examples in the present disclosure. The UE could be further indicated by the network that the active FSBM measurement subband(s) is the same as the active FSBM reporting subband(s) or vice versa; this indication could be via higher layer RRC signaling/parameter and/or MAC CE command and/or dynamic DCI based signaling.

For another example, when the FSBM or frequency selective/frequency subband specific/dependent beam management is enabled (according to examples in the present disclosure), the active FSBM measurement subband(s) could be a subset of the active FSBM reporting subband(s), or vice versa.

In one example, when the FSBM or frequency selective/frequency subband specific/dependent beam management is enabled (according to examples in the present disclosure), the association/mapping between the active FSBM measurement subband(s) and the active FSBM reporting subband(s) could be fixed in the system specification(s)—e.g., the first active FSBM measurement subband could correspond to the first active FSBM reporting subband, the second active FSBM measurement subband could correspond to the second active FSBM reporting subband, and so on.

In another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between one or more of the active FSBM measurement subband(s) and one or more of the active FSBM reporting subband(s).

As discussed above, when the FSBM or frequency selective/frequency subband specific/dependent beam management is enabled (according to examples in the present disclosure), a UE could report to the network, e.g., in a CSI report (provided/configured by a CSI reporting setting CSI-ReportConfig—also referred to as a CSI reporting setting for FSBM), one or more (e.g., $K_{report}$≥1) beam/report quantities for one or more of the RS resources configured for the frequency-selective beam measurement for FSBM, wherein each of the reported beam/report quantities (e.g., comprising at least one resource indicator such as SSBRI/CRI and/or one beam metric such as L1-RSRP/L1-SINR) could correspond to one or more FSBM measurement/reporting subbands.

In one example, when the FSBM or frequency selective/frequency subband specific/dependent beam management is enabled (according to examples in the present disclosure), the UE could report, e.g., in a CSI report (provided/configured by a CSI reporting setting CSI-ReportConfig—also referred to as a CSI reporting setting for FSBM), $K_{report} \geq 1$ beam/report quantities each for a FSBM measurement subband or a FSBM reporting subband configured according to the above discussed/design examples.

For example, when the FSBM or frequency selective/frequency subband specific/dependent beam management is enabled (according to examples in the present disclosure), the association/mapping between the beam/report quantity(s) and the FSBM measurement/reporting subband(s) is fixed in the system specification(s)—e.g., the first reported beam/report quantity could correspond to the first FSBM measurement/reporting subband, the second reported beam/report quantity could correspond to the second FSBM measurement/reporting subband, and so on.

For another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between one or more of the beam/report quantity(s) and one or more of the FSBM measurement/reporting subband(s).

In another example, when the FSBM or frequency selective/frequency subband specific/dependent beam management is enabled (according to examples in the present disclosure), the UE could report, e.g., in a CSI report (provided/configured by a CSI reporting setting CSI-ReportConfig—also referred to as a CSI reporting setting for FSBM), $K_{report} \geq 1$ beam/report quantities each for an active FSBM measurement subband or an active FSBM reporting subband configured according to the above discussed/design examples.

For example, when the FSBM or frequency selective/frequency subband specific/dependent beam management is enabled (according to examples in the present disclosure), the association/mapping between the beam/report quantity(s) and the active FSBM measurement/reporting subband(s) is fixed in the system specification(s)—e.g., the first reported beam/report quantity could correspond to the first active FSBM measurement/reporting subband, the second reported beam/report quantity could correspond to the second active FSBM measurement/reporting subband, and so on.

For another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between one or more of the beam/report quantity(s) and one or more of the active FSBM measurement/reporting subband(s).

In yet another example, when the FSBM or frequency selective/frequency subband specific/dependent beam management is enabled (according to examples in the present disclosure), the UE could report, e.g., in a CSI report (configured/provided by a CSI reporting setting CSI-Report- Config—also referred to as a CSI reporting setting for FSBM), $K_{report} \geq 1$ beam/report quantities each for a subset of the total configured $N_{meas}$ FSBM measurement subbands (the subset could comprise one or more FSBM measurement subbands) or a subset of the total configured $N_{report}$ FSBM reporting subbands (the subset could comprise one or more FSBM reporting subbands) configured according to the above discussed/design examples.

The UE could be configured/indicated/provided by the network, e.g., via higher layer RRC signaling/parameter and/or MAC CE command and/or dynamic DCI based signaling, one or more subsets of the total configured $N_{meas}$ FSBM measurement subbands or how the $(N_{meas})$ FSBM measurement subbands are partitioned into one or more subsets of FSBM measurement subbands and/or one or more subsets of the total configured $N_{report}$ FSBM reporting subbands or how the $(N_{report})$ FSBM reporting subbands are partitioned into one or more subsets of FSBM reporting subbands.

For example, when the FSBM or frequency selective/frequency subband specific/dependent beam management is enabled (according to examples in the present disclosure), the association/mapping between the beam/report quantity(s) and the subset(s) of FSBM measurement/reporting subband(s) is fixed in the system specification(s)—e.g., the first reported beam/report quantity could correspond to the first subset of FSBM measurement/reporting subband(s), the second reported beam/report quantity could correspond to the second subset of FSBM measurement/reporting subband(s), and so on.

For another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between one or more of the beam/report quantity(s) and one or more of the subset(s) of FSBM measurement/reporting subband(s).

In yet another example, when the FSBM or frequency selective/frequency subband specific/dependent beam management is enabled (according to examples in the present disclosure), the UE could report, e.g., in a CSI report (configured/provided by a CSI reporting setting CSI-Report-Config—also referred to as a CSI reporting setting for FSBM), $K_{report} \geq 1$ beam/report quantities each for a subset of the total configured $M_{meas}$ active FSBM measurement subbands (the subset could comprise one or more active FSBM measurement subbands) or a subset of the total configured $M_{report}$ active FSBM reporting subbands (the subset could comprise one or more active FSBM reporting subbands) configured according to the above discussed/design examples.

The UE could be configured/indicated/provided by the network, e.g., via higher layer RRC signaling/parameter and/or MAC CE command and/or dynamic DCI based signaling, one or more subsets of the total configured $M_{meas}$ active FSBM measurement subbands or how the $(M_{meas})$ active FSBM measurement subbands are partitioned into one or more subsets of active FSBM measurement subbands and/or one or more subsets of the total configured $M_{report}$ active FSBM reporting subbands or how the $(M_{report})$ active FSBM reporting subbands are partitioned into one or more subsets of active FSBM reporting subbands.

For example, when the FSBM or frequency selective/frequency subband specific/dependent beam management is enabled (according to examples in the present disclosure), the association/mapping between the beam/report quantity(s) and the subset(s) of active FSBM measurement/reporting subband(s) is fixed in the system specification(s)—e.g., the first reported beam/report quantity could correspond to the first subset of active FSBM measurement/reporting subband(s), the second reported beam/report quantity could correspond to the second subset of active FSBM measurement/reporting subband(s), and so on.

For another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between one or more of the beam/report quantity(s) and one or more of the subset(s) of active FSBM measurement/reporting subband(s).

FIG. 13 illustrates a flowchart of method 1300 for UE reporting on a configured frequency subband or subset of frequency subbands according to embodiments of the present disclosure. The method 1300 as may be performed by a UE (e.g., 111-116 as illustrated in FIG. 1). An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, in step 1302, a UE is configured/indicated/provided by the network, via higher layer RRC signaling/parameter and/or MAC CE command and/or dynamic DCI based signaling, one or more reporting subbands or one or more subsets of one or more reporting subbands; each reporting subband or each subset of reporting subband(s) is for at least one beam/report quantity. Next, in step 1304, the UE reports, e.g., in a CSI report/CSI reporting instance, one or more beam/report quantities each for a configured reporting subband or a configured subset of reporting subband(s).

Alternatively, when the FSBM or frequency selective/frequency subband specific/dependent beam management is enabled (according to examples in the present disclosure), the UE could be configured/indicated/provided by the network, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, to report, e.g., in a CSI report, $K_{report} \geq 1$ beam/report quantities each for a FSBM measurement subband or a FSBM reporting subband following those specified in examples in the present disclosure (an example of the corresponding algorithm flow is presented in FIG. 13), or $K_{report} \geq 1$ beam/report quantities each for an active FSBM measurement subband or an active FSBM reporting subband following those specified in examples in the present disclosure, or $K_{report} \geq 1$ beam/report quantities each for a subset of the total configured $M_{meas}$ FSBM measurement subbands (the subset could comprise one or more active FSBM measurement subbands) or a subset of the total configured $M_{report}$ FSBM reporting subbands (the subset could comprise one or more active FSBM reporting subbands) following those specified in examples in the present disclosure, or $K_{report} \geq 1$ beam/report quantities each for a subset of the total configured $M_{meas}$ active FSBM measurement subbands (the subset could comprise one or more active FSBM measurement subbands) or a subset of the total configured $M_{report}$ active FSBM reporting subbands (the subset could comprise one or more active FSBM reporting subbands) following those specified in examples in the present disclosure.

The UE could be indicated/provided/configured by the network, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, the value/number of Kan.

When the FSBM or frequency selective/frequency subband specific/dependent beam management is enabled (according to examples in the present disclosure), a UE could be configured/indicated/provided by the network, e.g., via higher layer RRC signaling/parameter and/or MAC CE command and/or dynamic DCI based signaling, one or more (e.g., $N_{tx} \geq 1$) frequency subbands each comprising one or more PRBs for frequency-selective transmission(s) of one or more DL/UL control/data channels/signals for FSBM—referred to as $N_{tx}$ FSBM transmission subbands in the present disclosure.

The one or more PRBs in each FSBM transmission subband could be continuous, e.g., continuously indexed in frequency, or non-continuous. The UE could be configured/indicated/provided by the network, e.g., via higher layer RRC signaling/parameter and/or MAC CE command and/or dynamic DCI based signaling, the FSBM transmission subband size—in number of PRBs (or size of each of the FSBM transmission subbands in number of PRBs)—for one or more DL/UL control/data channels/signals.

In one instance, the UE could be first indicated/configured/provided by the network, e.g., via higher layer RRC signaling/parameter and/or MAC CE command and/or dynamic DCI based signaling, a BWP (and therefore, the corresponding BWP size in number of PRBs and etc.) for FSBM.

In one instance, the UE could be provided/configured/indicated by the network, e.g., via higher layer RRC signaling/parameter (e.g., in PDCCH-Config/PDSCH-Config or in a CSI resource setting provided by CSI-ResourceConfig or a CSI reporting setting provided by CSI-ReportConfig) and/or MAC CE command and/or dynamic DCI based signaling (e.g., in DCI format 1_1 or 1_2 with or without DL assignment), a parameter/field subbandsizeforFSBMtransmission—for one or more DL/UL control/data channels/signals—set to either "value1" or "value2."

In one instance, if the parameter/field subbandsizeforFSBMtransmission is set to "value1," the first value/number of subband size corresponding/associated to the BWP is used/determined as the FSBM transmission subband size for the one or more DL/UL control/data channels/signals; if the parameter/field subbandsizeforFSBMtransmission is set to "value2," the second value/number of subband size corresponding/associated to the BWP is used/determined as the FSBM transmission subband size for the one or more DL/UL control/data channels/signals.

In one instance, the association/mapping between the potential/candidate subband size(s) and BWP(s) 13 e.g., for one or more DL/UL control/data channels/signals—could be fixed in the system specifications (e.g., in the 3GPP standard specification)—see TABLE 1 in the present disclosure, and known to both the network and UE sides a prior. As can be seen from TABLE 1 in the present disclosure, each BWP could correspond to two candidate values/numbers of (FSBM) subband size.

Alternatively, the UE could be configured/indicated/provided by the network, e.g., via higher layer RRC signaling/parameter and/or MAC CE command and/or dynamic DCI based signaling, the potential/candidate subband size(s) for a BWP for the one or more DL/UL control/data channels/signals or the association/mapping between the potential/candidate subband size(s) and BWP(s) for the one or more DL/UL control/data channels/signals.

The indicated/configured/provided FSBM transmission subband size could be for all DL/UL control/data channels/signals (e.g., PDCCH, PDSCH, PUCCH and PUSCH). Optionally, the UE could be indicated/configured/provided by the network, e.g., via higher layer RRC signaling/parameter and/or MAC CE command and/or dynamic DCI based signaling as discussed/described above, a set of one or more subband sizes with each subband size corresponding/associated to a channel/signal (e.g., PDCCH, PDSCH, PUCCH or PUSCH) or a subset of one or more channels/signals (e.g., PDCCH and PDSCH).

In one example, when the FSBM or frequency selective/frequency subband specific/dependent beam management is enabled (according to examples in the present disclosure), the association/mapping between the (set of) one or more subband sizes and the channels/signals are fixed in the system specifications. For example, the first subband size could be indicated/configured for PDCCH, the second subband size could be indicated/configured for PDSCH, the third subband size could be indicated/configured for PUCCH, and the fourth subband size could be indicated/configured for PUSCH. For another example, the first subband size could be indicated/configured for DL control/data channels/signals such as PDCCH and PDSCH, and the second subband size could be indicated/configured for UL control/data channels/signals such as PUCCH and PUSCH. Yet for another example, the first subband size could be indicated/configured for control channels/signals such as PDCCH and PUCCH, and the second subband size could be indicated/configured for data channels/signals such as PDSCH and PUSCH.

In another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between the (set of) one or more subband sizes and the channels/signals. For example, the subband size(s) for a channel/signal or a subset of one or more channels/signals could be indicated/configured/provided in the higher layer parameter(s)—e.g., PDCCH-Config, PDSCH-Config, ControlResourceSet, PUCCH-Config, PUSCH-Config and etc.—that configures the corresponding channel/signal or the corresponding subset of one or more channels/signals. For another example, the subband size(s) for a channel/signal or a subset of one or more channels/signals could be indicated in one or more DCIs (e.g., in DCI format 1_1 or 1_2); the indication could be via one or more new/dedicated DCI fields in the DCI format(s) or repurposing one or more bits/codepoints of one or more existing/reserved DCI fields in the DCI format(s).

Furthermore, the DCI(s)/DCI format(s)—e.g., DCI format 1_1 or 1_2 with or without DL assignment that indicates the subband size(s) for a channel/signal or a subset of one or more channels/signals could also provide/indicate one or more TCI states/TCI state IDs for the corresponding channel/signal or the corresponding subset of channels/signals; alternatively, the DCI(s)/DCI format(s)—e.g., DCI format 1_1 or 1_2—that indicates the subband size(s) for a channel/signal or a subset of one or more channels/signals could also provide/indicate resource assignment/allocation/scheduling for the corresponding channel/signal or the corresponding subset of channels/signals.

Furthermore, when the FSBM or frequency selective/frequency subband specific/dependent beam management is enabled (according to examples in the present disclosure), the UE could be indicated/configured/provided by the network, e.g., via higher layer RRC signaling/parameter (e.g., in PDCCH-Config, PDSCH-Config, CSI-ResourceConfig, CSI-ReportConfig, TCI-State, QCL-Info, DLorJointTCI-State or ULTCI-State) and/or MAC CE command and/or dynamic DCI based signaling (e.g., in DCI format 1_1 or 1_2 with or without DL assignment), a bitmap—for one or more DL/UL control/data channels/signals—with each bit position/entry in the bitmap corresponding/associated to a subband within the BWP.

For instance, the UE could be indicated by the network, e.g., in a DCI (e.g., DCI format 1_1 or 1_2), the bitmap; for this case, one or more new/dedicated DCI fields could be introduced in the corresponding DCI format(s) and/or one or more bits/codepoints of one or more existing/reserved DCI fields in the corresponding DCI format(s) could be repurposed to indicate the bitmap. If a bit position/entry of the bitmap is set to "1" (or "0"), the frequency subband corresponding/associated to the bit position/entry is used/determined as a FSBM transmission subband for the one or more DL/UL control/data channels/signals.

For this case, the bitmap could contain/comprise $N_{fx}$ bit positions/entries set to "1"s (or "0"s) indicating/configuring a total of $N_{fx}$ FSBM transmission subbands for the one or more DL/UL control/data channels/signals. The bitmap, and therefore, the corresponding indicated/configured $N_{fx}$ FSBM transmission subbands, could be for all DL/UL control/data channels/signals such as PDCCH, PDSCH, PUCCH and PUSCH. Optionally, the UE could be indicated/configured/provided by the network, e.g., via higher layer RRC signaling/parameter and/or MAC CE command and/or dynamic DCI based signaling as discussed/described above, a set of one or more such bitmaps with each bitmap corresponding/associated to a channel/signal (e.g., PDCCH, PDSCH, PUCCH or PUSCH) or a subset of one or more channels/signals (e.g., PDCCH and PDSCH).

In one example, when the FSBM or frequency selective/frequency subband specific/dependent beam management is enabled (according to examples in the present disclosure), the association/mapping between the (set of) one or more bitmaps and the channels/signals are fixed in the system specifications. For example, the first bitmap could be indicated/configured for PDCCH, the second bitmap could be indicated/configured for PDSCH, the third bitmap could be indicated/configured for PUCCH, and the fourth bitmap could be indicated/configured for PUSCH. For another example, the first bitmap could be indicated/configured for DL control/data channels/signals such as PDCCH and PDSCH, and the second bitmap could be indicated/configured for UL control/data channels/signals such as PUCCH and PUSCH. Yet for another example, the first bitmap could be indicated/configured for control channels/signals such as PDCCH and PUCCH, and the second bitmap could be indicated/configured for data channels/signals such as PDSCH and PUSCH.

In another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between the (set of) one or more bitmaps and the channels/signals. For example, the bitmap(s) for a channel/signal or a subset of one or more channels/signals could be indicated/configured/provided in the higher layer parameter(s)—e.g., PDCCH-Config, PDSCH-Config, ControlResourceSet, PUCCH-Config, PUSCH-Config and etc.—that configures the corresponding channel/signal or the corresponding subset of one or more channels/signals.

For another example, the bitmap(s) for a channel/signal or a subset of one or more channels/signals could be indicated in one or more DCIs (e.g., in DCI format 1_1 or 1_2); the indication could be via one or more new/dedicated DCI fields in the DCI format(s) or repurposing one or more bits/codepoints of one or more existing/reserved DCI fields in the DCI format(s). Furthermore, the DCI(s)/DCI format(s)—e.g., DCI format 1_1 or 1_2 with or without DL assignment—that indicates the bitmap(s) for a channel/signal or a subset of one or more channels/signals could also provide/indicate one or more TCI states/TCI state IDs for the corresponding channel/signal or the corresponding subset of channels/signals; alternatively, the DCI(s)/DCI format(s)—e.g., DCI format 1_1 or 1_2—that indicates the bitmap(s) for a channel/signal or a subset of one or more channels/signals could also provide/indicate resource assignment/allocation/scheduling for the corresponding channel/signal or the corresponding subset of channels/signals.

In the present disclosure, when the FSBM or frequency selective/frequency subband specific/dependent beam management is enabled (according to examples in the present disclosure), a UE could be indicated by the network, e.g., via MAC CE and/or DCI (e.g., DCI format 1_1 or 1_2 with or without DL assignment), one or more TCI states/TCI state IDs for frequency-selective transmission(s) for FSBM, wherein each TCI state could comprise/indicate/contain one or more QCL source RSs with the same or different QCL types—e.g., QCL-TypeD; each TCI state and/or each QCL source RS indicated in/by a TCI state could correspond to one or more FSBM transmission subbands. For DCI based TCI state/beam indication, the one or more TCI states/TCI state IDs could be indicated via one or more TCI codepoints in one or more TCI fields of the corresponding DCI format.

Furthermore, a TCI state could correspond to a joint DL and UL TCI state provided by the higher layer parameter DLorJointTCI-State, a separate DL TCI state provided by the higher layer parameter DLorJointTCI-State, a separate UL TCI state provided by the higher layer parameter ULTCI-State or a Rel-15/16 TCI state provided by TCI-State. In the present disclosure, a TCI state could be indicated for UE-dedicated reception on PDSCH/PDCCH or dynamic-grant/configured-grant based PUSCH and all of dedicated PUCCH resources.

In one example, when the FSBM or frequency selective/frequency subband specific/dependent beam management is enabled (according to examples in the present disclosure), the UE could be indicated by the network, e.g., via MAC CE and/or DCI (e.g., DCI format 1_1 or 1_2 with or without DL assignment), one or more TCI states/TCI state IDs each indicating/comprising/containing one or more QCL source RSs with the same or different QCL types—e.g., QCL-TypeD. Each of the indicated TCI states (and therefore, the QCL source RS(s) indicated therein) could be configured/associated with one or more (e.g., $1 \leq M_{rx} \leq N_{rx}$) of the total configured $N_{rx} \geq 1$ FSBM transmission subbands. Specifically, the UE could receive, in a TCI state, one or more (e.g., $L \geq 1$) QCL source RSs (e.g., SSB resource indexes or NZP CSI-RS resource configuration indexes) with the same or different QCL types—e.g., QCL-TypeD, each configured/associated with a FSBM transmission subband. In particular, for the one or more (e.g., $L \geq 1$) QCL source RSs indicated in a TCI state for frequency-selective transmission(s) for FSBM.

For example, when the FSBM or frequency selective/frequency subband specific/dependent beam management is enabled (according to examples in the present disclosure), the TCI state could be indicated for all of the configured $N_{rx}$ FSBM transmission subbands. For this case, $M_{rx}=N_{rx}$. The UE could also be indicated/configured/provided by the network, e.g., via higher layer RRC signaling and/or MAC CE command and/or dynamic DCI based signaling, that $M_{rx}=N_{rx}$. In one example, the association/mapping between the one or more (e.g., $L \geq 1$) QCL source RSs indicated in the TCI state and the $N_{rx}$ FSBM transmission subbands is fixed in the system specifications—e.g., the first QCL source RS indicated in the TCI state could be for the first FSBM transmission subband, the second QCL source RS indicated in the TCI state could be for the second FSBM transmission subband, and so on, and the L-th QCL source RS indicated in the TCI state could be for the $N_{rx}$-th FSBM transmission subband; for this case, $L=N_{rx}$ or $L=M_{rx}$.

Alternatively, the UE could be indicated/configured/provided by the network, e.g., via higher layer RRC signaling/parameter and/or MAC CE command and/or dynamic DCI based signaling, the association/mapping between the one or more (e.g., $L \geq 1$) QCL source RSs indicated in the TCI state and the $N_{rx}$ FSBM transmission subbands.

For another example, when the FSBM or frequency selective/frequency subband specific/dependent beam management is enabled (according to examples in the present disclosure), the UE could be configured/indicated/provided by the network, e.g., via higher layer RRC signaling/parameter and/or MAC CE command and/or dynamic DCI based signaling, a bitmap of length $N_{rx}$ for the indicated TCI state (comprising the one or more—e.g., $L \geq 1$—QCL source RSs) with each bit position/entry of the bitmap corresponding/associated to a FSBM transmission subband. For instance, the UE could receive from the network, e.g., in the higher layer parameter(s) TCI-State, DLorJointTCI-State, ULTCI-State or QCL-Info, that configures the TCI state or in a DCI (e.g., DCI format 1_1 or 1_2), the bitmap.

In particular, one or more new/dedicated DCI fields could be introduced in the corresponding DCI format(s) and/or one or more bits/codepoints of one or more existing/reserved DCI fields in the corresponding DCI format(s) could be repurposed to indicate the bitmap. Furthermore, the DCI(s) that indicates the bitmap could also indicate the corresponding TCI state. If a bit position/entry of the bitmap is set to "1" (or "0"), the FSBM transmission subband corresponding/associated to the bit position/entry could be active for the corresponding TCI state.

For this example, the bitmap could contain/comprise $1 \leq M_{rx} \leq N_{rx}$ bit positions/entries set to "1"s (or "0"s) indicating that a total of $M_{rx}$ FSBM transmission subbands—out of the total $N_{fx}$ configured FSBM transmission subbands—could be active for the corresponding TCI state. In one example, the association/mapping between the one or more (e.g., L≥1) QCL source RSs indicated in the TCI state and the Ma FSBM transmission subbands is fixed in the system specifications—e.g., the first QCL source RS indicated in the TCI state could be for the first FSBM transmission subband, the second QCL source RS indicated in the TCI state could be for the second FSBM transmission subband, and so on, and the L-th QCL source RS indicated in the TCI state could be for the Ma-th FSBM transmission subband; for this case, $L=M_{fx}$.

Alternatively, the UE could be indicated/configured/provided by the network, e.g., via higher layer RRC signaling/parameter and/or MAC CE command and/or dynamic DCI based signaling, the association/mapping between the one or more (e.g., L≥1) QCL source RSs indicated in the TCI state and the $M_{fx}$ FSBM transmission subbands active for the corresponding TCI state.

Yet for another example, when the FSBM or frequency selective/frequency subband specific/dependent beam management is enabled (according to examples in the present disclosure), the UE could be configured/indicated/provided by the network, e.g., via higher layer RRC signaling/parameter and/or MAC CE command and/or dynamic DCI based signaling, a set of $1 \le M_{fx} \le N_{fx}$ (subband) indexes for the indicated TCI state (comprising the one or more—e.g., L≥1—QCL source RSs) with each (subband) index corresponding/pointing to a FSBM transmission subband—e.g., the (subband) indexes 1, 2, . . . , $M_{fx}$ could correspond/point to the first FSBM transmission subband, the second FSBM transmission subband, . . . , the $M_{fx}$-th FSBM transmission subband, respectively, among all the configured $N_{fx}$ FSBM transmission subbands.

For instance, the UE could receive from the network, e.g., in the higher layer parameter(s) TCI-State, DLorJointTCI-State, ULTCI-State or QCL-Info, that configures the TCI state or in a DCI (e.g., DCI format 1_1 or 1_2), the set of (subband) indexes. In particular, one or more new/dedicated DCI fields could be introduced in the corresponding DCI format(s) and/or one or more bits/codepoints of one or more existing/reserved DCI fields in the corresponding DCI format(s) could be repurposed to indicate the set of (subband) indexes. Furthermore, the DCI(s) that indicates the set of (subband) indexes could also indicate the corresponding TCI state. For this case, the $M_{fx}$ FSBM transmission subband(s) corresponding/associated to the indicated/provided/configured (subband) index(es) could be active for the corresponding TCI state.

In one example, the association/mapping between the one or more (e.g., L≥1) QCL source RSs indicated in the TCI state and the $M_{fx}$ FSBM transmission subbands is fixed in the system specifications—e.g., the first QCL source RS indicated in the TCI state could be for the first FSBM transmission subband, the second QCL source RS indicated in the TCI state could be for the second FSBM transmission subband, and so on, and the L-th QCL source RS indicated in the TCI state could be for the $M_{fx}$-th FSBM transmission subband; for this case, $L=M_{fx}$. Alternatively, the UE could be indicated/configured/provided by the network, e.g., via higher layer RRC signaling/parameter and/or MAC CE command and/or dynamic DCI based signaling, the association/mapping between the one or more (e.g., L≥1) QCL source RSs indicated in the TCI state and the $M_{fx}$ FSBM transmission subbands active for the corresponding TCI state.

In another example, when the FSBM or frequency selective/frequency subband specific/dependent beam management is enabled (according to examples in the present disclosure), the UE could be indicated by the network, e.g., via MAC CE and/or DCI (e.g., DCI format 1_1 or 1_2 with or without DL assignment), one or more (e.g., Q≥1) TCI states/TCI state IDs each indicating/comprising/containing one or more QCL source RSs with the same or different QCL types—e.g., QCL-TypeD. Each of the indicated TCI states (and therefore, the QCL source RS(s) indicated therein) could be configured/associated with a FSBM transmission subband.

In particular, for the one or more (e.g., Q≥1) TCI states for frequency-selective transmission(s) for FSBM is provided as shown in following examples.

In one example, when the FSBM or frequency selective/frequency subband specific/dependent beam management is enabled (according to examples in the present disclosure), the first TCI state (e.g., indicated in a DCI—DCI format 1_1 or 1_2 with or without DL assignment) could be indicated for the first configured FSBM transmission subband, the second TCI state (e.g., indicated in the DCI—DCI format 1_1 or 1_2 with or without DL assignment) could be indicated for the second configured FSBM transmission subband, and so on, and the Q-th TCI state (e.g., indicated in the DCI—DCI format 1_1 or 1_2 with or without DL assignment) could be indicated for the $N_{fx}$-th configured FSBM transmission subband. For this case, $Q=N_{fx}$.

In another example, when the FSBM or frequency selective/frequency subband specific/dependent beam management is enabled (according to examples in the present disclosure), the UE could be configured/indicated/provided by the network, e.g., via higher layer RRC signaling/parameter and/or MAC CE command and/or dynamic DCI based signaling, a bitmap of length $N_{fx}$ for the one or more (e.g., Q≥1) TCI states (and therefore, the corresponding QCL source RSs indicated therein) indicated in a MAC CE/DCI with each bit position/entry of the bitmap corresponding/associated to a FSBM transmission subband.

For instance, the UE could receive from the network, e.g., in the higher layer parameter(s) TCI-State, DLorJointTCI-State, ULTCI-State or QCL-Info, that configures a TCI state or in a DCI (e.g., DCI format 1_1 or 1_2), the bitmap. In particular, one or more new/dedicated DCI fields could be introduced in the corresponding DCI format(s) and/or one or more bits/codepoints of one or more existing/reserved DCI fields in the corresponding DCI format(s) could be repurposed to indicate the bitmap. Furthermore, the DCI(s) that indicates the bitmap could also indicate the corresponding one or more (e.g., Q≥1) TCI states. If a bit position/entry of the bitmap is set to "1" (or "0"), the FSBM transmission subband corresponding/associated to the bit position/entry is active for one of the one or more (e.g., Q≥1) indicated TCI states.

For this example, the bitmap could contain/comprise $1 \le M_{fx} \le N_{fx}$ bit positions/entries set to "1"s (or "0"s) indicating that a total of $M_{fx}$ FSBM transmission subbands—out of the total $N_{fx}$ configured FSBM transmission subbands—could be active for the one or more (e.g., Q≥1) indicated TCI states—e.g., the first bit position/entry in the bitmap set to "1" (or "0")—and therefore, the corresponding FSBM transmission subband—could be for the first TCI state (e.g., indicated in a DCI—DCI format 1_1 or 1_2 with or without DL assignment), the second bit position/entry in the bitmap set to "1" (or "0")—and therefore, the corresponding FSBM transmission subband—could be for the second TCI state (e.g., indicated in the DCI—DCI format 1_1 or 1_2 with or without DL assignment), and so on, and the Ma-th bit position/entry set to "1" (or "0")—and therefore, the corresponding FSBM transmission subband—could be for the Q-th TCI state (e.g., indicated in the DCI—DCI format 1_1 or 1_2 with or without DL assignment). For this case, $M_{rx}=Q$.

Alternatively, the higher layer parameter(s) TCI-State, DLorJointTCI-State, ULTCI-State or QCL-Info, that configures a TCI state could contain/comprise/provide a bitmap of length $N_{rx}$ for the corresponding TCI state with each bit position/entry of the bitmap corresponding/associated to a FSBM transmission subband. For instance, if a bit position/entry of the bitmap is set to "1" (or "0"), the FSBM transmission subband corresponding/associated to the bit position/entry could be active for the corresponding TCI state.

In yet another example, when the FSBM or frequency selective/frequency subband specific/dependent beam management is enabled (according to examples in the present disclosure), the UE could be configured/indicated/provided by the network, e.g., via higher layer RRC signaling/parameter and/or MAC CE command and/or dynamic DCI based signaling, a set of $1 \leq M_{rx} \leq N_{rx}$ (subband) indexes for the one or more (e.g., $Q \geq 1$) TCI states (and therefore, the corresponding QCL source RSs indicated therein) indicated in a MAC CE/DCI with each (subband) index corresponding/pointing to a FSBM transmission subband—e.g., the (subband) indexes 1, 2, . . . , $M_{rx}$ could correspond/point to the first FSBM transmission subband, the second FSBM transmission subband, . . . , the $M_{rx}$-th FSBM transmission subband, respectively, among all the configured $N_{rx}$ FSBM transmission subbands.

For instance, the UE could receive from the network, e.g., in the higher layer parameter(s) TCI-State, DLorJointTCI-State, ULTCI-State or QCL-Info, that configures a TCI state or in a DCI (e.g., DCI format 1_1 or 1_2), the set of (subband) indexes. In particular, one or more new/dedicated DCI fields could be introduced in the corresponding DCI format(s) and/or one or more bits/codepoints of one or more existing/reserved DCI fields in the corresponding DCI format(s) could be repurposed to indicate the set of (subband) indexes. Furthermore, the DCI(s) that indicates the set of (subband) indexes could also indicate the corresponding one or more (e.g., $Q \geq 1$) TCI states.

For this case, each of the $M_{rx}$ FSBM transmission subband(s) corresponding/associated to the indicated/provided/configured (subband) index(es) could be active for one of the one or more (e.g., $Q \geq 1$) indicated TCI states—e.g., the first (subband) index in the set—and therefore, the corresponding FSBM transmission subband—could be for the first TCI state (e.g., indicated in a DCI—DCI format 1_1 or 1_2 with or without DL assignment), the second (subband) index in the set—and therefore, the corresponding FSBM transmission subband—could be for the second TCI state (e.g., indicated in the DCI—DCI format 1_1 or 1_2 with or without DL assignment), and so on, and the $M_{rx}$-th (subband) index in the set—and therefore, the corresponding FSBM transmission subband—could be for the Q-th TCI state (e.g., indicated in the DCI—DCI format 1_1 or 1_2 with or without DL assignment).

For this case, $M_{rx}=Q$. Alternatively, the higher layer parameter(s) TCI-State, DLorJointTCI-State, ULTCI-State or QCL-Info, that configures a TCI state could contain/comprise/provide a (subband) index for the corresponding TCI state. For instance, the FSBM transmission subband corresponding/associated to the (subband) index could be active for the corresponding TCI state.

The bitmap configured/indicated according to examples in the present disclosure, and therefore, the corresponding indicated/configured $M_{rx}$ FSBM transmission subbands, could be for all DL/UL control/data channels/signals such as PDCCH, PDSCH, PUCCH and PUSCH. Optionally, the UE could be indicated/configured/provided by the network, e.g., via higher layer RRC signaling/parameter and/or MAC CE command and/or dynamic DCI based signaling as discussed/described above, a set of one or more bitmaps with each bitmap configured/indicated according to examples in the present disclosure and corresponding/associated to a channel/signal (e.g., PDCCH, PDSCH, PUCCH or PUSCH) or a subset of one or more channels/signals (e.g., PDCCH and PDSCH).

In one example, when the FSBM or frequency selective/frequency subband specific/dependent beam management is enabled (according to examples in the present disclosure), the association/mapping between the (set of) one or more bitmaps and the channels/signals are fixed in the system specifications. For example, the first bitmap could be indicated/configured for PDCCH, the second bitmap could be indicated/configured for PDSCH, the third bitmap could be indicated/configured for PUCCH, and the fourth bitmap could be indicated/configured for PUSCH. For another example, the first bitmap could be indicated/configured for DL control/data channels/signals such as PDCCH and PDSCH, and the second bitmap could be indicated/configured for UL control/data channels/signals such as PUCCH and PUSCH. Yet for another example, the first bitmap could be indicated/configured for control channels/signals such as PDCCH and PUCCH, and the second bitmap could be indicated/configured for data channels/signals such as PDSCH and PUSCH.

In another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between the (set of) one or more bitmaps and the channels/signals. For example, the bitmap(s) for a channel/signal or a subset of one or more channels/signals could be indicated/configured/provided in the higher layer parameter(s)—e.g., PDCCH-Config, PDSCH-Config, ControlResourceSet, PUCCH-Config, PUSCH-Config and etc.—that configures the corresponding channel/signal or the corresponding subset of one or more channels/signals. For another example, the bitmap(s) for a channel/signal or a subset of one or more channels/signals could be indicated in one or more DCIs (e.g., in DCI format 1_1 or 1_2); the indication could be via one or more new/dedicated DCI fields in the DCI format(s) or repurposing one or more bits/codepoints of one or more existing/reserved DCI fields in the DCI format(s).

Furthermore, the DCI(s)/DCI format(s)—e.g., DCI format 1_1 or 1_2 with or without DL assignment—that indicates the bitmap(s) for a channel/signal or a subset of one or more channels/signals could also provide/indicate one or more TCI states/TCI state IDs for the corresponding channel/signal or the corresponding subset of channels/signals; alternatively, the DCI(s)/DCI format(s)—e.g., DCI format 1_1 or 1_2—that indicates the bitmap(s) for a channel/signal or a subset of one or more channels/signals could also provide/indicate resource assignment/allocation/scheduling for the corresponding channel/signal or the corresponding subset of channels/signals.

The set of (subband) indexes configured/indicated according to examples in the present disclosure, and therefore, the corresponding indicated/configured $M_{tx}$ FSBM transmission subbands, could be for all DL/UL control/data channels/signals such as PDCCH, PDSCH, PUCCH and PUSCH. Optionally, the UE could be indicated/configured/provided by the network, e.g., via higher layer RRC signaling/parameter and/or MAC CE command and/or dynamic DCI based signaling as discussed/described above, a list/pool of one or more sets of (subband) indexes with each set configured/indicated according to examples in the present disclosure and corresponding/associated to a channel/signal (e.g., PDCCH, PDSCH, PUCCH or PUSCH) or a subset of one or more channels/signals (e.g., PDCCH and PDSCH).

In one example, when the FSBM or frequency selective/frequency subband specific/dependent beam management is enabled (according to examples in the present disclosure), the association/mapping between the (list/pool of) one or more sets of (subband) indexes and the channels/signals are fixed in the system specifications. For example, the first set of (subband) indexes could be indicated/configured for PDCCH, the second set of (subband) indexes could be indicated/configured for PDSCH, the third set of (subband) indexes could be indicated/configured for PUCCH, and the fourth set of (subband) indexes could be indicated/configured for PUSCH.

For another example, the first set of (subband) indexes could be indicated/configured for DL control/data channels/signals such as PDCCH and PDSCH, and the second set of (subband) indexes could be indicated/configured for UL control/data channels/signals such as PUCCH and PUSCH. Yet for another example, the first set of (subband) indexes could be indicated/configured for control channels/signals such as PDCCH and PUCCH, and the second set of (subband) indexes could be indicated/configured for data channels/signals such as PDSCH and PUSCH.

In another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between the (list/pool of) one or more sets of (subband) indexes and the channels/signals. For example, the set(s) of (subband) indexes for a channel/signal or a subset of one or more channels/signals could be indicated/configured/provided in the higher layer parameter(s)—e.g., PDCCH-Config, PDSCH-Config, ControlResourceSet, PUCCH-Config, PUSCH-Config and etc.—that configures the corresponding channel/signal or the corresponding subset of one or more channels/signals.

For another example, the set(s) of (subband) indexes for a channel/signal or a subset of one or more channels/signals could be indicated in one or more DCIs (e.g., in DCI format 1_1 or 1_2); the indication could be via one or more new/dedicated DCI fields in the DCI format(s) or repurposing one or more bits/codepoints of one or more existing/reserved DCI fields in the DCI format(s). Furthermore, the DCI(s)/DCI format(s)—e.g., DCI format 1_1 or 1_2 with or without DL assignment—that indicates the set(s) of (subband) indexes for a channel/signal or a subset of one or more channels/signals could also provide/indicate one or more TCI states/TCI state IDs for the corresponding channel/signal or the corresponding subset of channels/signals; alternatively, the DCI(s)/DCI format(s)—e.g., DCI format 1_1 or 1_2—that indicates the set(s) of (subband) indexes for a channel/signal or a subset of one or more channels/signals could also provide/indicate resource assignment/allocation/scheduling for the corresponding channel/signal or the corresponding subset of channels/signals.

When the FSBM or frequency selective/frequency subband specific/dependent beam management is enabled (according to examples in the present disclosure), the FSBM transmission subband(s) and the FSBM measurement/reporting subband(s) could be the same or different (i.e., $N_{tx}=N_{meas}$ (or $N_{report}$), $N_{tx}\geq N_{meas}$ (or $N_{report}$) or $N_{tx}\leq N_{meas}$ (or $N_{report}$)).

For example, when the FSBM or frequency selective/frequency subband specific/dependent beam management is enabled (according to examples in the present disclosure), the UE could be configured/indicated/provided by the network, e.g., via higher layer RRC signaling/parameter and/or MAC CE command and/or dynamic DCI based signaling, the same frequency subband(s) for frequency-selective transmission(s) and frequency-selective beam measurement/reporting (i.e., $N_{tx}=N_{meas}$ (or $N_{report}$)). For this case, the UE could only be configured/indicated/provided by the network, e.g., via higher layer RRC signaling/parameter and/or MAC CE command and/or dynamic DCI based signaling, the FSBM transmission subband(s) or the FSBM measurement subband(s) or the FSBM reporting subband(s) according to the above discussed/described design examples. The UE could be further indicated by the network that the FSBM transmission subband(s) is the same as the FSBM measurement/reporting subband(s) or vice versa; this indication could be via higher layer RRC signaling/parameter and/or MAC CE command and/or dynamic DCI based signaling.

For another example, when the FSBM or frequency selective/frequency subband specific/dependent beam management is enabled (according to examples in the present disclosure), the FSBM transmission subband(s) could be a subset of the FSBM measurement/reporting subband(s), or vice versa.

In one example, when the FSBM or frequency selective/frequency subband specific/dependent beam management is enabled (according to examples in the present disclosure), the association/mapping between the FSBM transmission subband(s) and the FSBM measurement/reporting subband(s) could be fixed in the system specification(s)—e.g., the first FSBM transmission subband could correspond to the first FSBM measurement/reporting subband, the second FSBM transmission subband could correspond to the second FSBM measurement/reporting subband, and so on.

In another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between one or more of the FSBM transmission subband(s) and one or more of the FSBM measurement/reporting subband(s).

Furthermore, when the FSBM or frequency selective/frequency subband specific/dependent beam management is enabled (according to examples in the present disclosure), the FSBM transmission subband(s) that is active for one or more TCI states (and therefore, the corresponding QCL source RS(s) indicated therein) indicated in a MAC CE/DCI—referred to as active FSBM transmission subband(s) in the present disclosure (configured according to those specified in examples in the present disclosure), the FSBM measurement subband(s) that is active/used for frequency-selective beam measurement/reporting for one or more CSI-RS resources—referred to as active FSBM measurement subband(s) in the present disclosure (configured according to those specified in examples in the present disclosure and the FSBM reporting subband(s) that is active/used for frequency-selective beam measurement/reporting for one or more CSI-RS resources—referred to as active FSBM reporting subband(s) in the present disclosure (configured according to those specified in examples in the present disclosure) could be the same or different (i.e., $M_{tx}=M_{meas}$ (or $M_{report}$), $M_{tx}\geq M_{meas}$ (or $M_{report}$) or $M_{tx}\leq M_{meas}$ (or $M_{report}$)).

For example, when the FSBM or frequency selective/frequency subband specific/dependent beam management is enabled (according to examples in the present disclosure), the UE could be configured/indicated/provided by the network, e.g., via higher layer RRC signaling/parameter and/or MAC CE command and/or dynamic DCI based signaling, the same frequency subband(s) for both active FSBM transmission subband(s) and active FSBM measurement/reporting subband(s) (i.e., $M_{tx}=M_{meas}$ (or $M_{report}$)). For this case, the UE could only be configured/indicated/provided by the network, e.g., via higher layer RRC signaling/parameter and/or MAC CE command and/or dynamic DCI based signaling, the active FSBM transmission subband(s)—following those specified in examples in the present disclosure, the active FSBM measurement subband(s)—following those specified in examples in the present disclosure, or the active FSBM reporting subband(s)—following those specified in examples in the present disclosure. The UE could be further indicated by the network that the active FSBM transmission subband(s) is the same as the active FSBM measurement/reporting subband(s) or vice versa; this indication could be via higher layer RRC signaling/parameter and/or MAC CE command and/or dynamic DCI based signaling.

For another example, when the FSBM or frequency selective/frequency subband specific/dependent beam management is enabled (according to examples in the present disclosure), the active FSBM transmission subband(s) could be a subset of the active FSBM measurement/reporting subband(s), or vice versa.

In one example, when the FSBM or frequency selective/frequency subband specific/dependent beam management is enabled (according to examples in the present disclosure), the association/mapping between the active FSBM transmission subband(s) and the active FSBM measurement/reporting subband(s) could be fixed in the system specification(s)—e.g., the first active FSBM transmission subband could correspond to the first active FSBM measurement/reporting subband, the second active FSBM transmission subband could correspond to the second active FSBM measurement/reporting subband, and so on.

In another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between one or more of the active FSBM transmission subband(s) and one or more of the active FSBM measurement/reporting subband(s).

Furthermore, when the FSBM or frequency selective/frequency subband specific/dependent beam management is enabled (according to examples in the present disclosure), the (active) FSBM transmission subband(s) and the subband(s) for frequency domain resource assignment/allocation indicated in/by the frequency domain resource assignment (FD-RA) field in a DCI (e.g., DCI formats 0_0, 0_1, 1_0, 1_1 or 1_2) could be the same or different.

For example, when the FSBM or frequency selective/frequency subband specific/dependent beam management is enabled (according to examples in the present disclosure), the UE could be configured/indicated/provided by the network, e.g., via higher layer RRC signaling/parameter and/or MAC CE command and/or dynamic DCI based signaling, that the (active) FSBM transmission subband(s) is identical to the subband(s) indicated by/in the FD-RA field in a DCI.

For another example, when the FSBM or frequency selective/frequency subband specific/dependent beam management is enabled (according to examples in the present disclosure), the (active) FSBM transmission subband(s) could be a subset of the subband(s) indicated by/in the FD-RA field in a DCI, or vice versa.

In one example, when the FSBM or frequency selective/frequency subband specific/dependent beam management is enabled (according to examples in the present disclosure), the association/mapping between the FSBM transmission subband(s) and the subband(s) indicated by/in the FD-RA field in a DCI could be fixed in the system specification(s)—e.g., the first FSBM transmission subband could correspond to the first subband indicated by/in the FD-RA field in a DCI, the second FSBM transmission subband could correspond to the second subband indicated by/in the FD-RA field in the DCI, and so on.

In another example, when the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, the association/mapping between one or more of the FSBM transmission subband(s) and one or more of the subband(s) indicated by/in the FD-RA field in a DCI.

When the FSBM or frequency selective/frequency subband specific/dependent beam management is enabled (according to examples in the present disclosure), the association/mapping relationship between the following (i) and (ii), as shown in TABLE 2, could follow or be determined/configured according to those specified in the design examples in the present disclosure.

TABLE 2

| Configuration |
| --- |
| (i) active FSBM measurement subband(s) and (ii) FSBM reporting subband(s); |
| (i) active FSBM measurement subband(s) and (ii) FSBM transmission subband(s); |
| (i) FSBM measurement subband(s) and (ii) subband(s) indicated by/in the FD-RA field in a DCI; |
| (i) active FSBM measurement subband(s) and (ii) subband(s) indicated by/in the FD-RA field in a DCI; |
| (i) active FSBM reporting subband(s) and (ii) FSBM measurement subband(s); |
| (i) active FSBM reporting subband(s) and (ii) FSBM transmission subband(s); |
| (i) FSBM reporting subband(s) and (ii) subband(s) indicated by/in the FD-RA field in a DCI |
| (i) active FSBM reporting subband(s) and (ii) subband(s) indicated by/in the FD-RA field in a DCI; |
| (i) active FSBM transmission subband(s) and (ii) FSBM measurement subband(s); and/or |
| (i) active FSBM transmission subband(s) and (ii) FSBM reporting subband(s). |

As discussed above, when the FSBM or frequency selective/frequency subband specific/dependent beam management is enabled (according to examples in the present disclosure), the UE could be configured/indicated/provided by the network, e.g., via higher layer RRC signaling/parameter and/or MAC CE command and/or dynamic DCI based signaling, the FSBM measurement subband size—in number of PRBs (or size of each of the FSBM measurement subbands in number of PRBs), the FSBM reporting subband size—in number of PRBs (or size of each of the FSBM reporting subbands in number of PRBs), and/or the FSBM transmission subband size—in number of PRBs (or size of each of the FSBM transmission subbands in number of PRBs)—for one or more DL/UL control/data channels/signals.

For the FSBM measurement subband size, following examples can be provided.

In one example, the FSBM measurement subband size could be the same as the FSBM reporting subband size or the FSBM transmission subband size or the subband size indicated in/by the FD-RA field in a DCI (e.g., DCI formats 0_0, 0_1, 1_0, 1_1 or 1_2).

In another example, the FSBM measurement subband size is related to the FSBM reporting subband size or the FSBM transmission subband size or the subband size indicated in/by the FD-RA field in a DCI (e.g., DCI formats 0_0, 0_1, 1_0, 1_1 or 1_2) by a fixed (mapping/association) relationship. For instance, the FSBM measurement subband size is a multiple (e.g., a multiple/scaling factor k) of the FSBM reporting subband size or the FSBM transmission subband size or the subband size indicated in/by the FD-RA field in a DCI (e.g., DCI formats 0_0, 0_1, 1_0, 1_1 or 1_2). The multiple/scaling factor k could be fixed in the system specifications and/or indicated/configured/provided to the UE via higher layer RRC signaling/parameter and/or MAC CE command and/or dynamic DCI based signaling.

In yet another example, the FSBM measurement subband size is independently/separately configured/indicated relative to the FSBM reporting subband size or the FSBM transmission subband size or the subband size indicated in/by the FD-RA field in a DCI (e.g., DCI formats 0_0, 0_1, 1_0, 1_1 or 1_2).

For the FSBM reporting subband size, following examples can be provided.

In one example, the FSBM reporting subband size could be the same as the FSBM measurement subband size or the FSBM transmission subband size or the subband size indicated in/by the FD-RA field in a DCI (e.g., DCI formats 0_0, 0_1, 1_0, 1_1 or 1_2).

In another example, the FSBM reporting subband size is related to the FSBM measurement subband size or the FSBM transmission subband size or the subband size indicated in/by the FD-RA field in a DCI (e.g., DCI formats 0_0, 0_1, 1_0, 1_1 or 1_2) by a fixed (mapping/association) relationship. For instance, the FSBM reporting subband size is a multiple (e.g., a multiple/scaling factor k) of the FSBM measurement subband size or the FSBM transmission subband size or the subband size indicated in/by the FD-RA field in a DCI (e.g., DCI formats 0_0, 0_1, 1_0, 11 or 1_2). The multiple/scaling factor k could be fixed in the system specifications and/or indicated/configured/provided to the UE via higher layer RRC signaling/parameter and/or MAC CE command and/or dynamic DCI based signaling.

In yet another example, the FSBM reporting subband size is independently/separately configured/indicated relative to the FSBM measurement subband size or the FSBM transmission subband size or the subband size indicated in/by the FD-RA field in a DCI (e.g., DCI formats 0_0, 0_1, 1_0, 1_1 or 1_2).

For the FSBM transmission subband size, following examples can be provided.

In one example, the FSBM transmission subband size could be the same as the FSBM measurement subband size or the FSBM reporting subband size or the subband size indicated in/by the FD-RA field in a DCI (e.g., DCI formats 0_0, 0_1, 1_0, 1_1 or 1_2).

In another example, the FSBM transmission subband size is related to the FSBM measurement subband size or the FSBM reporting subband size or the subband size indicated in/by the FD-RA field in a DCI (e.g., DCI formats 0_0, 0_1, 1_0, 1_1 or 1_2) by a fixed (mapping/association) relationship. For instance, the FSBM transmission subband size is a multiple (e.g., a multiple/scaling factor k) of the FSBM measurement subband size or the FSBM reporting subband size or the subband size indicated in/by the FD-RA field in a DCI (e.g., DCI formats 0_0, 0_1, 1_0, 1_1 or 1_2). The multiple/scaling factor k could be fixed in the system specifications and/or indicated/configured/provided to the UE via higher layer RRC signaling/parameter and/or MAC CE command and/or dynamic DCI based signaling.

In yet another example, the FSBM transmission subband size is independently/separately configured/indicated relative to the FSBM measurement subband size or the FSBM reporting subband size or the subband size indicated in/by the FD-RA field in a DCI (e.g., DCI formats 0_0, 0_1, 1_0, 1_1 or 1_2).

When the FSBM or frequency selective/frequency subband specific/dependent beam management is enabled (according to examples in the present disclosure), the UE could be indicated/configured/provided by the network, e.g., via higher layer RRC signaling/parameter and/or MAC CE command and/or dynamic DCI based signaling, one or more (e.g., P≥1) CSI resource settings (e.g., each provided by CSI-ResourceConfig) comprising at least one CSI resource setting for FSBM, and/or one or more (e.g., S≥1) CSI resource sets (e.g., each provided by CSI-SSB-ResourceSet/NZP-CSI-RS-ResourceSet) comprising at least one CSI resource set for FSBM, and/or one or more (G≥1) CSI resource subsets/groups (e.g., each provided by CSI-SSB-ResourceSubSet/NZP-CSI-RS-ResourceSubSet) comprising at least one CSI resource subset/group for FSBM, and/or one or more (K≥1) CSI-RS resources (e.g., corresponding to SSB resources and/or NZP CSI-RS resources) in a CSI resource setting/CSI resource set/CSI resource subset/group comprising at least one CSI-RS resource for FSBM.

For example, when the FSBM or frequency selective/frequency subband specific/dependent beam management is enabled (according to examples in the present disclosure), the UE could be configured/indicated/provided by the network at least P=2 CSI resource settings (e.g., in a CSI measurement setting provided by CSI-MeasConfig); for this case, at least one of the at least P=2 CSI resource settings could correspond to a CSI resource setting for FSBM—e.g., the higher layer parameter CSI-ResourceConfig that configures the CSI resource setting for FSBM could provide/contain/configure the higher layer parameter FreqSelectiveBeamManagement set to "on"/"enabled."

For another example, when the FSBM or frequency selective/frequency subband specific/dependent beam management is enabled (according to examples in the present disclosure), the UE could be configured/indicated/provided by the network at least S=2 CSI resource sets (e.g., in a CSI resource setting provided by CSI-ReosurceConfig); for this case, at least one of the at least S=2 CSI resource sets could correspond to a CSI resource set for FSBM—e.g., the higher layer parameter NZP-CSI-RS-ResourceSet that configures the NZP CSI-RS resource set for FSBM could provide/contain/configure the higher layer parameter FreqSelective-BeamManagement set to "on"/"enabled."

Yet for another example, when the FSBM or frequency selective/frequency subband specific/dependent beam management is enabled (according to examples in the present disclosure), the UE could be configured/indicated/provided by the network at least G=2 CSI resource subsets/groups (e.g., in a CSI resource set provided by CSI-SSB-Resource-Set/NZP-CSI-RS-ResourceSet); for this case, at least one of the at least G=2 CSI resource subsets/groups could correspond to a CSI resource subset/group for FSBM—e.g., the higher layer parameter NZP-CSI-RS-ResourceSubSet that configures the NZP CSI-RS resource subset/group for FSBM could provide/contain/configure the higher layer parameter FreqSelectiveBeamManagement set to "on"/"enabled."

Yet for another example, when the FSBM or frequency selective/frequency subband specific/dependent beam management is enabled (according to examples in the present disclosure), the UE could be configured/indicated/provided by the network at least K=2 CSI-RS resources (e.g., in a CSI resource setting provided by CSI-ReosurceConfig or a CSI resource set provided by CSI-SSB-ResourceSet/NZP-CSI-RS-ResourceSet or a CSI resource subset/group provided by CSI-SSB-ResourceSubSet/NZP-CSI-RS-ResourceSubset); for this case, at least one of the K=2 CSI-RS resources could correspond to a CSI-RS resource for FSBM—e.g., the higher layer parameter NZP-CSI-RS-Resource that configures the NZP CSI-RS resource for FSBM could provide/contain/configure the higher layer parameter FreqSelective-BeamManagement set to "on"/"enabled."

For CSI resource set(s) or CSI resource subset(s)/group(s) or CSI-RS resource(s) associated with CSI resource setting(s) configured with the higher layer parameter resourceType set to "aperiodic," "periodic," or "semi-per-sistent," trigger states for the CSI reporting setting(s) (configured with the higher layer parameter reportConfigType set to "aperiodic") and/or CSI resource setting(s)/CSI resource set(s)/CSI resource subset(s)/group(s)/CSI-RS resource(s) on one or more component carriers are configured using the higher layer parameter CSI-AperiodicTriggerStateList. For aperiodic CSI report triggering, a single set of CSI triggering states are higher layer configured, wherein the CSI triggering states can be associated with any candidate DL BWP. A trigger state is initiated using the CSI request field in DCI.

When all the bits of CSI request field in DCI are set to zero, no CSI is requested.

When the number of configured CSI triggering states in CSI-AperiodicTriggerStateList is greater than $2^{N_{TS}}-1$, where $2^{N_{TS}}$ is the number of bits in the DCI CSI request field, the UE receives a MAC CE subselection indication, used to map up to $2^{N_{TS}}-1$ trigger states to the codepoints of the CSI request field in DCI. $N_{TS}$ is configured by the higher layer parameter reportTriggerSize where $N_{TS} \in \{0, 1, 2, 3, 4, 5, 6\}$.

When the number of CSI triggering states in CSI-AperiodicTriggerStateList is less than or equal to $2^{N_{TS}}-1$, the CSI request field in DCI directly indicates the triggering state.

A non-zero codepoint of the CSI request field in the DCI is mapped to a CSI triggering state according to the order of the associated positions of the up to $2^{N_{TS}}-1$ trigger states in CSI-AperiodicTriggerStateList with codepoint "1" mapped to the triggering state in the first position.

Figure 14:
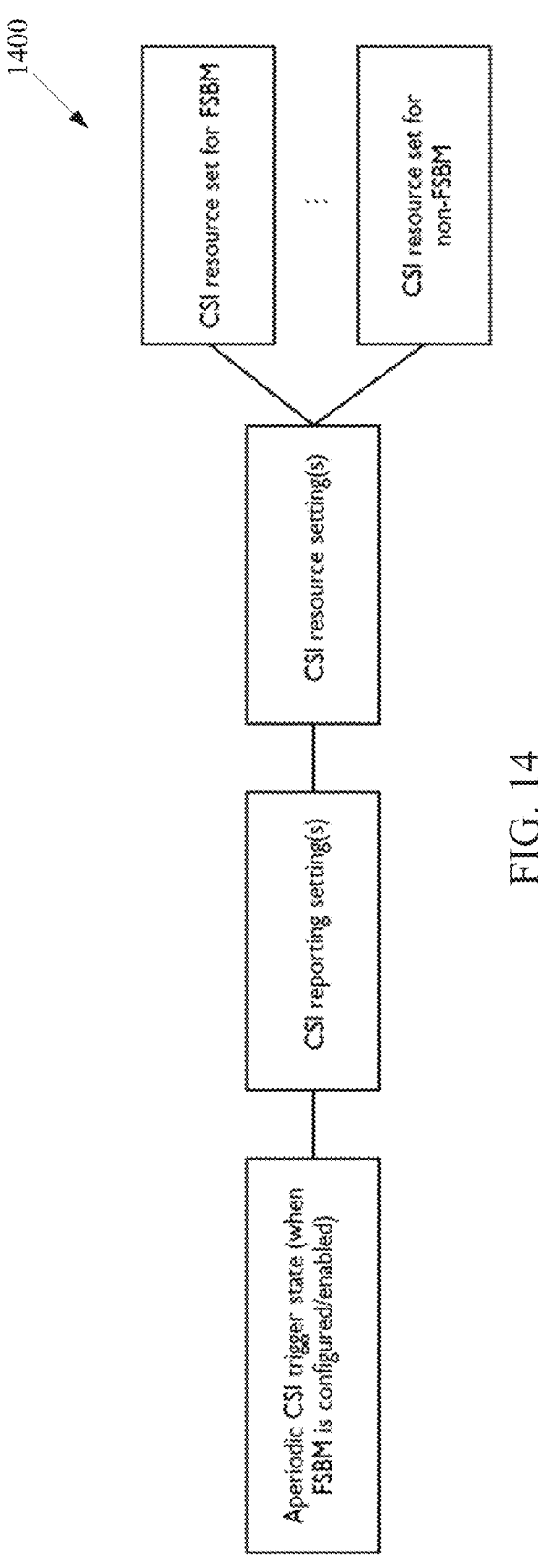
FIG. 14 illustrates an example of CSI resource and reporting settings for FSBM based aperiodic CSI reporting according to embodiments of the present disclosure.

FIG. 14 illustrates an example of CSI resource and reporting settings for FSBM based aperiodic CSI reporting 1400 according to embodiments of the present disclosure. An embodiment of the CSI resource and reporting settings for the FSBM based aperiodic CSI reportings 1400 shown in FIG. 14 is for illustration only.

For aperiodic CSI, if the FSBM or frequency selective/frequency subband specific/dependent beam management is enabled (according to examples in the present disclosure)—e.g., the higher layer parameter FreqSelectiveBeamManagement is configured or set to "enabled"/"on," each trigger state configured using the higher layer parameter CSI-AperiodicTriggerState is associated with one or multiple CSI reporting settings provided by CSI-ReportConfig, where each CSI-ReportConfig is linked to periodic, or semi-persistent, or aperiodic resource setting(s), according to one or more of the following example.

In one example, when P≥1 (e.g., P=2) CSI resource settings are configured, the p-th CSI resource setting is for FSBM (i.e., the CSI resource setting for FSBM), where $p \in \{1, \ldots, P\}$. Here, the value p could be fixed in the system specifications (e.g., p=1); alternatively, the UE could be indicated/configured/provided by the network, e.g., via higher layer RRC signaling/parameter and/or MAC CE command and/or dynamic DCI based signaling, the value p. For instance, when P=2 CSI resource settings are configured, the first (or second) CSI resource setting is for FSBM (i.e., the CSI resource setting for FSBM).

In one example, when S≥1 (e.g., S=2) CSI resource sets are configured (e.g., in one or more CSI resource settings), the s-th CSI resource set is for FSBM (i.e., the CSI resource set for FSBM), where $s \in \{1, \ldots, S\}$. Here, the value s could be fixed in the system specifications (e.g., s=1); alternatively, the UE could be indicated/configured/provided by the network, e.g., via higher layer RRC signaling/parameter and/or MAC CE command and/or dynamic DCI based signaling, the value s. For instance, when S=2 CSI resource sets are configured in a resource setting, the first (or second) CSI resource set is for FSBM (i.e., the CSI resource set for FSBM). A conceptual example characterizing the linkage between the trigger state and the CSI resource set(s) for FSBM is provided in FIG. 14.

In one example, when G≥1 (e.g., G=2) CSI resource subsets/groups are configured (e.g., in one or more CSI resource sets/CSI resource settings), the g-th CSI resource subset/group is for FSBM (i.e., the CSI resource subset/group for FSBM), where $g \in \{1, \ldots, G\}$. Here, the value g could be fixed in the system specifications (e.g., g=1); alternatively, the UE could be indicated/configured/provided by the network, e.g., via higher layer RRC signaling/parameter and/or MAC CE command and/or dynamic DCI based signaling, the value g. For instance, when G=2 CSI resource subsets/groups are configured in a resource set, the first (or second) CSI resource subset/group is for FSBM (i.e., the CSI resource subset/group for FSBM).

In one example, when K≥1 (e.g., K=2) CSI-RS resources (e.g., NZP CSI-RS resources for channel measurement) are configured (e.g., in one or more CSI resource subsets (groups)/CSI resource sets/CSI resource settings), the k-th CSI-RS resource is for FSBM (i.e., the CSI-RS resource for FSBM), where $k \in \{1, \ldots, K\}$. Here, the value k could be fixed in the system specifications (e.g., k=1); alternatively, the UE could be indicated/configured/provided by the network, e.g., via higher layer RRC signaling/parameter and/or MAC CE command and/or dynamic DCI based signaling, the value k. For instance, when K=2 CSI-RS resources are configured in a resource set, the first (or second) CSI-RS resource is for FSBM (i.e., the CSI-RS resource for FSBM).

Optionally, for aperiodic CSI, and for aperiodic CSI resource setting(s), if the FSBM or frequency selective/ frequency subband specific/dependent beam management is enabled (according to examples in the present disclosure)— e.g., the higher layer parameter FreqSelectiveBeamManagement is configured or set to "enabled"/"on," each trigger state configured using the higher layer parameter CSI-AperiodicTriggerState is associated with at least resources-ForChannelFSBM, which could correspond one or more CSI resource settings for FSBM, one or more CSI resource sets for FSBM, one or more CSI resource subsets/groups for FSBM and/or one or more CSI-RS resources for FSBM.

FIG. 15 illustrates an example method 1500 performed by a UE in a wireless communication system according to embodiments of the present disclosure. The method 1500 of FIG. 15 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1500 is for illustration only and other embodiments can be used without departing from the scope of the present disclosure.

The method 1500 begins with the UE receiving a configuration for a CSI-RS resource and a CSI reporting setting to enable FSBMR (1510). For example, in 1510, the configuration indicates at least one of a higher layer parameter FreqSelectiveBeamMeasurement or FreqSelectiveBeamReporting configured or enabled; index or identity (ID) of the CSI-RS resource in a CSI resource set associated with the CSI reporting setting; and index or ID of the CSI reporting setting associated with the CSI-RS resource.

The UE then receives first information indicating a first set of frequency subbands for the CSI-RS resource (1520). For example, in 1520, the first information includes at least one of a bitmap associated with the CSI-RS resource; IDs of the first set of frequency subbands; and indexes of the first set of frequency subbands within the third set of frequency subbands. If the second information includes the bitmap: each entry of the bitmap corresponds to a frequency subband in the third set of frequency subbands and, when an entry of the bitmap is set to '1', the corresponding frequency subband in the third set belongs to the first set of frequency subbands.

The UE then receives second information indicating a second set of frequency subbands for the CSI reporting setting (1530). For example, in 1530, the second information includes at least one of a bitmap associated with the CSI reporting setting; identities (IDs) of the second set of frequency subbands; and indexes of the second set of frequency subbands within the first set of frequency subbands. If the second information includes the bitmap: each entry of the bitmap corresponds to a frequency subband in the first set of frequency subbands and, when an entry of the bitmap is set to '1', the corresponding frequency subband in the first set belongs to the second set of frequency subbands.

In various embodiments, the UE may also receive third information indicating a third set of frequency subbands where the third set of frequency subbands includes the first set of frequency subbands and the second set of frequency subbands. The third information may include at least one of indexes or IDs of the third set of frequency subbands; and time or frequency domain resource allocations for frequency subbands in the third set of frequency bands.

The UE then measures the CSI-RS resource based on the configuration and the first information (1540). The UE then determines a beam report including one or more beam metrics based on the configuration, the measurement, and the second information (1550). For example, in 1550, each of the one or more beam metrics respectively corresponds to a frequency subband in the second set of frequency subbands, according to one of a fixed rule in system specifications or a network configuration or indication received via RRC signaling, a MAC-CE, or DCI. In various embodiments, the one or more beam metrics include a largest measured RSRP value and one or more differential RSRP values relative to the largest measured RSRP value.

In various embodiments, the UE may also determine a fourth set of frequency subbands for which each of the one or more beam metrics corresponds to a frequency subband in the fourth set of frequency subbands. The UE may also transmit information of the fourth set of frequency subbands including at least one of: a bitmap corresponding to a frequency subband in the second set of frequency subbands, where, when an entry of the bitmap is set to '1', the corresponding frequency subband in the second set belongs to the fourth set of frequency subbands; identities (IDs) of the fourth set of frequency subbands; and indexes of the fourth set of frequency subbands within the second set of frequency subbands.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE), comprising:
   a transceiver configured to:
      receive a configuration for a channel state information (CSI) reference signal (RS) resource and a CSI reporting setting to enable frequency selective beam measurement and reporting (FSBMR),
      receive first information indicating a first set of frequency subbands for the CSI-RS resource, and
      receive second information indicating a second set of frequency subbands for the CSI reporting setting; and
   a processor operably coupled to the transceiver, the processor configured to:
      measure, based on the configuration and the first information, the CSI-RS resource; and
      determine, based on the configuration, the measurement, and the second information, a beam report including one or more beam metrics.

2. The UE of claim 1, wherein the configuration indicates at least one of:

a higher layer parameter FreqSelectiveBeamMeasurement or FreqSelectiveBeamReporting configured or enabled;

index or identity (ID) of the CSI-RS resource in a CSI resource set associated with the CSI reporting setting; and index or ID of the CSI reporting setting associated with the CSI-RS resource.

3. The UE of claim 1, wherein:

the transceiver is further configured to receive third information indicating a third set of frequency subbands;

the third set of frequency subbands includes the first set of frequency subbands and the second set of frequency subbands; and the third information includes at least one of:

indexes or identities (IDs) of the third set of frequency subbands; and time or frequency domain resource allocations for frequency subbands in the third set of frequency bands.

4. The UE of claim 3, wherein:

the first information includes at least one of:

a bitmap associated with the CSI-RS resource;

IDs of the first set of frequency subbands; and indexes of the first set of frequency subbands within the third set of frequency subbands, and when the first information includes the bitmap:

each entry of the bitmap corresponds to a frequency subband in the third set of frequency subbands, and when an entry of the bitmap is set to '1', the corresponding frequency subband in the third set belongs to the first set of frequency subbands.

5. The UE of claim 1, wherein:

the second information includes at least one of:

a bitmap associated with the CSI reporting setting;

identities (IDs) of the second set of frequency subbands; and indexes of the second set of frequency subbands within the first set of frequency subbands, and when the second information includes the bitmap:

each entry of the bitmap corresponds to a frequency subband in the first set of frequency subbands, and when an entry of the bitmap is set to '1', the corresponding frequency subband in the first set belongs to the second set of frequency subbands.

6. The UE of claim 1, wherein:

each of the one or more beam metrics respectively corresponds to a frequency subband in the second set of frequency subbands, according to one of:

a fixed rule in system specifications; or a network configuration or indication received via radio resource control (RRC) signaling, a medium access control (MAC) control element (CE), or downlink control information (DCI).

7. The UE of claim 1, wherein the one or more beam metrics include a largest measured reference signal received power (RSRP) value and one or more differential RSRP values relative to the largest measured RSRP value.

8. The UE of claim 1, wherein:

the processor is further configured to determine a fourth set of frequency subbands, wherein each of the one or more beam metrics corresponds to a frequency subband in the fourth set of frequency subbands, and the transceiver is further configured to transmit information of the fourth set of frequency subbands including at least one of:

a bitmap corresponding to the second set of frequency subbands, wherein, when an entry of the bitmap is set to '1', the corresponding frequency subband in the second set belongs to the fourth set of frequency subbands;

identities (IDs) of the fourth set of frequency subbands; and indexes of the fourth set of frequency subbands within the second set of frequency subbands.

9. A base station (BS), comprising:

a transceiver configured to:

transmit a configuration for a channel state information (CSI) reference signal (RS) resource and a CSI reporting setting to enable frequency selective beam measurement and reporting (FSBMR), transmit first information indicating a first set of frequency subbands for the CSI-RS resource, transmit second information indicating a second set of frequency subbands for the CSI reporting setting, and receive a beam report including one or more beam metrics, the beam report based on the configuration, measurement of the CSI-RS resource based on the configuration and the first information, and the second information.

10. The BS of claim 9, wherein the configuration indicates at least one of:

a higher layer parameter FreqSelectiveBeamMeasurement or FreqSelectiveBeamReporting configured or enabled;

index or identity (ID) of the CSI-RS resource in a CSI resource set associated with the CSI reporting setting; and index or ID of the CSI reporting setting associated with the CSI-RS resource.

11. The BS of claim 9, wherein:

the transceiver is further configured to transmit third information indicating a third set of frequency subbands;

the third set of frequency subbands includes the first set of frequency subbands and the second set of frequency subbands; and the third information includes at least one of:

indexes or identities (IDs) of the third set of frequency subbands; and time or frequency domain resource allocations for frequency subbands in the third set of frequency bands.

12. The BS of claim 11, wherein:

the first information includes at least one of:

a bitmap associated with the CSI-RS resource;

IDs of the first set of frequency subbands; and indexes of the first set of frequency subbands within the third set of frequency subbands, and when the first information includes the bitmap:

each entry of the bitmap corresponds to a frequency subband in the third set of frequency subbands, and when an entry of the bitmap is set to '1', the corresponding frequency subband in the third set belongs to the first set of frequency subbands.

13. The BS of claim 9, wherein:

the second information includes at least one of:

a bitmap associated with the CSI reporting setting;

identities (IDs) of the second set of frequency subbands; and indexes of the second set of frequency subbands within the first set of frequency subbands, and when the second information includes the bitmap:

each entry of the bitmap corresponds to a frequency subband in the first set of frequency subbands, and when an entry of the bitmap is set to '1', the corresponding frequency subband in the first set belongs to the second set of frequency subbands.

14. The BS of claim 9, wherein:

each of the one or more beam metrics respectively corresponds to a frequency subband in the second set of frequency subbands, according to one of:

a fixed rule in system specifications; or a network configuration or indication received via radio resource control (RRC) signaling, a medium access control (MAC) control element (CE), or downlink control information (DCI).

15. A method performed by a user equipment (UE), the method comprising:

receiving a configuration for a channel state information (CSI) reference signal (RS) resource and a CSI reporting setting to enable frequency selective beam measurement and reporting (FSBMR);

receiving first information indicating a first set of frequency subbands for the CSI-RS resource;

receive second information indicating a second set of frequency subbands for the CSI reporting setting;

measuring, based on the configuration and the first information, the CSI-RS resource; and determining, based on the configuration, the measurement, and the second information, a beam report including one or more beam metrics.

16. The method of claim 15, wherein the configuration indicates at least one of:

a higher layer parameter FreqSelectiveBeamMeasurement or FreqSelectiveBeamReporting configured or enabled;

index or identity (ID) of the CSI-RS resource in a CSI resource set associated with the CSI reporting setting; and index or ID of the CSI reporting setting associated with the CSI-RS resource.

17. The method of claim 15, further comprising:

receiving third information indicating a third set of frequency subbands, wherein the third set of frequency subbands includes the first set of frequency subbands and the second set of frequency subbands; and wherein the third information includes at least one of:

indexes or identities (IDs) of the third set of frequency subbands; and time or frequency domain resource allocations for frequency subbands in the third set of frequency bands.

18. The method of claim 17, wherein:

the first information includes at least one of:

a bitmap associated with the CSI-RS resource;

IDs of the first set of frequency subbands; and indexes of the first set of frequency subbands within the third set of frequency subbands, and when the first information includes the bitmap:

each entry of the bitmap corresponds to a frequency subband in the third set of frequency subbands, and when an entry of the bitmap is set to '1', the corresponding frequency subband in the third set belongs to the first set of frequency subbands.

19. The method of claim 15, wherein:

the second information includes at least one of:

a bitmap associated with the CSI reporting setting;

identities (IDs) of the second set of frequency subbands; and indexes of the second set of frequency subbands within the first set of frequency subbands, and when the second information includes the bitmap:

each entry of the bitmap corresponds to a frequency subband in the first set of frequency subbands, and when an entry of the bitmap is set to '1', the corresponding frequency subband in the first set belongs to the second set of frequency subbands.

20. The method of claim 15, wherein:

each of the one or more beam metrics respectively corresponds to a frequency subband in the second set of frequency subbands, according to one of:

a fixed rule in system specifications; or a network configuration or indication received via radio resource control (RRC) signaling, a medium access control (MAC) control element (CE), or downlink control information (DCI).

* * * * *